United States Patent [19]
Kikinis et al.

[11] Patent Number: 5,799,068
[45] Date of Patent: Aug. 25, 1998

[54] SMART PHONE INTEGRATION WITH COMPUTER SYSTEMS

[75] Inventors: Dan Kikinis, Saratoga; Pascal Dornier, Sunnyvale; William J. Seiler, Scotts Valley, all of Calif.

[73] Assignee: Elonex I.P. Holdings Ltd., London, United Kingdom

[21] Appl. No.: 979,439

[22] Filed: Nov. 26, 1997

Related U.S. Application Data

[63] Continuation of Ser. No. 365,348, Dec. 28, 1994, abandoned, which is a continuation-in-part of Ser. No. 195,123, Feb. 10, 1994, abandoned, and Ser. No. 144,231, Oct. 28, 1993, and Ser. No. 159,078, Nov. 29, 1993, Pat. No. 5,539,616, and Ser. No. 97,946, Jul. 26, 1993, Pat. No. 5,278,730, and Ser. No. 905,480, Jun. 29, 1992, abandoned.

[51] Int. Cl.$^6$ .......................... H04M 11/00; H04M 1/00; G06F 13/00
[52] U.S. Cl. .................. 379/93.06; 379/357; 395/282; 395/833; 455/331
[58] Field of Search ................. 379/90.01, 93.01, 379/93.05, 93.06, 93.17, 93.22, 93.23, 354, 355, 357, 130, 140; 455/331; 348/14; 345/2; 395/200.34, 200.35, 828, 830, 834, 882, 280, 285, 282, 889, 309, 833, 200.04

[56] References Cited

U.S. PATENT DOCUMENTS

| | | | |
|---|---|---|---|
| 4,935,956 | 6/1990 | Hellwarth et al. | 379/155 X |
| 5,335,276 | 8/1994 | Thompson et al. | 380/21 |
| 5,369,700 | 11/1994 | Koura et al. | 379/387 |
| 5,710,515 | 12/1997 | Gradeler | 395/834 |

*Primary Examiner*—Paul Loomis
*Attorney, Agent, or Firm*—Donald R. Boys

[57] ABSTRACT

A business telephone system employs digital signal processing in a digital telephone having a serial link for connection to a general-purpose computer. The Smart Phone is the central intelligence for the system, which may utilize a PBX connected in a LAN network to multiple computers, including file servers, and each computer may have one or more Smart Phones connected. In one embodiment, docking bays in the phone provide an ability to interchange finctional modules, including DSP modules. The docking bays and functional modules may be configured to PCMCIA standards. In another embodiment, a docking bay, which may also be PCMCIA, has a physical window allowing access to an input area on a docked module, wherein the docked module is an intelligent module with a CPU, a memory, and a bus structure, affording control of the smart phone and the entire system through the input interface of the docked module. In various embodiments the external form of the system may vary, and in one embodiment, the smart phone elements are integrated with a desktop or a portable computer having docking bays to receive and connect functional modules, such a DSP modules and/or an intelligent module.

7 Claims, 46 Drawing Sheets

Smart Phone ASIC          Pin Count                    12/9/93

Function                                        I/O Pins

PC Communications section (PCC):

PCC Receiver                              1
    PCC Transmitter                           2
    PCC PLL                                   4
    OSC                                       2

Microprocessor interface section:              30

PCMCIA Bus section:                            60

ISDN Receiver                             1
    ISDN transmitter                          2

Digital Multi-Protocol communications controller section:

none

Telephone Set section:

Keypad interface                         14
    LCD Interface                            12
    CODEC Interface                           9
    Speaker control                           4
    Hook switch (handset)                     1
    Hook switch (analog input)                1

Power & Ground section:

Power                                     8
    Ground                                    9
                                           _____

Total Pins =   160

Fig. 8

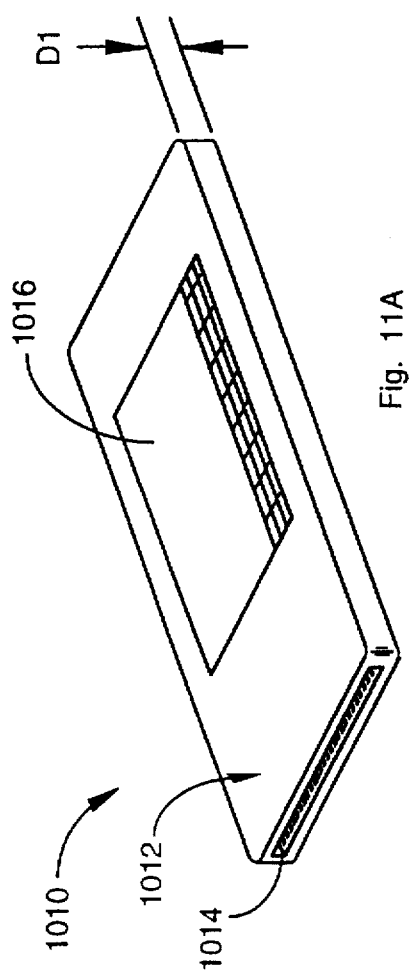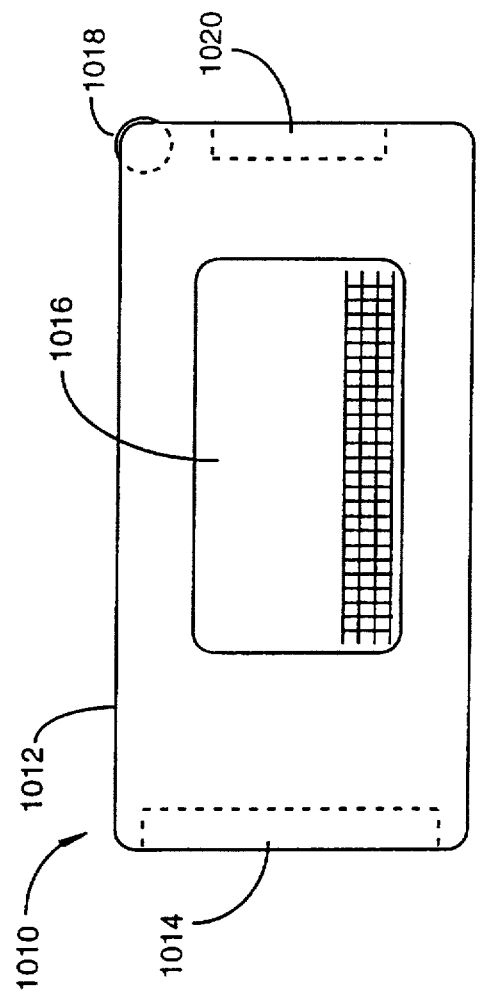

1

SMART PHONE INTEGRATION WITH COMPUTER SYSTEMS

CROSS REFERENCE TO RELATED DOCUMENTS

This is a continuation of application Ser. No. 08/365,348, filed Dec. 28, 1994, now abandoned. The present related application is a continuation-in-part of patent application Ser. Nos. 08/195,123, filed Feb. 10, 1994, abandoned, 08/144,231, filed Oct. 28, 1993, and 08/159,078, filed Nov. 29, 1993 (now U.S. Pat. No. 5,539,616; of application Ser. No. 08/097,946 filed Jul. 26, 1993, (now U.S. Pat. No. 5,278,730), and of application Ser. No. 07/905,480 filed Jun. 29, 1992, abandoned; all of which are herein incorporated by reference in their entirety.

FIELD OF THE INVENTION

The present invention is in the area of telecommunication systems and pertains in particular to integration of telephone devices with computers by use of digital signal processors and personal digital assistant devices.

BACKGROUND OF THE INVENTION

Since the advent of personal computers, manufacturers have sought to integrate voice and data communication equipment. While early attempts at this integration met with mixed results, new products integrate all the functionality of a traditional phone with state-of-the-art, computer-supported switching systems, known in the art as private branch exchanges (PBXs).

One significant development in the art is digital transmission as the predominant method of signal transmission within a PBX. Digital techniques allow high-speed data transmission over twisted-pair wiring formerly used only for analog voice transmission. Integrated voice-data terminals, adapters within telephones, and stand-alone units provide for sophisticated functions, such as simultaneous voice and data transmission.

A key element in development of digital PBX systems is digital signal processing (DSP) technology. A DSP unit is essentially a specialized microprocessor configured to process digitized analog signals. Unlike ordinary microprocessors, DSPs often have several paths of communication with peripherals, allowing them to do much of their system bus work without intervention by a CPU. They provide improved interrupt service and fast, real-time processing.

Telephone instruments have also evolved, becoming more intelligent and versatile. Most PBXs support industry-standard, single-line telephone sets with rotary dials or push-button, dual-tone multifrequency (DTMF) dial pads. The general trend, however, is toward proprietary electronic digital multibutton telephone sets with local microprocessors supporting enhanced features and functions. Such buttons can be programmed for different users, multiple line and trunk access from the same telephone, and alphanumeric displays that provide information about a call in progress.

PBXs today often use multiple microprocessors for common control. A CPU or main microprocessor coordinates functions of other microprocessors and establishes call connections. Secondary microprocessors are located on other circuit cards and sometimes in electronic digital telephones.

Data transmissions switched through a PBX, and often through a local area network (LAN), can communicate with other data devices or computers connected to the system or via a public switched network, with a wide variety of remote data devices and computers. Modern PBXs offer features such as call forwarding, least-cost routing, station message recording, conferencing, hunting, and call restrictions.

FIGS. 1 and 2 show two PBX design options known to the inventors. FIG. 1 is an external block diagram of what might be termed a "Smart PBX" system. This design features one or more DSP cards in the PBX supporting voice mail, faxing, and other telecommunications operations. Control of the PCs is achieved through a LAN network. This Smart PBX allows efficient internal switching, it can use existing telephones, and voice mail and other functions are independent of the PCs, so they work even if a PC is not available. On the other hand, this solution requires major redesign of the PBX, with attendant development problems. There is also the expense of replacing the installed base of PBXs.

FIG. 2 is a block diagram illustrating another possible solution. In this system a DSP unit is provided in the PC as a separate module, such as an expansion card. Such a system would typically use an Integrated Services Digital Network (ISDN) interface between PBX and DSP. Specialized multimedia functions can be passed through to the telephone system.

The system of FIG. 2 can be built using existing cards, there is a relatively low investment in hardware, and there is a relatively low cost in providing the DSP by sharing the case and power with the PC. This design is not very suitable for workstations, however; the user must install the adaptor card; and the PC is not a good environment for analog circuits due to EMI and switching noise, for example.

At present there is no inexpensive and simple way to provide a state-of-the-art telecommunication system. The big deterrent to a Smart PBX system, as in FIG. 1, is the high cost of the PBX. And a telecommunications system where the DSP function is in the PC, as in FIG. 2, is not entirely suitable because PCs typically have limited space for adapters and installation of an adapter and setup is an inconvenience for the user. Moreover, PCs are an undesirable environment for analog circuits due to electromagnetic interference and switching noise.

What is needed is a solution wherein a user may conveniently add and replace functional modules as needed. This is provided in the present invention by making the telephone into the caretaker of the DSP and other functional modules. The only change required in the installed base is a new Smart Phone, which may be easily and quickly attached to both PC and PBX. Such an innovation allows for expansion into full-service, multimedia telecommunication.

A smart phone with docking bays for functional modules, and functional modules to provide a broad selection of functions, as is needed in the art, may be provided in a number of forms according to the present invention. One form retains the look and feel of a conventional telephone, but having docking bays and access to docked modules, as is more fully described below. Another is in the familiar form of a portable computer, such as a notebook computer, wherein the computer may have multiple docking bays. In still another form, the system of the invention may take the exterior form of a personal computer desktop unit or workstation on a network, wherein the smartphone components may be integrated either with the computer elements or on functional cards dockable in one or more docking bays, as is described more fully below.

In all of these forms, it would be desirable to have functional modules including input and output functionality, such as a keyboard or touchscreen and a display, and also computer functionality, such as on-board memory and microprocessor control.

SUMMARY OF THE INVENTION

In an embodiment of the present invention, a modular computer is provided having all of the conventional elements of a personal computer plus a docking bay for docking functional modules and digital telephone circuitry. The computer has a microphone-speaker unit for voice input and output. The digital telephone circuitry includes a coder/decoder (CODEC) for conversions between analog and digital data forms and an ISDN telephone line port for connecting the computer to a telephone line.

In an alternative embodiment a Digital Signal Processor (DSP) microprocessor is provided as a functional module dockable in the docking bay for processing digitized audio signals.

In yet another embodiment the modular computer has an on-board microphone speaker unit, and digital telephone circuitry is provided in a dockable functional module, adding digital telephone capability to the computer.

Physical forms for such smart phone/computer integrations include the familiar telephone form, having a handset as well as at least one docking bay, a desktop computer or network workstation, and a portable computer form, such as a notebook or laptop computer, with docking bays, wherein voice input and output may be provided by integrated speakers and microphones, as well as by connecting a more conventional handset.

BRIEF DESCRIPTION OF THE DRAWINGS

FIG. 8 is an approximation of pin count for a Smart Phone ASIC as shown in FIG. 7.

FIG. 11A is an isometric view of a μPDA according to an embodiment of the present invention.

FIG. 11B is a plan view of the μPDA of FIG. 11A.

DESCRIPTION OF THE PREFERRED EMBODIMENTS

Figure 1:
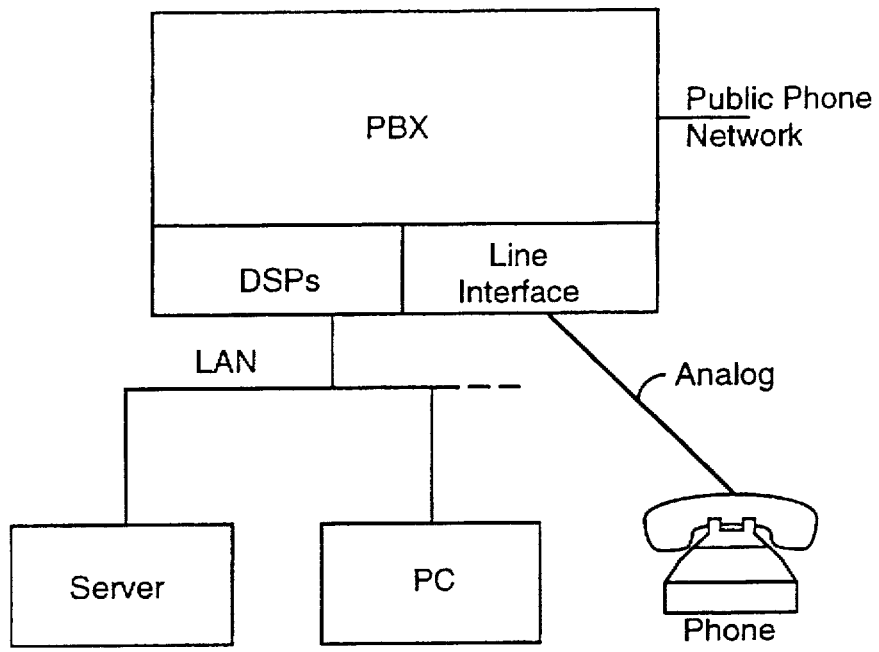
FIG. 1 is a block diagram of a Smart PBX system known to the inventors.
Figure 2:
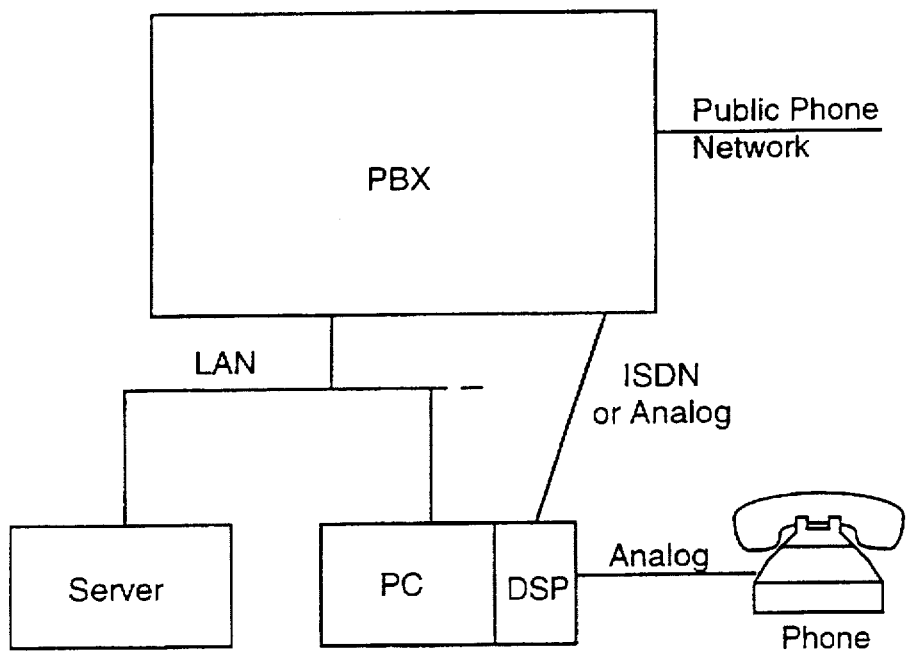
FIG. 2 is a block diagram of a telecommunication system with DSP module in the PC, also known to the inventors.
Figure 3:
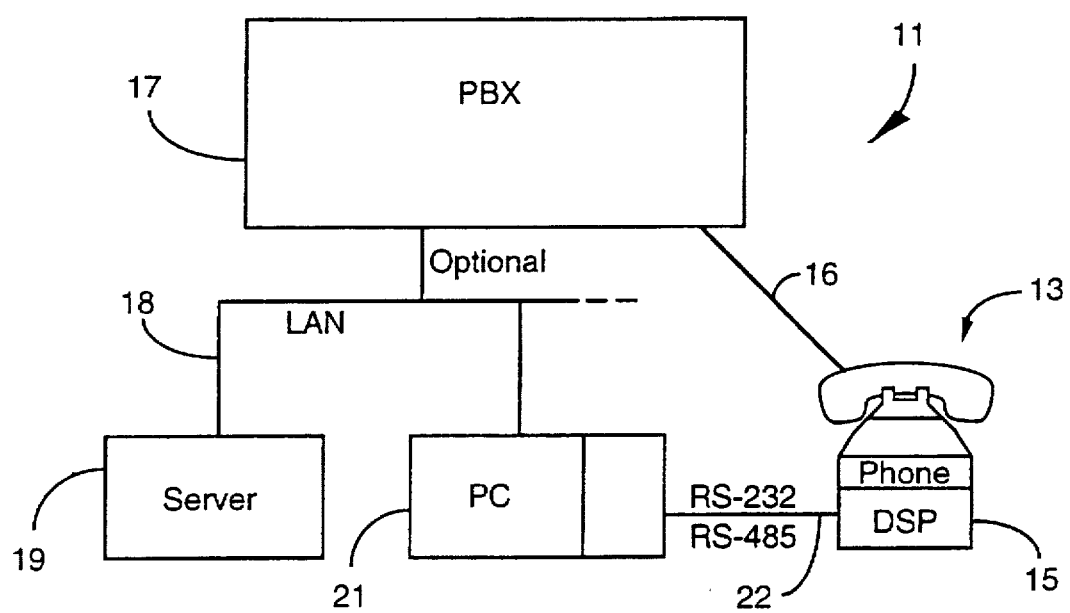
FIG. 3 is a block diagram of a Smart Phone system, according to an embodiment of the present invention.

FIG. 3 is a block diagram of a Smart Phone system 11 according to an embodiment of the present invention, having at least one Smart Phone 13 connected to a PBX 17 by preferably an ISDN (digital) line 16. This connection could alternately be an analog connection. PBX 17 is in turn connected on a LAN 18 to one or more PCs 21 and optionally one or more network servers 19. Each Smart Phone 13 is also connected by serial link 22 to a PC 21.

Smart Phone 13 comprises internal circuitry for communication with the PBX and the PC, and additionally one or more DSP functional units 15. The one or more DSP functions may be hard wired into the Smart Phone circuitry or preferable reside on one or more removable, interchangeable modules.

In one embodiment, DSP units and other functional modules are implemented as PCMCIA cards. Such PCMCIA cards may be inserted into docking bays (not shown in FIG. 3) on the Smart Phone. The docking bays are configured to accept the standard physical design of PCMCIA cards, in this case preferable type II standard, including a multi-pin electrical connector. Since PCMCIA cards are designed for "hot" insertion, that is, a PCMCIA card can be slid into place while the power is on, one card slot can serve many functions within a single working session without rebooting the host PC.

Serial link 22 in one preferred embodiment is a standard RS-485 protocol link. It may be RS-232 in other embodiments. In an alternative preferred embodiment, this link may be a unique high-speed serial interface described more fully below with reference to FIG. 5.

Figure 4:
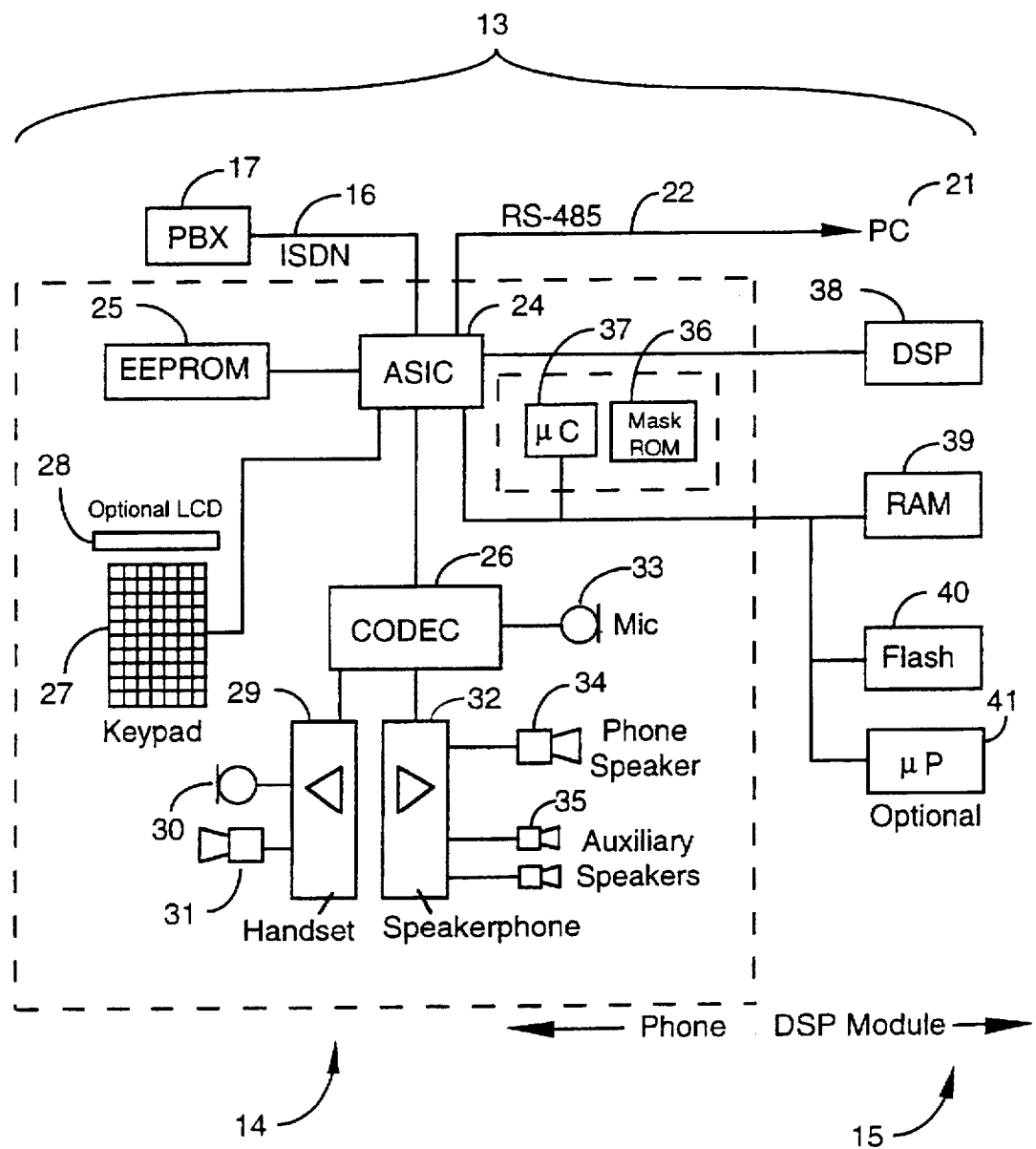
FIG. 4 is a block diagram of the Smart Phone device in the system of FIG. 3.

FIG. 4 is a block diagram of Smart Phone 13 shown in FIG. 3. PBX 17 is shown connected to the Smart Phone by ISDN line 16, and PC workstation 21 is shown connected to the Smart Phone through RS-485 line 22, as seen also in FIG. 3.

PC workstation 21 in this embodiment has a Telephony Application Programming Interface (TAPI) that coordinates Windows applications running on the PC with call functions on the Smart Phone. Any number of different TAPI and other telemanagement-type programs can be added to the PC workstation.

In FIG. 4, the Smart Phone device is shown partitioned into two main components, a telephone unit 14 and a DSP module 15. The heart of telephone unit 14 is an ASIC 24, which receives and transmits over both ISDN line 16 and RS-485 line 22, oversees the conversion of incoming data into the required output, and handles communication with other elements. ASIC 24 is connected to an EEPROM 25, a coder/decoder module (CODEC) 26, a keypad controller 27 with an optional liquid crystal display (LCD) 28, and to a microcontroller 37.

EEPROM 25 holds instructions for the phone connection to PBX 17. CODEC 26 supports the phone sound system, performing digital-to-analog and analog-to-digital data conversions through non-linear compression and decompression processes.

Audio input is from a microphone 30 on the Smart Phone handset 29 or a microphone 33 for a speakerphone 32. Audio is output through an amplifier through handset speaker 31 or a main speaker 34 on the speakerphone. Optional auxiliary speakers 35 provide stereo sound, with main speaker 34 optionally serving as subwoofer.

Mask read-only memory (ROM) 36 holds code, including dual-tone, multi-frequency (DTMF) wavetables and sound system wave tables, for microcontroller 37 connected to the ASIC.

DSP module 15 in FIG. 4 comprises DSP 38, RAM 39, flash ROM 40, and an optional microprocessor 41. A variety of signal processing functions can be integrated into a Smart Phone system through the DSP. Flash ROM 40 holds DSP firmware and it can also be programmed to compensate for corrupted code in ROM by a method known to the inventors, which is the subject of a separate patent application.

RAM 39 is the DSP workspace. It also acts as a buffer, holding data from PC 21 until it can be converted by ASIC 24.

Figure 5:
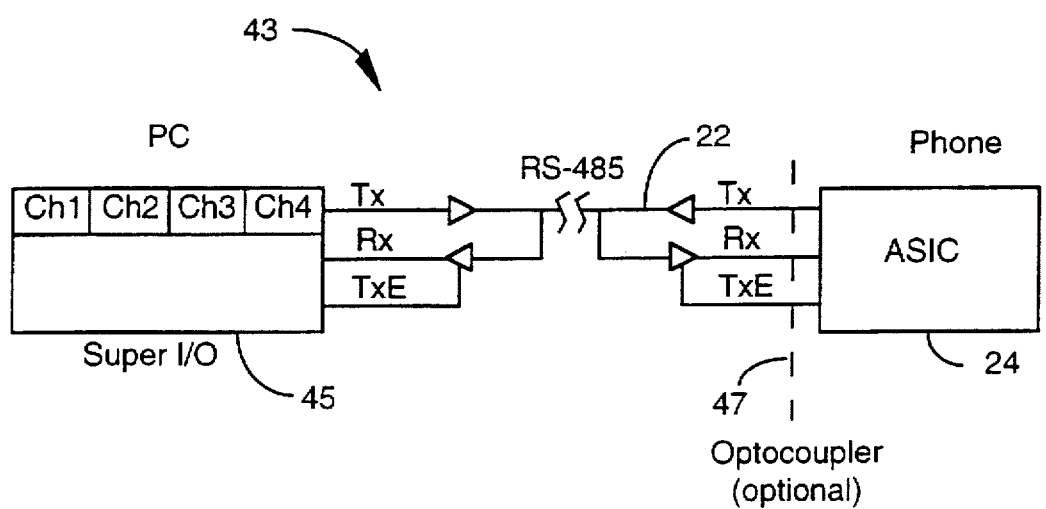
FIG. 5 is a schematic diagram of a specialized interface between Smart Phone and PC, according to an embodiment of the present invention.

As mentioned in the FIG. 3 description above, one embodiment incorporates a PC-Smart Phone interface through an RS-485 port. Many PCs, however, do not have RS-485 ports. FIG. 5 shows a specialized interface 43, which solves this problem by providing a plug-in interface that can be easily and inexpensively installed on PCs without an RS-485 port.

The interface as shown in FIG. 5 has a data cable 22 comprising one pair of differential data lines plus ground. In another embodiment there might be two pairs of differential lines, to separately transmit and receive data, plus ground, allowing higher speed transmissions.

The specialized interface has a modified Super I/O chip 45 with plug-in connector (not shown) on the PC side. Three pins in the Super I/O chip are reserved for PC-Smart Phone communications: Tx for transmit, Rx for receive, and TxE for transmit enable. The modified Super I/O chip logic can be set for whatever communication protocols are desired. For example, in FIG. 5 four channels are assigned as follows: Ch 1, raw line data for communications such as voice and prerecorded data; Ch2, DSP channel for fax and modem communications; Ch3, microprocessor and commands for Smart Phone enhanced functions; and Ch4, sound access for sound card functions from the PC. On the Smart Phone side of the specialized interface, ASIC chip 24 mirrors the Super I/O chip interface logic as described above. An optocoupler 47 is optionally included on the Smart Phone side for enhanced noise immunity. A typical transmission protocol might send 1 bit for handshaking, 2 bits for channel assignment, and 16 bits for data.

Figure 6:
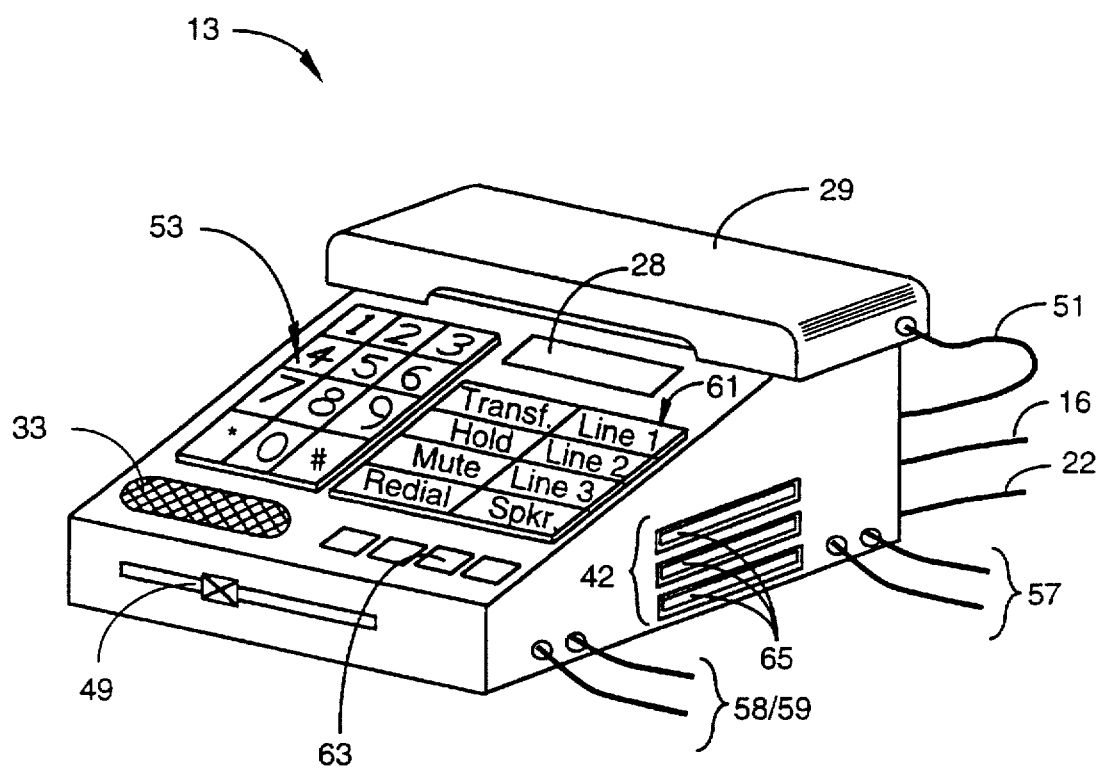
FIG. 6 is an isometric view of an exemplary Smart Phone according to an embodiment of the present invention, showing a user interface.

FIG. 6 is an isometric view of an exemplary user interface for a Smart Phone 13, having docking bays 42 providing standard connectors for three PCMCIA cards 65, one of which is reserved for a DSP module as described for FIG. 4.

In an alternative embodiment the docking bays may be located elsewhere on the Smart Phone, such as on one side or the other. In yet another embodiment, the docking bays might be a separate, intact unit that is mechanically and electrically attached to the base of the Smart Phone. One or more additional docking bays could feasibly be added to the Smart Phone, either as built-in or externally attached units.

In FIG. 6, Smart Phone 13 also has a handset 29 with the usual microphone and speaker (not shown) and operates also as a speakerphone with a combination mic/speaker 33 and a volume control slider 49. Smart Phone 13 has the following externally wired interfaces: handset line 51, ISDN line 16 to PBX, and RS-485 line 22 to PC.

Optional, plug-in speaker interfaces 57 are for stereo output. In a variation, one or more analog interfaces 58 and 59 might be added to expand multimedia applications. Push-button DTMF dial pad 53 and programmable function buttons 61 provide user access to make calls and select basic Smart Phone functions, such as transfer, hold, mute, redial, line selection, and speakerphone on/off. Light-emitting diodes 63 (LED) or other type of signal lights indicate which phone lines are in use and/or when the speakerphone is on. An optional LCD display 28 provides a visual interface for the user to monitor calls.

Figure 7:
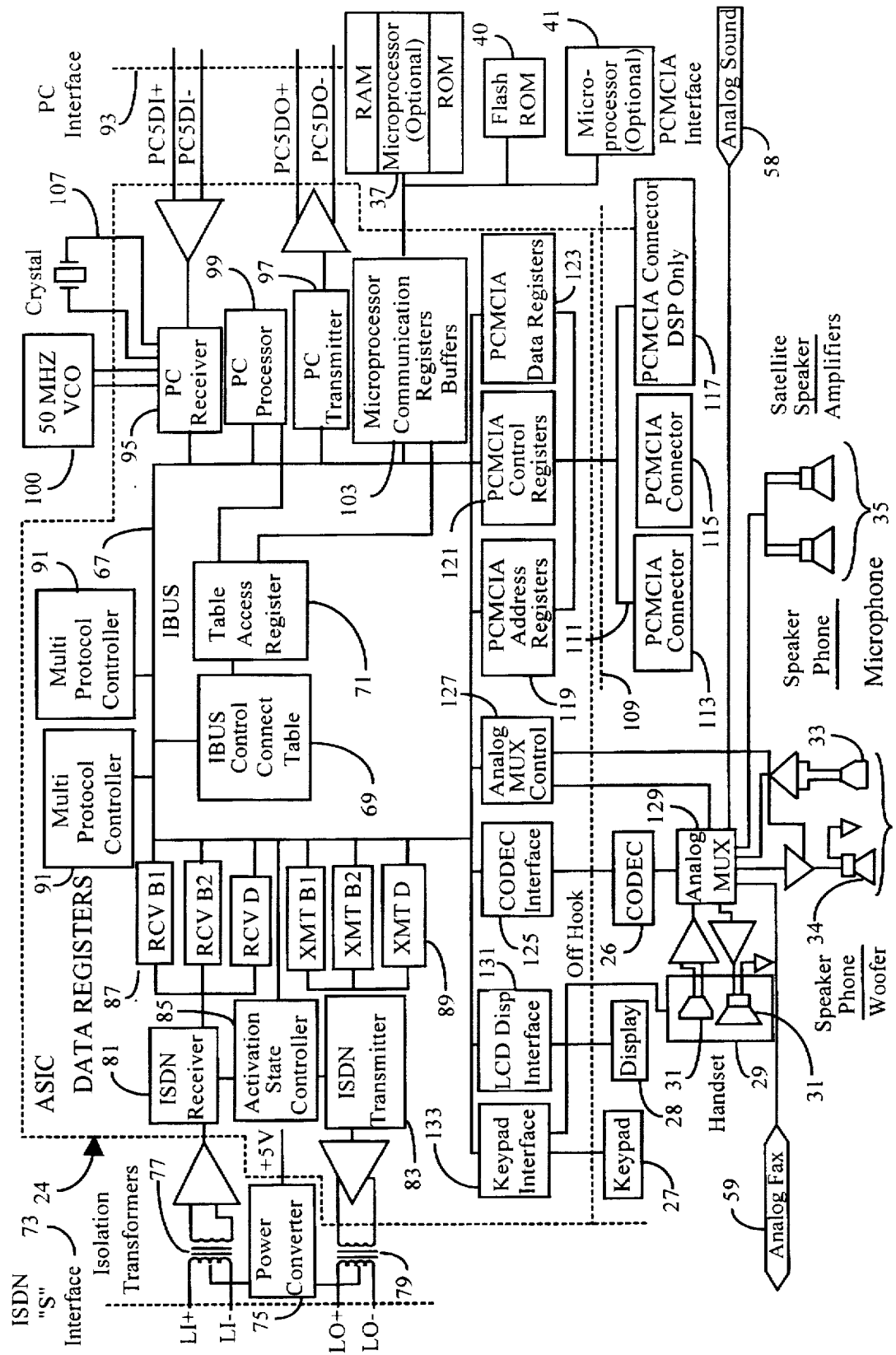
FIG. 7 is a block diagram of an application-specific integrated circuit (ASIC) for a Smart Phone, according to an embodiment of the present invention.

FIG. 7 is an internal block diagram of ASIC 24 of FIG. 4, with the features described relative to FIGS. 3 through 6. Internal communication is via internal bus (IBUS) 67. Use of the internal bus is controlled by a connect table 69, which is configured by an internal or external microprocessor, shown here as part of microcontroller 37. Table access register 71 provides a link for the microprocessor to perform this configuration. ASIC interfaces and components are described below:

ISDN "S" Interface 73. Incoming and outgoing ISDN lines, LI and LO, link PBX 17 with the Smart Phone. An isolated power converter 75 supplies 5-volt dc power. Incoming signals pass through isolating pulse transformer 77 to ISDN receiver 81 and outgoing signals pass from ISDN transmitter 83 to isolating pulse transformer 79. An activation state controller 85 coordinates ISDN receiver and ISDN transmitter activity with the rest of ASIC 24. Receive data registers 87 and transmit data registers 89 temporarily store data for each bearer (B) channel, which can carry any kind of data (digitally encoded voice, FAX, text and numbers) and delta (D) channel, which carries call status and control signals and serves as a third data channel.

Multi-Protocol Controllers 91. One or more multi-protocol controllers 91 provide serial data communications between PC 21 and other data terminal equipment via ISDN interface 73 and PC interface 93. The multi-protocol controllers handle asynchronous and synchronous formats, for example, high-level data link control (HDLC) and synchronous data link control (SDLC). This serial communication hardware, which appears to PC software as a standard PC serial interface register set, permits off-the-shelf communication software to run on the PC without modification.

PC Interface 93. PC receiver 95 and PC transmitter 97 input and output data, respectively, from separate RS-485 data lines, PC serial data in (PCSDI) and PC serial data out (PCSDO). Although separate transmit and receive lines are preferred for high-speed, full-duplex communications, transmit and receive lines, in a variation, might be combined and connected to a single transceiver block in the ASIC. Such a connection would result in fewer wires in the PC interface but with somewhat increased ASIC complexity and decreased communication speed.

PC processor 99 responds to instructions from multi-protocol controllers 91 for disposition of the data and accesses address information from table access register 71 on the bus. A phase-locked-loop (PLL) circuit with high-frequency oscillator (VCO) 100 locks on the PCSDI data stream. This recovered clock is used to clock incoming data and synchronize digital logic of the ASIC with Super I/O chip 45 in the PC, as shown in FIG. 5. Re-clocking PCSDI data in this manner permits operating the PC link at speeds greater than 50 Mbits/second. Very high-speed communication is necessary to permit real-time status reporting to Super I/O chip 45 of some of the attached devices on internal bus 67, for example, micro-protocol controllers 91 and PCMCIA interface 109 cards. Real-time status reporting is needed for software driver transparency. On-board clock 101 runs ASIC digital logic when the PCSDI line is unavailable. Switchover between the two clock sources is done automatically by PC receiver 95.

Microprocessor Interface 103. One or more microprocessors may interface with the ASIC. Location of the microprocessor can vary. For instance, one or more microprocessors could be outside the ASIC, on a separate chip on the circuit board or as part of a DSP module on a PCMCIA card, or a microprocessor could be implemented in the ASIC. In FIG. 7, a chip outside the ASIC contains microcontroller 37 containing a microprocessor, RAM and ROM. Optional microprocessor 41 and flash ROM 40 outside the ASIC connect with microprocessor interface 103 as well. In one variation, a microprocessor 37 in the ASIC, performs limited DSP functions, while another microprocessor in a DSP module, optionally input through PCMCIA interface 109 (see below), might perform more complex functions. Many variations are possible due to modular design.

PCMCIA Interface 109. An expansion bus 111 links PCMCIA connectors 113, 115, and 117 with internal PCM- CIA address registers 119, control registers 121, and data registers 123. PCMCIA connector 117 is reserved for DSP module input, whereas PCMCIA connectors 113 and 115 are general-purpose expansion slots. Access to devices can be made software-transparent by including I/O and memory and address mapping logic in Super I/O chip 45 in the PC. When the Super I/O chip traps an I/O or memory access in a preprogrammed range, the Super I/O chip directs data access to the appropriate PCMCIA device plugged into one of the PCMCIA connectors 113, 115, or 117 (if DSP) of the Smart Phone.

CODEC Interface 125. This interface connects to CODEC circuitry 26, which performs digital conversions on analog signals channeled through an analog multiplexer 129 from phone audio system components and vice versa. The phone audio system includes a handset 29 with microphone 31 and speaker 30 and speakerphone 32 with microphone 34 and speaker 33, and optional satellite speakers/amplifiers 35. An optional analog sound line 58 allows for multimedia expansion, whereas an optional analog fax line 59 permits use of standard, standalone analog-type fax devices. Analog MUX controller 127 on the ASIC bus controls analog MUX 129 activities and provides a low-pass filter for output from speaker 33. A low-pass filter is used when the built-in speaker is employed as a woofer in conjunction with the optional satellite speakers. A speakerphone, although included as part of this embodiment, is not essential to Smart Phone operation. In a simpler variation, phone sound might consist of a single speaker-microphone pair in the handset.

LCD Display Interface 131. This interface to an optional liquid crystal display 28 on the Smart Phone provides a means to visually monitor incoming calls.

Keypad Interface 133. An interface with phone keypad controller 27 provides a means for the Smart Phone to respond to input from DTMF keypad 53 and to function buttons 61. When Smart Phone handset 29 is being used, a signal is sent to keypad interface 133. Keypad interface 133 also controls LED lights 63 on the Smart Phone keypad panel.

FIG. 8 is a tabulation of I/O pin count for one embodiment of the Smart Phone. The number of pins varies, of course, in different embodiments. In summary, a Smart Phone 13 such as that described for FIGS. 3 through 8 has the following features:

Direct PC access to any Smart Phone via high-speed serial RS-485 line with optional, plug-in, specialized interface with modified Super I/O chip.

PBX with digital-type fax and modem that communicates with the Smart Phone through ISDN via a multiprotocol controller.

Modular docking bay on the Smart Phone with PCMCIA slots for DSP upgrades and multimedia expansion.

Software-transparent data communication between Smart Phone components such as multiprotocol communication controllers, PCMCIA I/O, and memory.

Synchronous data link control (SDLC) and asynchronous support.

High-quality analog sound input and mixing for speakerphone.

Standard analog phone device input ports, e.g., fax and modem.

Flash ROM reprogrammable from PC.

Phase-locked loop (PLL) support in ASIC.

A Smart Phone 13 such as that described in FIGS. 3 through 8 may be implemented with various levels of functionality tailored to the budget and needs of the purchaser. A lower-priced, basic Smart Phone model might only have a microprocessor residing inside or outside the ASIC. In addition to a fax/data ISDN line to a PBX, a PC interface and a speakerphone, basic Smart Phone functions can easily be expanded as needed with an inexpensive, low-end DSP chip, such as those currently available from Zilog and Motorola, to add features such as business audio (for tape recording), voice mail (with DTMF detection), data compression and decompression, and data encryption. The DSP can reside on a removable PCMCIA card that is plugged into a designated slot on the Smart Phone.

An upscaled Smart Phone model might add, to the above functions, capabilities for fax transmission and reception and V.32bis data transmission mode, which will require a microprocessor and a high-quality DSP chip, such as those currently available from AT&T, ADI or TI. A top-of-the line Smart Phone product might offer, in addition to all of the above functions, multimedia I/O supported by stereo 16-bit digital/analog and analog/digital conversion.

Figure 9:
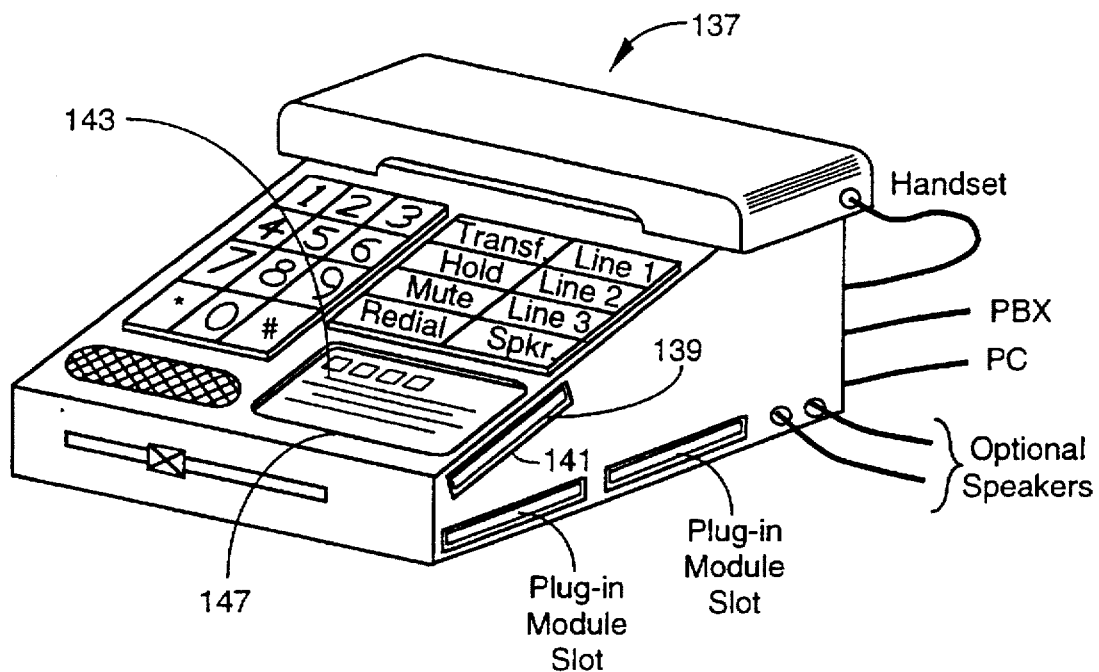
FIG. 9 is an isometric view of an alternative Smart Phone, showing a user interface incorporating a micro-personal digital assistant (μPDA), according to an embodiment of the invention.

FIG. 9 is an isometric view of a Smart Phone 137 according to an alternative embodiment wherein, in addition to the features described for FIGS. 3 through 8, a specialized portable computer unit 139, known to the inventors as a micro-personal digital assistant (μPDA), can be connected through a docking bay 141 with standard PCMCIA pin connectors in the Smart Phone. Such a μPDA 139 is shown docked in FIG. 9.

A typical μPDA user would be a business traveller who requires access to specific software applications such as spreadsheets, travel files with currency converters, fax programs, time zone clocks, address and telephone records, and the like.

A typical μPDA 139, which is about the size of a credit card, is modeled on a standard PCMCIA Type II form. It has a CPU, nonvolatile memory to store control routines for applications and data files, and a display overlaid with a touch-sensitive screen 143.

A physical window 147 in the Smart Phone housing allows touch-sensitive screen 143 to be used while the μPDA is docked. By so doing, a user may employ control routines stored and executable on the μPDA to control the phone system and all of the functions of the Smart Phone. For example, a user may access a list of business or personal contacts, select one, and a simple command will cause a call to be placed, including generating all of the dialing sequence and charge card numbers.

The embodiment of FIG. 9 is just one example of a Smart Phone configuration that can accommodate a μPDA.

Figure 10:
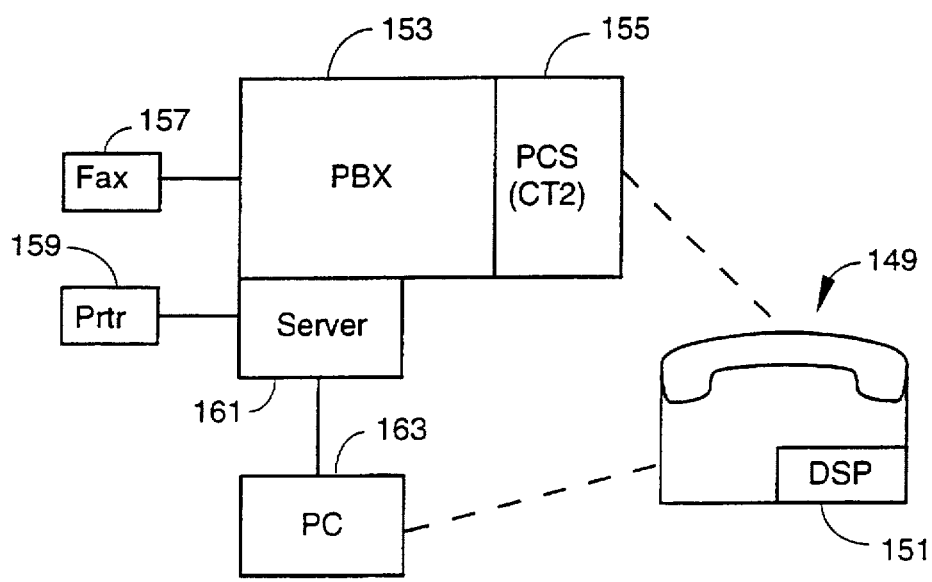
FIG. 10 is a block diagram of a cordless Smart Phone in an alternative embodiment of the invention.

FIG. 10 is a block diagram of a cordless Smart Phone 149 with interchangeable DSP module 151, according to an alternative embodiment of the invention. Cordless Smart Phone 149 has essentially the same features as the embodiments described above, and is capable of performing the same functions as those described for corded Smart Phone 13 in FIGS. 3 through 8. In addition, the user of a cordless Smart Phone 149 has the freedom to move about a room while using the device. In the cordless embodiment, a transceiver transmits and receives radio signals to and from a local PBX 153 through a miniature antenna inside the Smart Phone device.

Phone-PBX communications in the FIG. 10 example are through a personal communication system (PCS) with cordless telephony interface 155, such as well-known standard CT2. PBX 153 has optional fax 157 and printer 159 connections. A file server 161 is connected to PC 163 via a logical link through the PBX. For instance, a user might select a number to dial on the PC and the PBX will dial the number on the Smart Phone. One or more enhanced features on PCMCIA cards, including an optional DSP module, are plugged into PCMCIA docking bays located in the base or some other suitable location on the cordless Smart Phone unit.

As with the corded Smart Phone embodiment in FIGS. 3 through 8, one or more additional docking bays could feasibly be added to cordless Smart Phone 149, either as built-in or separate, mechanically attached units, to accommodate future PCMCIA card expansion needs. In a variation, a docking bay 141 for a µPDA device 139, as described for an alternative embodiment in FIG. 9, might be provided.

Micro-Personal Digital Assistant Descriptions

Various embodiments of a µPDA device are described below, in many forms which may be combined with a smart phone as described above, to provide DSP capability and additional functionality to such a smart phone.

FIG. 11A is an isometric view of a µPDA 1010 according to an embodiment of the present invention. In this embodiment the unit is modeled on the PCMCIA standard Type II form factor, having a height D1 of about 5 mm. Body 1012 is described in further detail below, and has a female portion 1014 of a connector recessed at one end for engaging a mating male portion of the connector in a host computer, connecting the µPDA internal circuitry directly with a host internal bus. The host unit may be a notebook computer having a docking bay for the µPDA. Docking bays may be provided in desktop and other types of computers, and even in other kinds of digital equipment, several examples of which are described below.

Still referring to FIG. 11A, in this embodiment there is a combination I/O interface 1016 implemented on one side of the µPDA, comprising a display overlaid with a touch-sensitive planar structure providing softkey operation in conjunction with interactive control routines operable on the µPDA in a stand-alone mode.

Although not shown in FIG. 11A, there may also be guides implemented along the sides of the case of the device for guiding the module in and out of a docking bay in a host computer unit. There may also be one or more mechanical features facilitating engagement and disengagement of the module in a docking bay.

FIG. 11B is a top plan view of the µPDA of FIG. 11A, showing a thumbwheel 1018 implemented in one corner of the µPDA. The thumbwheel in this embodiment is an input device capable of providing input with both amplitude and directional characteristics, and in some cases rate characteristics as well. The thumbwheel has many uses in combination with the µPDA and I/O interface 1016. One such use is controlled scrolling of icons, characters, menus, and the like on the display of the device. The thumbwheel provides many of the functions of a pointer device.

In this embodiment of the µPDA a second external connector portion 1020 is provided. This connector portion is for engaging peripheral devices as part of an expansion bus interface.

Figure 12:
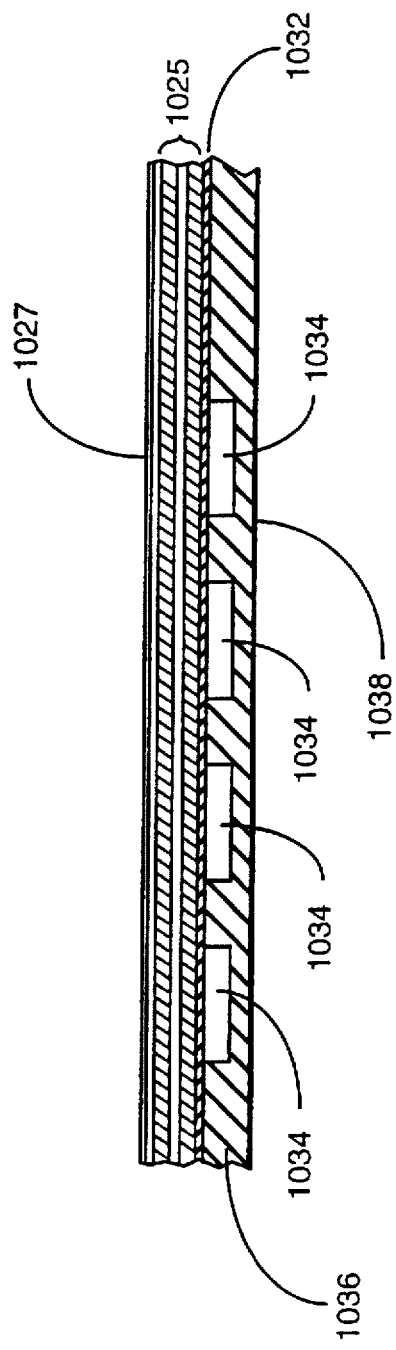
FIG. 12 is a cross-sectional view of the μPDA of FIGS. 11A and 11B.

FIG. 12 is a simplified cross-sectional view of a means for constructing a µPDA according to the present invention in a Type II PCMCIA, or other relatively small package. ICs 1034 are encapsulated in a conformal material 1036, and interconnection is accomplished by traces on a flexible polymer film 1032 shown as overlaying the encapsulated structure. In this structure the ICs are not packaged in the conventional manner having solder leads for assembly to a printed circuit board. Rather, connections are made directly between the solder pads on the chip and the traces on the Kapton film. Also there is no intention to relate ICs indicated by element No. 34 with specific functional ICs in a µPDA. This cross-section is illustrative of a method of construction only.

In this compact construction there may also be traces on the side of film 1032 away from the interconnections for the CPU and memory for connection to other elements, such as display 1025 and touch-sensitive screen 1027.

LCD display 1025 is implemented on one side of the µPDA, and touch-sensitive interface 1027 is provided overlaying at least a portion of the LCD display. A metal casing 1038, or other suitable material or combinations of material, surrounds the internal components and conforms to Type II PCMCIA form factors. This simplified cross-section illustrates some of the principles of construction that can allow the needed components to be inexpensively fitted into the small form factor needed. In another embodiment the µPDA is implemented in the form factor of a type III (10 mm thick) PCMCIA unit, using relatively conventional technology, such as PCB technology, rather than the encapsulated construction described immediately above. Various other constructions, form factors, and combinations are possible, as well.

Figure 13:
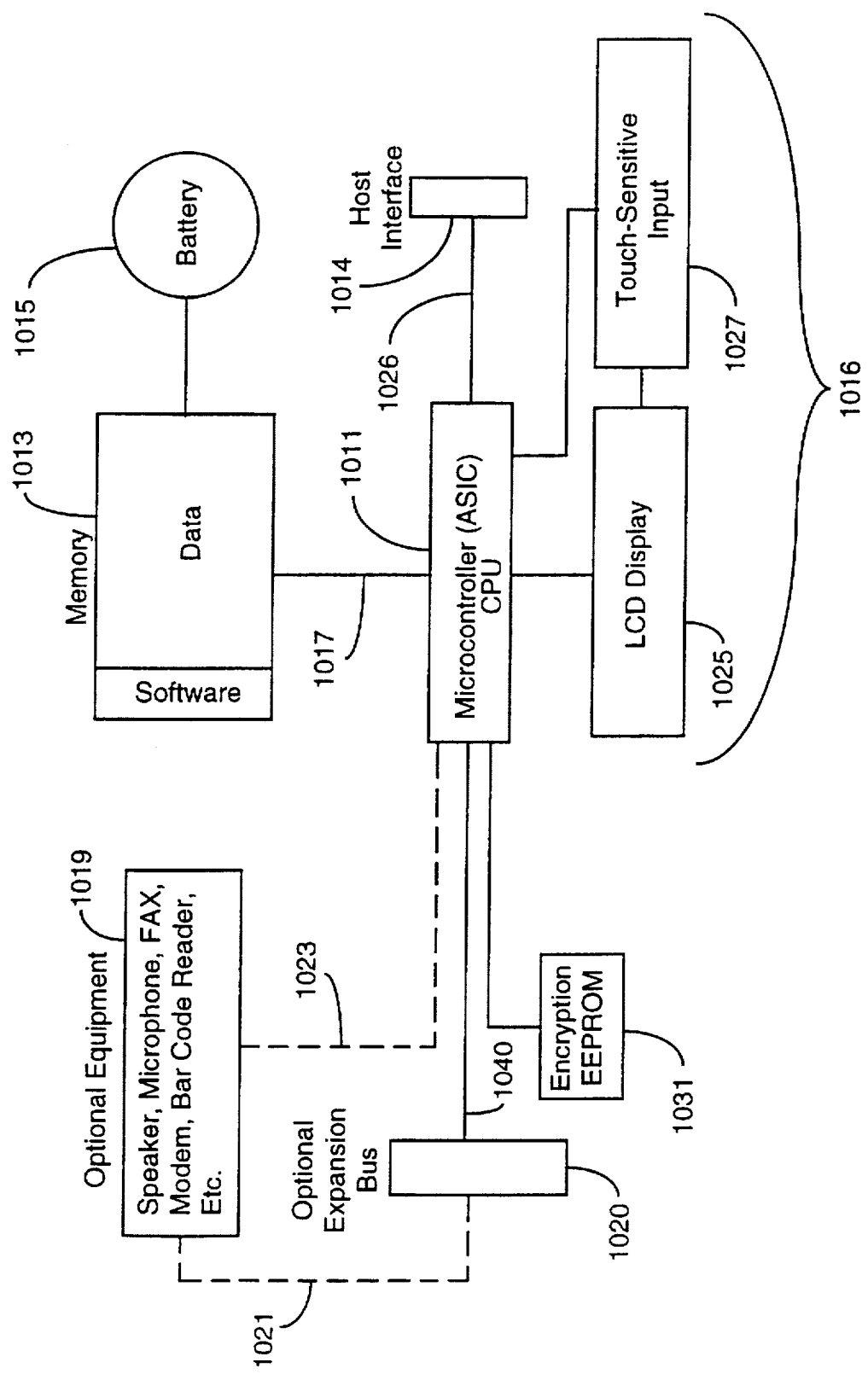
FIG. 13 is a block diagram of the PPDA of FIG. 11A and some peripheral elements.

FIG. 13 is a simplified electrical block diagram of the µPDA of FIGS. 11A, 11B and 12. A unique microcontroller 1011 acts as the CPU of the µPDA in the stand-alone mode. that is, when the µPDA is not docked in a host unit. When the µPDA is docked in a host computer, microcontroller 1011 acts as a slave unit, granting bus control to the CPU of the host. In docked mode, the CPU of the host thus gains control of the memory contents of the µPDA, subject in most cases to security procedures which are described below. Thus the host computer can transfer data and software into and out of a docked µPDA memory. In other embodiments many other cooperative operating modes may be accomplished between the two CPUs and accessible memory devices.

Memory 1013 is preferably a nonvolatile device from 1 to 2 megabytes in this embodiment, and both control routines for applications and data files are stored in this memory. Memory 1013 may be flash memory, CMOS ROM, CMOS RAM with battery, or a combination, with the software stored in ROM and the data in the flash memory. The memory device is interfaced to microcontroller 1011 via a dedicated bus structure 1017, and microprocessor 1011 is configured to drive memory bus 1017.

A battery 1015 is the power source in the stand-alone mode, and may be recharged in one or more of several ways. The power traces are not shown in FIG. 13, but extend to all of the powered devices in the µPDA module. When the unit is docked in the host, the host power source may be connected to pins through the host interface to recharge the battery. Alternatively, an attached means such as a solar panel may be configured to charge the battery and/or provide power to the µPDA. A solar panel for power is described elsewhere in this disclosure. Also the battery may be easily removed for periodic replacement.

Host bus connector 1014 is a part of a host interface which comprises a bus structure 1026 for providing connection to the host in docked mode, as described above. In a preferred embodiment, the host interface is according to PCMCIA Type II, Rev. 3 standard, which is capable of communication either in PCMCIA mode or in a mode similar to PCI mode. PCI mode refers to a high-speed intermediate bus protocol being developed by Intel corporation, expected to become a standard bus architecture and protocol in the industry. The physical interface at the host in this embodiment is a slot-like docking bay, as is typical of know docking bays for PCMCIA devices. This docking bay may be implemented as a docking box, a built-in unit like a floppy-drive unit, or it may take some other form.

Connector portion 1020 is a part of the expansion bus interface described above, comprising a dedicated bus structure 1040 connected to microcontroller 1011. This interface can be implemented in a number of different ways. The purpose of the optional expansion bus interface is to connect to optional peripheral devices, such as a printer, a FAX modem, a host cellular phone, and others. The expansion bus interface is not an essential feature in a minimum embodiment of the present invention, but provides vastly enhanced functionality in many embodiments.

The expansion interface can take any one of several forms. A preferred form is an extended enhanced parallel port and protocol based on an invention by the present inventors disclosed in a copending patent application. Another form is an indexed I/O port having 8-bit address and 8-bit data capability. The requirement of the expansion port is that the connection and communication protocol be compatible with expansion devices, such as telephone modems, fax modems, scanners, and the like. Many other configurations are possible.

Optional equipment such as devices listed in box 1019 may be connected for use with the μPDA through the expansion bus. Selected ones of such devices may also be built in to the μPDA in various embodiments, providing variations of applicability. In the former case, connection is through path 1021 and the expansion bus interface via connector portion 1020. In the built-in case, connection is in the interconnection traces of the μPDA as indicated by path 1023.

I/O interface 1016 (also FIG. 11B) is for viewing μPDA application-related data and for touch-sensitive input via softkeys. By softkeys is meant assignment by software of various functions to specific touch sensitive screen areas, which act as input keys. Labels in I/O interface 1016 identify functionality of the touch-sensitive areas in various operating modes according to installed machine control routines. LCD display 1025 and the touch-sensitive area 1027 together form the combination I/O interface 1016 described also above.

In some embodiments of the present invention, data and program security is provided comprising an Electrically Erasable Programmable Read Only Memory (EEPROM) 31, which is connected by dedicated communication lines to microcontroller 11. EEPROM 1031 holds one or more codes installed at the point of manufacturing to provide security for information transfer between a host and a μPDA. The purpose is to control access by a host to the memory contents of a μPDA, so each μPDA may be configured to an individual. To accomplish this, docking and bus mastering machine control routines are initiated at the point of docking, and this security process is described in more detail below. In other embodiments, security codes may be provided by a Read Only Memory (ROM) chip or other permanent or semi-permanent memory source.

Figure 14:
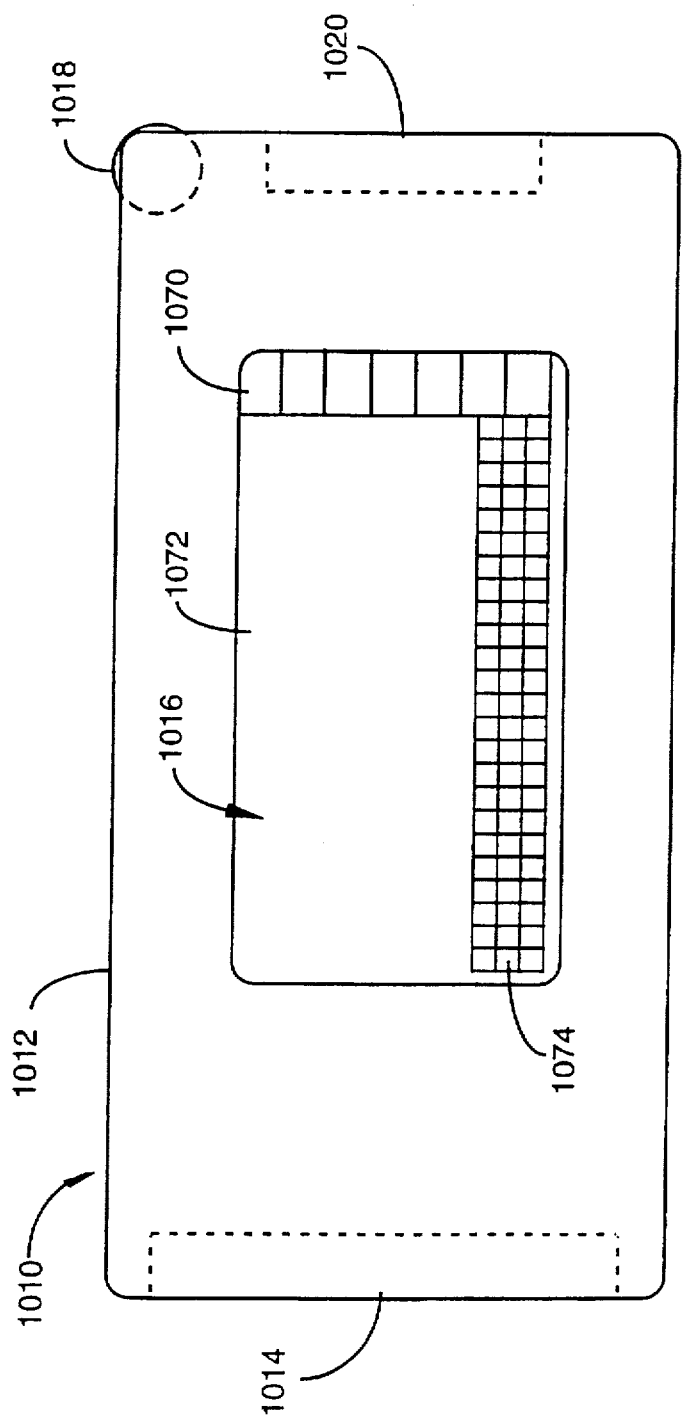
FIG. 14 is a more detailed plan view of the μPDA of FIG. 11A showing in particular an LCD display and touch screen user interface in an aspect of the present invention.

FIG. 14 is a plan view similar to FIG. 11B, of a μPDA, showing in particular I/O interface 1016. The size and location of I/O interface 1016 may vary, but in general occupies a major portion of one of the sides of the module. In one embodiment I/O interface 1016 comprises an LCD display with a resolution of 256 by 144 pixels in a screen size that displays 32 by 12 characters. Each character in this embodiment is displayed in an area eight pixels wide and twelve pixels high. In another embodiment, the pixel resolution is 320 by 200, which corresponds to 40 by 16 characters.

The touch-sensitive areas of the touch-sensitive screen correspond to the character areas of the display. By touching an area with a finger or stylus, data can be entered quite quickly and with minimal CPU demand.

At one corner, thumbwheel 1018 provides a two-directional means of controlling the configuration of the display according to installed control routines. A menu 1070 is configured at one side to represent the current status of any application in progress and to provide appropriate user menu selections. In a preferred embodiment input from thumbwheel 1018 is used for scrolling through menu 1070, and active areas may be indicated by a cursor. A user makes a menu selection by pressing the appropriate touch-sensitive area. A specific input may be provided to cause the menu area to be displayed on either side of the display according to a user's preference.

Specific characters are displayed in this embodiment in a region 1074, with each character area associated with a touch-sensitive input area. As region 1070 dedicated to selectable characters is much too small to display all characters of a standard keyboard, input from thumbwheel 1018 allows a user to pan region 1074 displaying an entire virtual standard keyboard. Movement of thumbwheel 1018 in one direction pans the character region horizontally, and movement in the other direction pans the character region vertically. When an end is reached the window pans onto the virtual keyboard from the other end. In this manner, a user may quickly pan the character window to display an entire standard keyboard, and make selections with a finger or a stylus. Of course, it is not required that a virtual keyboard be laid out for access in the format of a standard keyboard. Characters and punctuation, etc., could just as simply be displayed in a single strip along a region of the display, and scrolled by input from the thumbwheel or other pointer-type input device.

In this embodiment, to avoid delays caused by panning, if the thumbwheel is rotated quickly the character window jumps rather than scrolling to speed up the interface. In addition, menu 1070 may optionally provide for a character display in different fonts and sizes, although a single font is preferred to minimize memory demand. It will be apparent to those with skill in the art that there are many alternatives for character selection and display, and many ways thumbwheel 1018 may be configured to allow for scrolling and panning.

A document window 1072 is provided in this embodiment at the top or bottom of I/O interface 1016. A cursor locates the active position within the document for editing purposes. Menu 1070 provides selection of available fonts, and input by thumbwheel 1018 controls cursor movement over the document. As a document will in almost all cases be much larger than the display capability of region 1072, it is necessary to pan the document window in essentially the same manner as the keyboard window is panned. For example, rotating thumbwheel 1018 in one direction may display horizontal strips of a document, while rotating the thumbwheel in the opposite direction moves the window vertically strips of the same document.

A soft key or optional hard key may be configured to switch between the document and keyboard window, and the same or another key may be configured to switch between scrolling left or right, up or down, document or keyboard. A switch key may be used to change the thumbwheel mode of operation. A switch key may also be used in combination with a floating pointer to select characters and menu items. In this embodiment, the user can keep his or her hands relatively stationary on just the thumbwheel and the switch key, making all possible selections. Use of a switch key in combination with a floating pointer facilitates the use of small fonts. A switch key may also be incorporated as an additional hard key in a convenient location on case 1012.

It will be obvious to a person skilled in the art than there are numerous ways to combine menu selections, switching keys and I/O configurations to provide a user-friendly user interface. A further embodiment of the present invention provides an I/O set-up application wherein a user may completely customize features of I/O area displays.

There are other sorts of mechanical interfaces which may be used to provide pointer-style input in different embodiments of the invention as alternatives to the thumbwheel disclosed. One is a four-way force-sensitive mouse button and a selector button, which may be located at opposite ends of case 1012 below I/O interface 1016. Each button is designed to be operated by one finger. The four-way force-sensitive mouse button can provide menu scrolling of a cursor and panning and/or indexing of keyboard and document windows, while the selector button is used to select and edit according to position of a cursor. This configuration minimizes hand movement and keeps the I/O area clear for viewing.

Implementation of thumbwheels, pressure-sensitive switches and buttons, and the like, are known in the art, including the translation of mechanical motion and pressure to electrical signals and provision of such signals to a microcontroller. For this reason, details of such interfaces are not provided in this disclosure. Combinations of such inputs with displays and input areas may, however, be considered as inventive.

Figure 15:
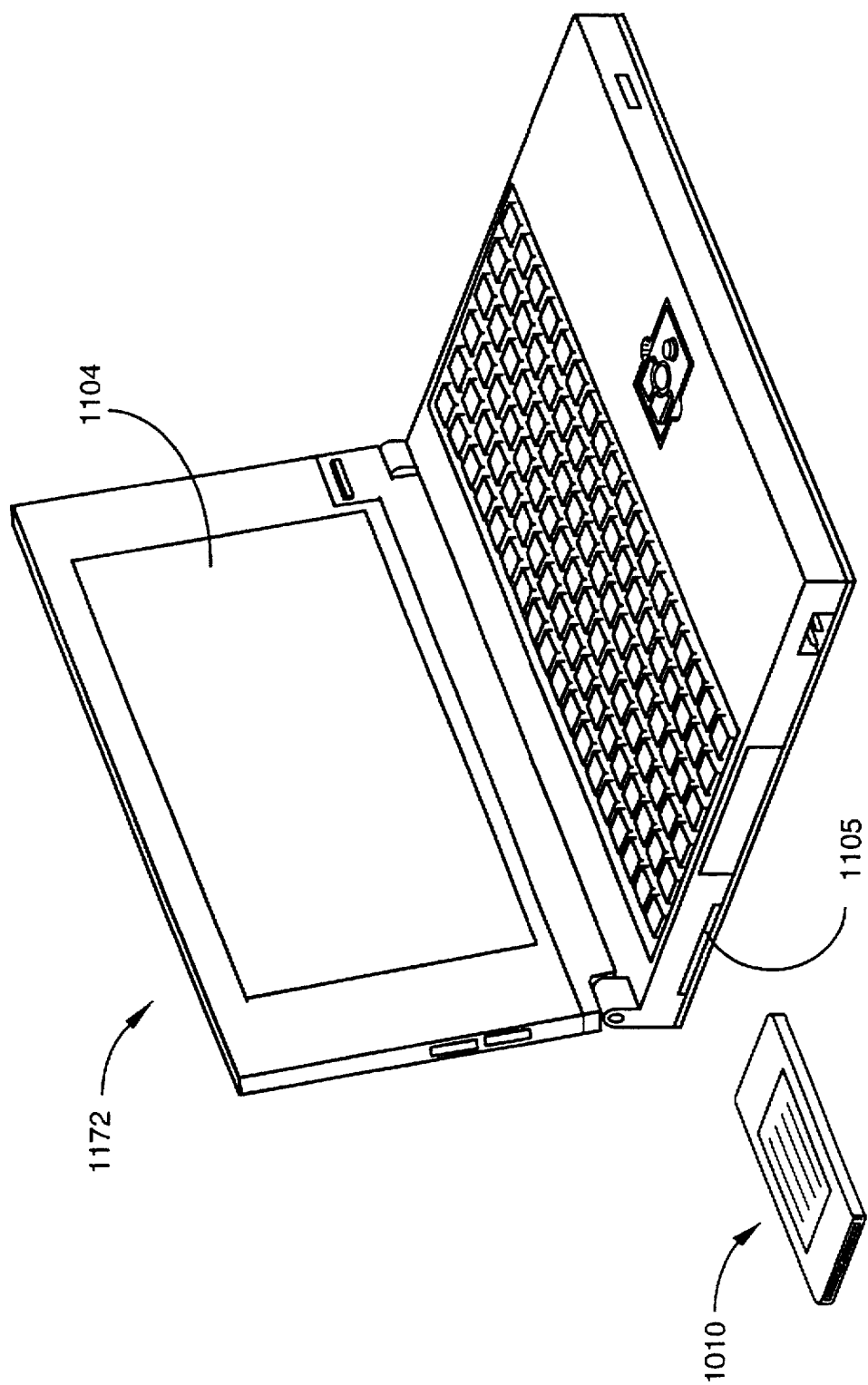
FIG. 15 is an isometric view of a μPDA and a host notebook computer in an aspect of the present invention, with the μPDA about to be docked in a docking bay of the notebook computer.

FIG. 15 is an isometric drawing of a μPDA 1010 in position to be docked in a notebook computer 1172 via a Type II PCMCIA docking port 1105 according to an embodiment of the present invention. As further described below, once the μPDA is docked, it is activated and a procedure is initiated with the host computer to manage communication and verify memory access rights (security).

Access rights are considered important by the inventors for a number of reasons. Firstly, through the expedient of one or more specific codes, unique to each μPDA, a user may protect files stored in his module from access by unauthorized persons. The code can be used both to control access to data and files via I/O interface 1016, and also through the host bus interface, so data and files may be secure from access by an unauthorized host system.

In the former case, when a μPDA is powered up, an application routine can query the user for an access code to be entered at I/O interface 1016 (FIG. 14). If the code is not entered properly, access is denied, and power goes off. Codes for the purpose are stored in EEPROM 31 (FIG. 13), or in whatever ROM device may be devoted to the purpose. In some embodiments, the code may by mask-programmed at manufacture, so it is not alterable. In others, the code may be accessible and changeable by special procedures in the field.

In the case of host communication, it is possible that a portable or desktop computer, or some other device, may have a docking port physically configured to receive a μPDA, yet not be configured to communicate with the μPDA. This certainly might be the case where the μPDA is in the PCMCIA form. For purposes of disclosure and description, this specification terms such a unit a generic host. If the unit is configured to communicate with a μPDA it is an enabled host. If a host is configured for full access to a particular μPDA, it is a dedicated host.

If a docking unit is a generic host, there will be no communication unless the person presenting the μPDA provides the control routines to the host. This may be done for a generic host such as by transfer from a floppy disk, from a separate memory card through the docking port, or, in some embodiments, the communication software may be resident in memory 1013 (FIG. 13) of a docked μPDA, transferrable to the host to facilitate further communication.

If the docking unit is in fact an enabled host, or is configured after docking to be an enabled host, the stored code or codes in EEPROM 1031 (or other storage unit) may be used to verify authorization for data and program transfer between the host and a μPDA. In one embodiment this procedure is in the following order: First, when one docks a μPDA in a compatible docking port, certain pin connections convey to both the μPDA microcontroller and to the host CPU that the module is docked. Assuming an enabled host, the fact of docking commences an initialization protocol on both systems.

In most embodiments, if the docking unit is a non-host, that is, it is not capable of communication with the docked module, nothing happens, and the user may simply eject the docked module. If the computer is an enabled host, an application is started to configure host access to the μPDA's data files through the μPDA microcontroller. A user interface, described more fully below for a particular embodiment, is displayed on the host monitor 1104 (FIG. 15). The host interface menu, as well as other application menus, may be formatted in part as a display of the μPDA I/O interface 1016 as seen in FIG. 14 and described in accompanying text. In some embodiments, the docked μPDA can be operated in situ by manipulating the input areas of the μPDA displayed on the host's screen.

If the host is not a home unit for the docked module, that is, the host does not have matching embedded ID codes to those stored in the docked module, a visitor protocol is initiated. In this event, a visitor menu is displayed on host display 104 for further input, such as password queries for selections of limited data access areas in the docked module. In this case, too, a user may gain full access to the docked module's memory registers by entering the proper password(s).

If the host is a fully compatible host home unit, full access may be immediately granted to the host to access memory contents of the docked module, including program areas; and both data and programs may be exchanged.

In any case, when the μPDA is ejected or otherwise removed from the docking port, the on-board module microcontroller again gains full control of the internal μPDA bus structures.

Figure 16:
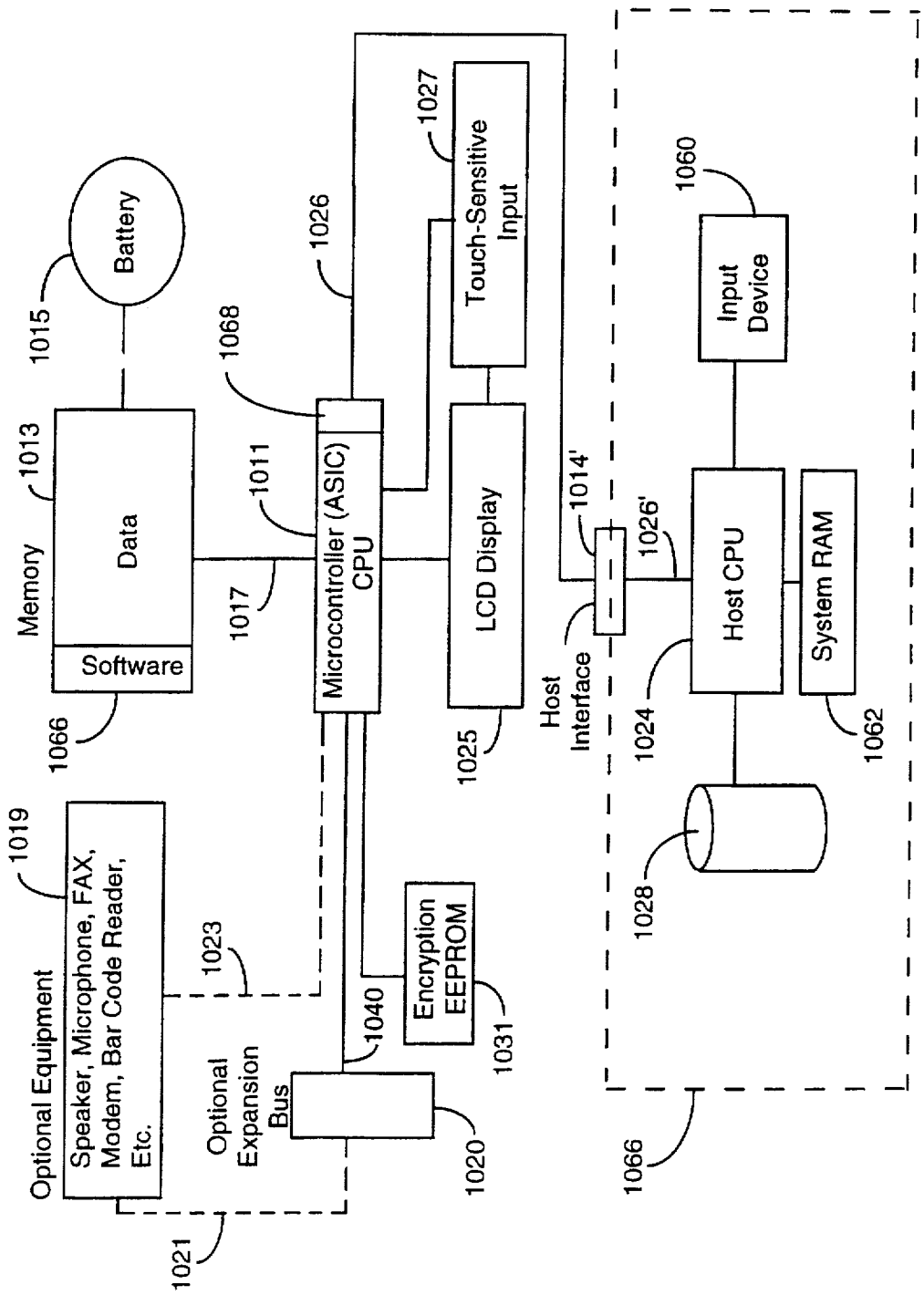
FIG. 16 is a block diagram of a μPDA docked in a docking bay of a host computer according to an embodiment of the present invention.
Figure 17:
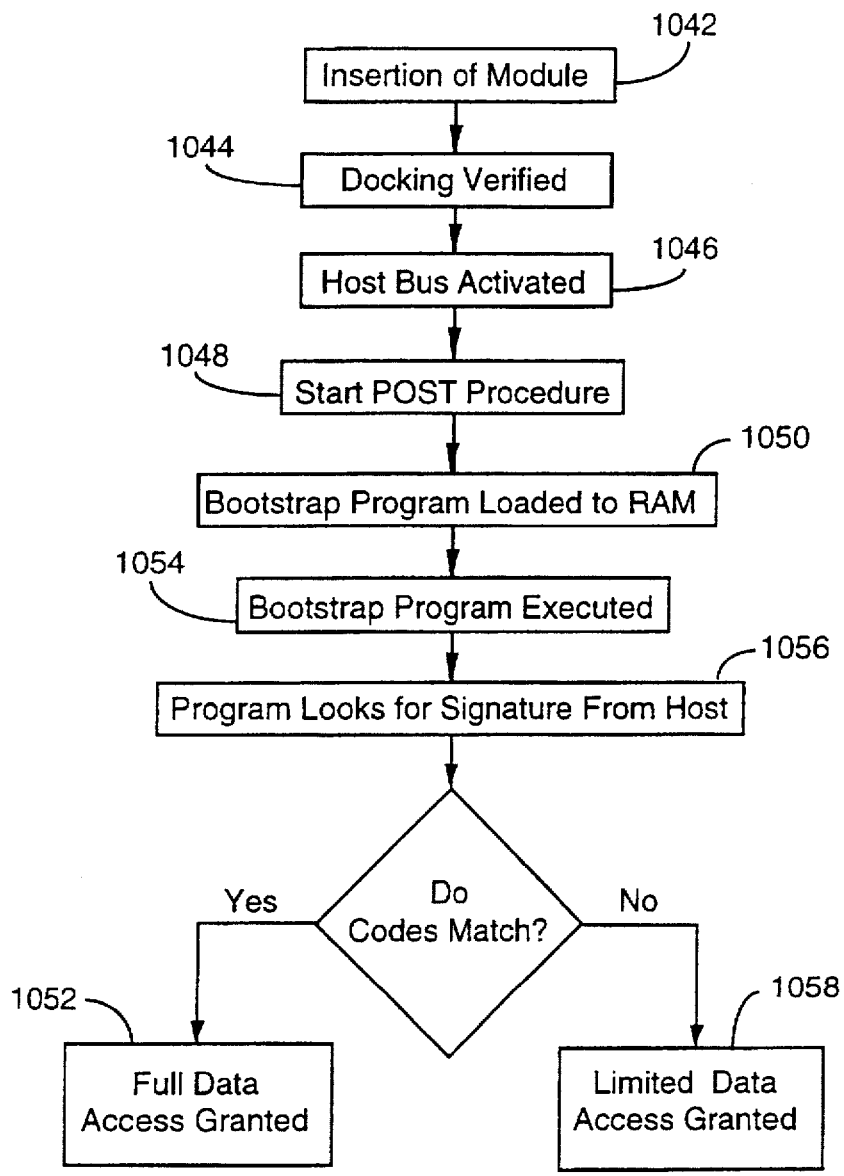
FIG. 17 is a logic flow diagram of the steps in docking a μPDA in a host computer according to an embodiment of the present invention.

FIG. 16 is a simplified block diagram of a μPDA docked in a host computer, and FIG. 17 is a basic logic flow diagram of the steps involved in docking a μPDA in a host computer 1066 according to an embodiment of the present invention. Host computer 1066 is represented in a mostly generic form, having a host CPU 1024, an input device 1060, such as a keyboard, a mass storage device 1028, such as a hard disk drive, and system RAM 1062. It will be apparent to those with skill in the art that many hosts may have a much more sophisticated architecture, and the architecture shown is meant to be illustrative.

When a μPDA unit is docked, connector 1014' in FIG. 16 comprises portion 1014 shown in FIGS. 11B and 13 and a mating connector portion for engaging portion 1014 in port 1105 (FIG. 15). The engagement of the separate portions of the connector cause bus 1026 in the µPDA and bus 1026' in the host to become directly connected. There is then a direct bus path between microcontroller 1011 and host CPU 1024 (FIG. 16).

As previously described there is a pin configuration (not shown) in connector 1014 dedicated to signalling that a module is docked. In FIG. 17, step 1042 represents insertion of a µPDA module into the docking port. At step 1044 the signalling pin configuration signifies physical docking is accomplished. At step 1046 host interface bus 1026 is activated, including the mated host bus 1026' in the host.

At step 1048 (FIG. 17) microcontroller 1011 in the µPDA starts a preprogrammed POST procedure. Microcontroller 1011 in this embodiment has a page of RAM 1068 implemented on the microcontroller chip. In other embodiments RAM may be used at other locations. At step 1050, the POST routine loads a bootstrap program to RAM 1068, which includes a code or codes for security matching. This code or codes comprise, for example, a serial number.

At step 1054 the bootstrap program begins to execute in microcontroller 1011, and at step 1056 the microcontroller looks for a password from the host on host interface bus 1026 (FIG. 16).

The fact of docking, assuming an enabled or dedicated host, also causes a communication routine, which may be accessed from, for example, mass storage device 1028 at the host, to display a user interface on monitor screen 1104 of the host unit, as partly described above. It is this communication program that makes a generic host an enabled host.

Assuming an enabled, but not dedicated, host, the user interface will query a user for input of one or more passwords, after successful entry of which the host will pass the input to microcontroller 1011 for comparison with the serial number and perhaps other codes accessed from EEPROM 1031 in the bootstrap of the µPDA.

According to the codes passed from the host to the docked module, microcontroller 1011 will allow full access to memory 1031 at function 1052, FIG. 17, for the host CPU, or limited access at some level at function 1058, defined by received codes (or no matching code at all).

The access protocols and procedures allowing partial or direct access to µPDA memory 1013 are relatively well known procedures in the art, such as bus mastering techniques, and need not be reproduced in detail here. In addition to simple comparison of codes, there are other techniques that may be incorporated to improve the integrity of security in the communication between a µPDA and a host. For example, within the limitation of storage capacity of the EEPROM or other nonvolatile source, executable code might also be uploaded to onboard RAM 1068, or code keys to be used with executable code from other sources, or relatively simple maps re-allocating memory positions and the like, so each µPDA may be a truly unique device.

There are additional unique features provided in one aspect of the invention as part of the communication routines introduced above. One such feature is automatic updating and cross-referencing of existing files and new files in both computers, under control of the host system, with the host having direct bus access to all memory systems. Auto-updating has various options, such as auto-updating by clock signature only, flagging new files before transfer, and an editing means that allows the user to review both older and newer versions of files before discarding the older in favor of the newer. This automatic or semiautomatic updating of files between the satellite and the host addresses a long-standing problem. The updating routines may also incorporate a backup option to save older files.

Another useful feature in host/µPDA communication is a means for a user to select and compose a mix of executable program files for downloading to a µPDA, either replacing or supplementing those executable routines already resident. A user can have several different program lists for downloading as a batch, conveniently configuring the applicability of a µPDA among a wide variety of expected work environments.

Such applications as databases, spreadsheets, documents, travel files such as currency converters, faxing and other communications programs, time clocks, address and telephone records, and the like, may comprise customized lists of user-preferred applications.

In another embodiment, an undocked µPDA can transfer data via the optional expansion bus 1040 (FIG. 13) directly to a host. In the special case of a µPDA user without access to a PCMCIA interface on his host (notebook or desk-top) computer, he or she can connect to a host via an auxiliary port on the host, such as a serial port, via the expansion bus interface. In this case, the µPDA still requests password(s) from the host, and controls access to its on-board memory according to the password(s) received.

The optional expansion interface may also be used in some embodiments while a µPDA is mastered by a host, wherein the host may effectively send data through the bus structures of the µPDA.

Software Vending Machine:

In a further aspect of the invention, a Software Vending Machine with a very large electronic storage capacity is provided, wherein a µPDA user may dock a module and purchase and download software routines compatible with the µPDA environment.

Figure 18:
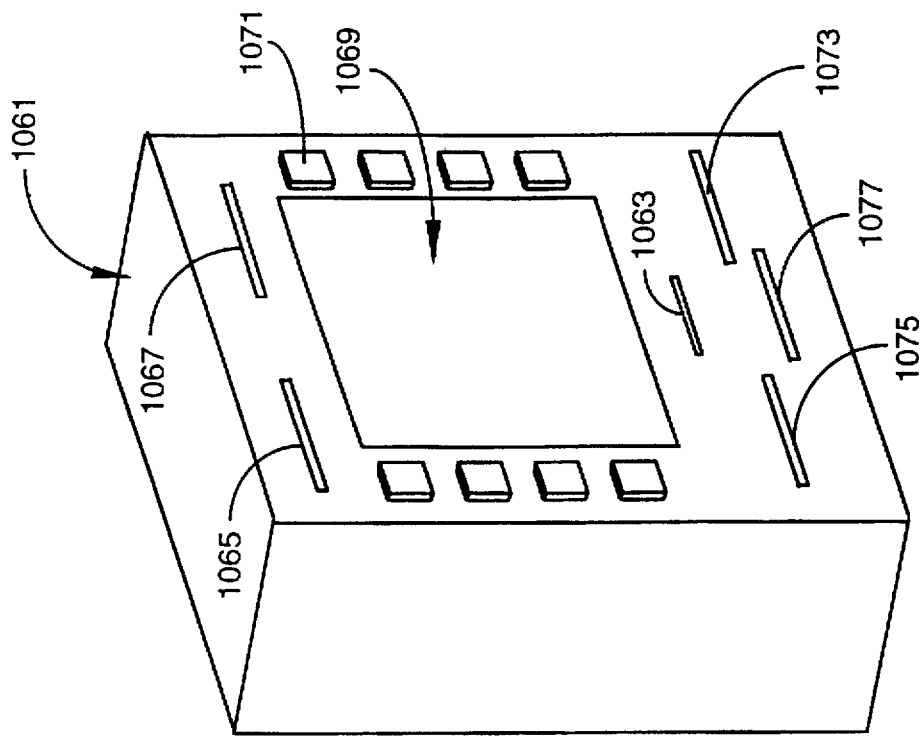
FIG. 18 is an isometric illustration of a μPDA software vending machine in an aspect of the present invention.
Figure 19:
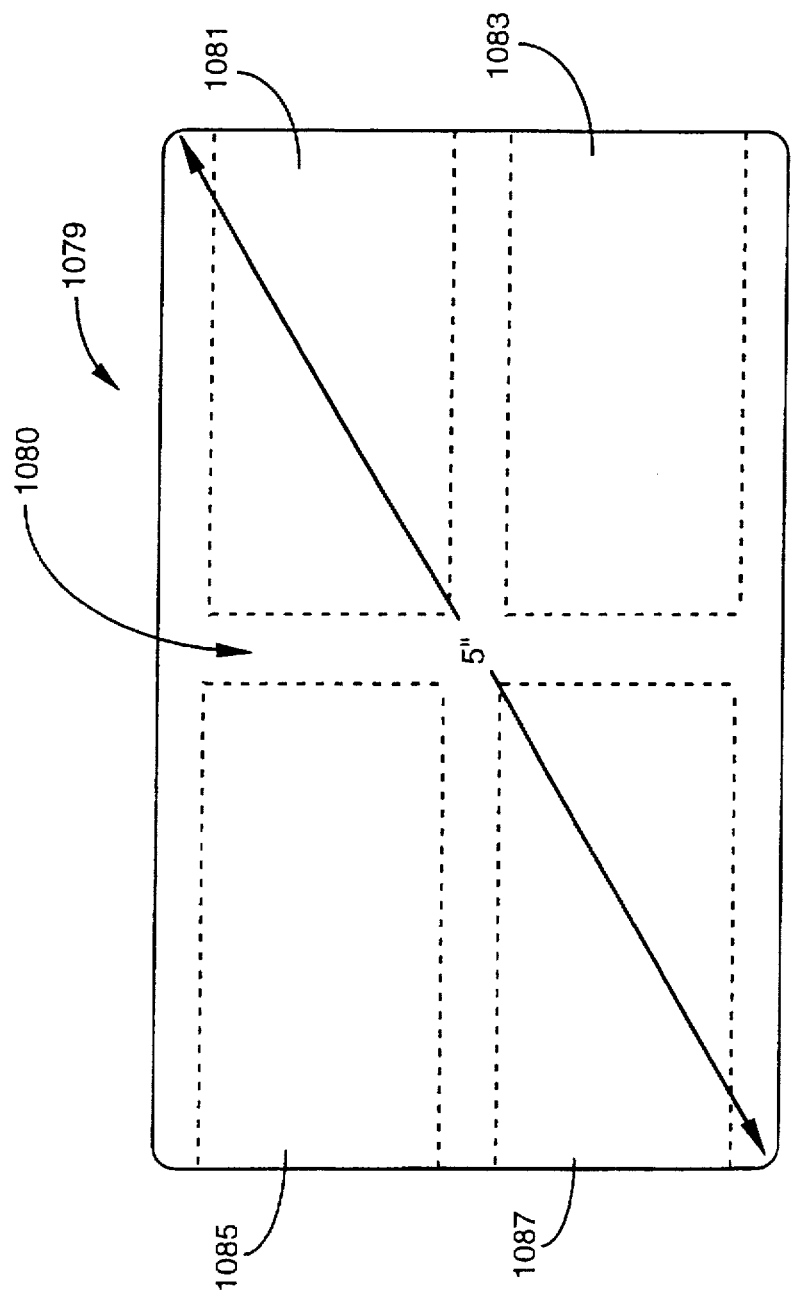
FIG. 19 is a top plan view of a μPDA enhanced user interface according to an embodiment of the present invention.

FIG. 18 is an isometric view of such a vending machine 1061 having a docking bay 1063 for a µPDA, a credit card slot 1065, and a paper money slot 1067. A display 1069 provides a user interface for reviewing and purchasing software from the vending machine, along with selector buttons such as button 1071 along the sides of the display. In an alternative embodiment the display may also have a touch screen, and may, in some embodiments, emulate the µPDA I/O area on a larger scale.

In operation, a user may, in this embodiment, review software for sale simply by docking his µPDA unit in the vending machine and selecting from a menu on display 1069. The menu may allow the user to browse all available applications, or list new applications since entered dates. The user can select certain applications, try them out, at least in simulation, and then select applications to purchase.

The vending machine, once all the requirements are met, such as proper identification and payment, copies the selected application(s) to the memory of the µPDA, or, alternatively, to a floppy disk provided by either the user or the vending machine. In this case there is also a floppy disk drive 1073 in the vending machine and a port 1075 for dispensing formatted floppies for a customer to use in the disk drive. This mode is useful for the instances where a user's µPDA is loaded beyond capacity to receive the desired software, or the user simply wishes to configure the software mix himself from his or her own host computer.

There may also be provided a backup option so a user may instruct the vending machine to read and copy all or a selection of his files to one or more floppy disks before installing new files or data.

As described above, each user's µPDA includes an EEPROM or other storage uniquely identifying the µPDA by a serial number or other code(s), so the vending machine may be configured in this embodiment to provide the software in one of several modes.

A user may buy for a very nominal price a demo copy of an application, which does not provide full capability of the application, but will give the user an opportunity to test and become familiar with an application before purchase. Also, the user may buy a version of the same application, configured to the ID key of the µPDA to which it is loaded, and operable only on that µPDA. In another embodiment, the software is transferable between a family of keyed µPDAs, or has the ability to "unlock" only a limited number of times. In these cases, the applications would be sold at a lesser price than an unlocked version. The unlocked version works on any µPDA and/or host/µPDA system. The higher price for the unlocked version compensates for the likelihood of unauthorized sharing of the vended applications.

The vending machine could also offer a keyed version, customized to operate only on the µPDA docked in the software vending machine, or upon a family of µPDAs. This keyed version is possible because of the individual and unique nature of each µPDA, which has, at a minimum, a unique serial number, and may also have other security programming, as described above, which allows a vending machine to prepare and download a customized copy of an application that will operate only on the particular module for which it is purchased.

There are a number of different means by which unique correspondence might be accomplished, as will be apparent to those with skill in the art. A standard version stored in the memory facility of a vending machine might be recompiled, for example, on downloading, using a unique code from the docked or identified µPDA as a key in the compilation, so only the specific µPDA may run the program by using the same unique key to sequence the instructions while running. The key for scrambling or otherwise customizing an application might also comprise other codes and/or executable code sequences stored uniquely in a µPDA.

In yet another aspect related to the vending machine, there is a printer outlet 1077 which prints a hardcopy manual for the user. It is, of course, not necessary that the software vended be specific to the µPDA. Applications may also be vended for other kinds of machines, and transported in the memory of the µPDA, or by floppy disk, etc. In this embodiment a non-µPDA user can acquire a wide assortment of software.

The software vending machine may also serve as an optional informational display center in such locations as airports, train stations, convention centers, and hotels. Upon inserting a µPDA a user may interface directly and upload current information including, but not limited to, local, national, and world news; stock quotes and financial reports; weather; transportation schedules; road maps; language translators; currency exchange applications; E-mail and other direct on-line services.

A customized vending machine could be tailored to business travelers and allow fast access to pertinent information, allowing the user to download files to send via E-mail. In another aspect of the invention, the vending machines are linked to each other allowing users to send messages to associates travelling through locations of associated vending machines. Such dedicated µPDA E-mail is immediately downloaded to a specific µPDA as it is docked. The sender may have the associate's µPDA unique encoded key as identification, or some other dedicated identifying means for E-mail.

In another embodiment, as each business associate arrives at an airport, he or she may prompt the custom vending machine in that location via an optional installed infrared interface (not shown) in their µPDA. The custom vending machine, also equipped for infrared communication, receives the signal and sends/or receives any messages that are waiting.

Enhanced Display:

FIG. 99 is a plan view of an enhanced I/O interface unit 1079 according to an aspect of the present invention. Interface unit 1079, with about a 5-inch diagonal measurement, comprises a combination LCD display at least partially overlaid by a touch-sensitive input screen, providing an I/O area 1080 in much the same manner as in a µPDA. Four docking bays 1081, 1083, 1085, and 1087 are provided in the left and right edges of interface unit 1079 in this embodiment, and are configured for PCMCIA type II modules. One of these bays may be used for docking a µPDA according to the present invention, and the other three to provide a larger CPU, additional memory, battery power, peripheral devices such as modems, and the like by docking functional PCMCIA modules.

Interface unit 1079 is a framework for assembling a specialty computer through docking PCMCIA units, including a µPDA according to the present invention. In other embodiments where the µPDA assumes other form factors, the docking bays may be configured accordingly.

A docked µPDA in this embodiment is configured to produce its I/O display on I/O area 1080. The thumbwheel on the M-PDA is accessible while docked and acts as described above in the stand-alone mode in this case. In another aspect, the enhanced display has a re-configured output that enables the user to manipulate the data from the touch-screen alone and/or additional hardware selector buttons and/or a standard keyboard attached to the enhanced display via a dedicated bus port, or even through the expansion port of a docked µPDA. In a further embodiment the enhanced display has a dedicated mouse port and/or a dedicated thumbwheel.

In yet another embodiment, interface unit 1079 has an inexpensive, conventional, replaceable battery and/or a rechargeable battery. Also, in another aspect, interface unit 1079 may dock two or more individual µPDAs and cross-reference data files between them according to control routines that can manipulate mutually unlocked files. Further still, interface unit 1079 may be placed and structurally supported for easy viewing on a dedicated standard or smaller-sized keyboard, connecting to the keyboard as an input device. The keyboard would then automatically serve as the input device.

Interface unit 1079 for a µPDA is small and compact enough to slip into a pocket book or briefcase, providing a very portable, yet very powerful, computer.

Figure 20:
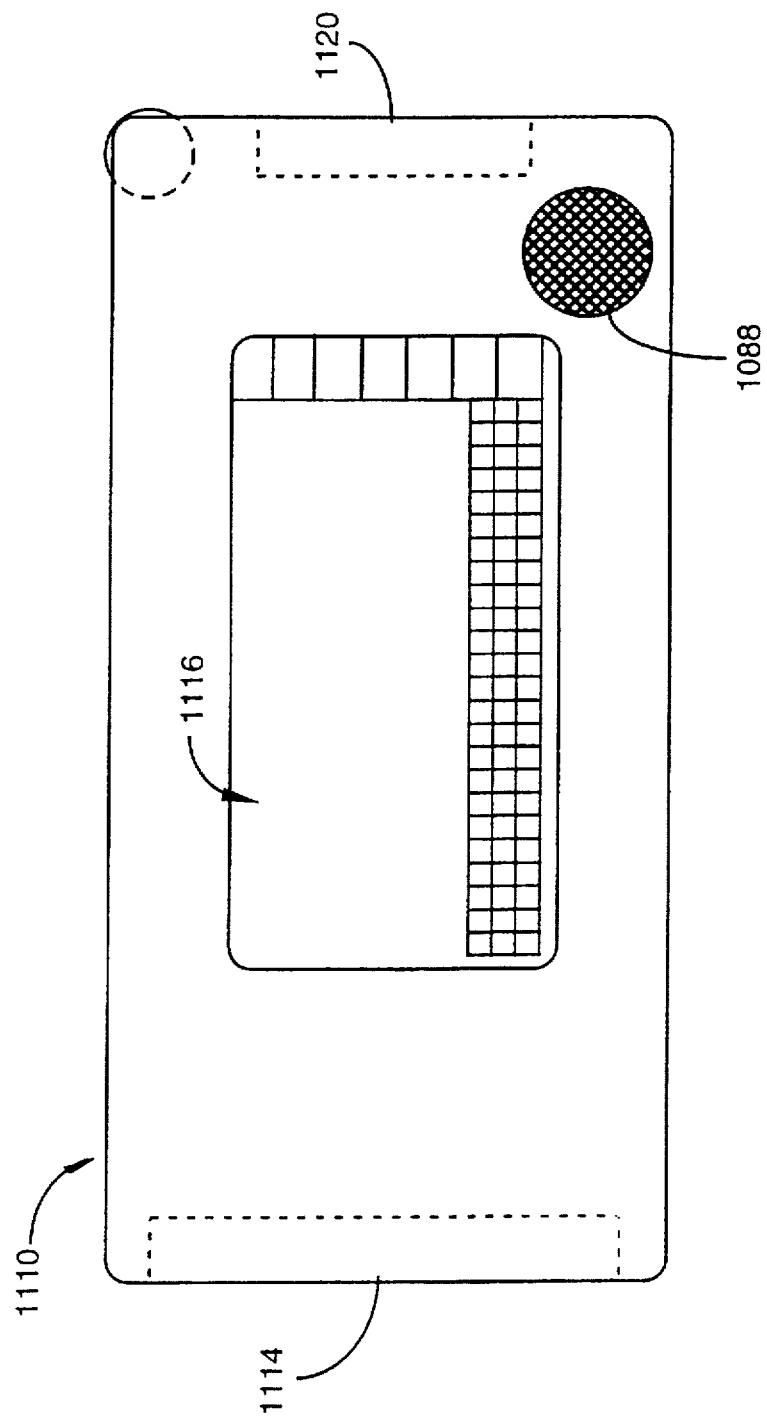
FIG. 20 is a top plan view of a μPDA with a microphone in an embodiment of the present invention.

Microphone/Voicenotes:

FIG. 20 is a plan view of a µPDA 1110 with an I/O interface 1116, an expansion port 1120, and a host interface connector 1114. µPDA 1110 has all the features previously described and additionally a microphone 1088. In this embodiment, control routines in the µPDA use a linear predictive coding (LPC) approach to convert analog input from the microphone to a digital voice recording. This approach uses a minimum of memory, but still is capable of reproducing audio input like the human voice within recognizable limits.

In an alternative embodiment, for better quality voice recording, a two-step integrator may be used in order to separate the analog signal and synthesize a closer digital representation.

With a µPDA so configured, a user's voice notes can be recorded and later uploaded to a host for processing. In future embodiments the digital signals may be converted to text or sent as voicemail on a network. In yet another embodiment, the microphone is integrated with a speaker for editing purposes.

Figure 21:
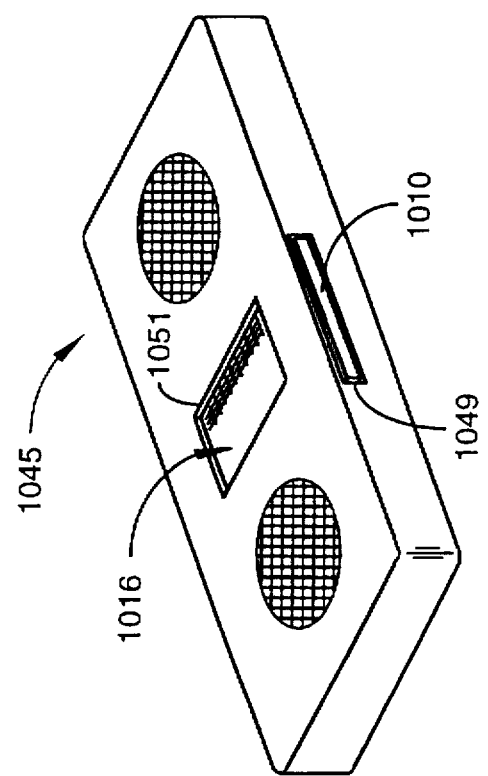
FIG. 21 is an isometric drawing of a μPDA docked in a dedicated cellular or cordless telephone according to an embodiment of the present invention.

Cellular Telephone Interface:

FIG. 21 is an isometric view of a μPDA 1010 docked in a dedicated cellular telephone 1405 according to an embodiment of the present invention. Telephone 1045 has a docking port 1049 for a μPDA according to the invention. In this embodiment, port 1049 is on one side of telephone 1045, and there is a window 1051 to provide access to I/O interface 1016 of the μPDA after it is docked. With the μPDA docked, all of the software and memory of the μPDA is available to the telephone and a user may operate the phone by I/O interface 1016.

In this aspect of the invention, unique control routines and display configurations are provided to enhance use of the cellular phone. For example, all of the user's collection of phone numbers, associated credit card numbers, access codes, etc. are readily available and may be quickly and conveniently accessed and used. In one aspect, a simple input displays alphabet letters to select, and once a letter is selected, a partial list of parties that might be called is displayed. One may scroll through the list by touch input or by use of the thumbwheel of the μPDA and select a highlighted entry. It is not required that the telephone numbers be displayed.

Once a party to be called is selected, the μPDA dials the call, including necessary credit card information stored in the memory of the μPDA for this purpose.

In a further embodiment, the calls are timed and time-stamped and a comprehensive log, with areas for notes during and after, is recorded.

In another embodiment, conversations are digitally recorded and filed for processing later. A future embodiment may include a voice compression program at a host or within cellular phone 1045. Compressed voice files, such as, for example, messages to be distributed in a voicemail system, may be downloaded into the μPDA or carried in a larger memory format inside the cellular telephone. The μPDA can then send the files via a host or dedicated modem attached at connector portion 1020 to the optional expansion bus 1040 (FIG. 16).

The cellular telephone may, in this particular embodiment, have a bus port for digital transmission. In this case, the compression algorithm along with voice system control routines are also established at the receiving end of the transmission to uncompress the signal and distribute individual messages.

In a further embodiment, voice messages may be sent in a wireless format from the cellular telephone in uncompressed digital synthesized form, distributing them automatically to dedicated receiving hosts, or semi-automatically by manually prompting individual voicemail systems before each individual message. In a further aspect of wireless transmission, a microphone/voicenote μPDA as in FIG. 20 may send previously stored voicenotes after docking in a cellular telephone interface.

In Europe and Asia a phone system is in use known as CT2, operating on a digital standard and comprising local substations where a party with a compatible cellular phone may access the station simply by being within the active area of the substation. In one aspect of the present invention, a CT2 telephone is provided with a docking bay for a μPDA, and configured to work with the μPDA. In yet another aspect of the invention, in the CT2 telephone system, and applicable to other digital telephone systems, a compression utility as disclosed above is provided to digitally compress messages before transmission on the CT2 telephone system.

It is roughly estimated that a dedicated compression algorithm may compress ten minutes of voice messages into one minute using the existing CT2 technology. This would save on telephone use charges significantly. In this aspect, there needs be a compatible decompression facility at the receiving station, preferably incorporated into a standard μPDA voicemail system for CT2 or other digital transmissions.

In a further embodiment, control routines are provided to enable the microphone/voicenote μPDA as illustrated in FIG. 20 to carry digital voicenotes, either compressed or uncompressed. When docked in a CT2-compatible μPDA cellular telephone, the μPDA in this embodiment can transmit the digital voicenotes in compressed form.

Figure 22:
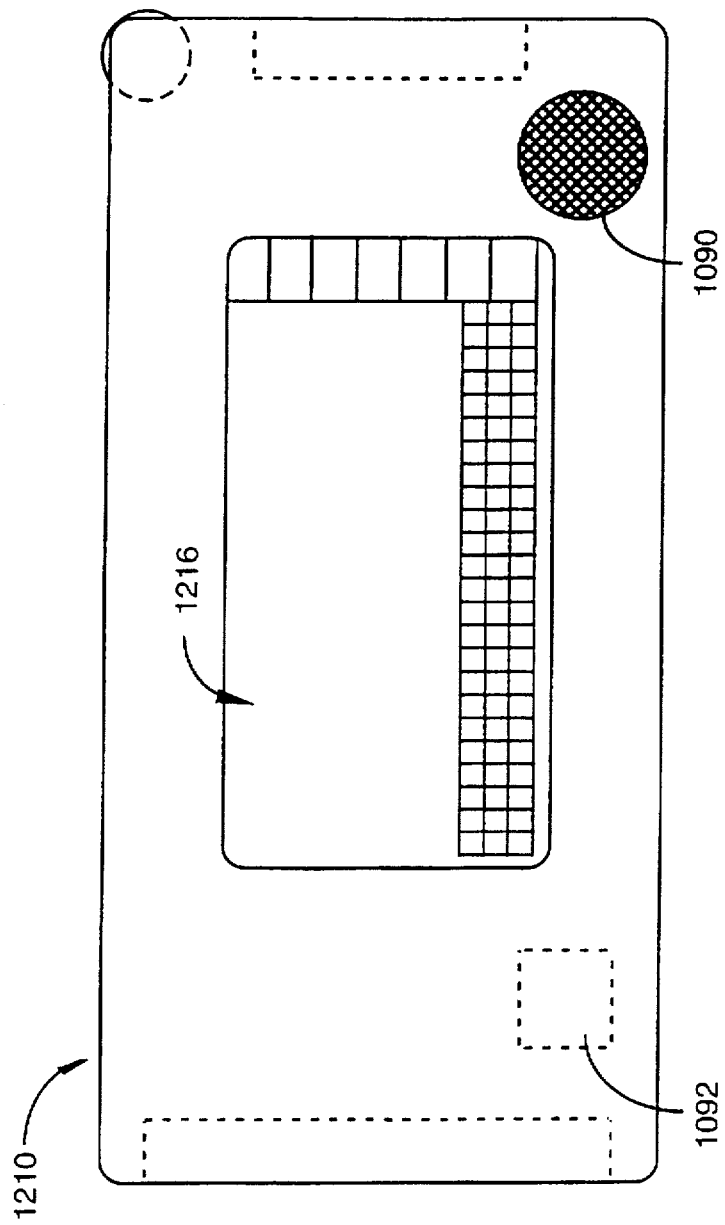
FIG. 22 is a plan view of a μPDA with a speaker and pager interface according to an embodiment of the present invention.

Speaker/Pager:

FIG. 22 is a plan view of a μPDA 1210 with a microphone/speaker area 1090 and a pager interface 1092 according to an embodiment of the present invention. This μPDA has the ability to act as a standard pager, picking up pager signals with installed pager interface 1092 and alerting a user through microphone/speaker 1090. Once the signals are received, μPDA 1210 can be docked in a compatible cellular telephone as illustrated in FIG. 21 and the μPDA will automatically dial the caller's telephone number. All other aspects are as described in the docked mode in the cellular telephone.

In another embodiment, the speaker/pager μPDA can be prompted to generate DTMF tones. The DTMF tones are generated from a caller's telephone number.

The speaker/pager μPDA can store pager requests in its onboard memory. It can also display all pager requests including time and date stamps, identification of the caller, if known, and other related information, on I/O interface 1216. In this particular embodiment, a user can receive a page, respond immediately in digital voicenotes on the μPDA via speaker/microphone 1090, and then send the response from a dedicated μPDA-compatible cellular telephone or conventional telephone.

Figure 23:
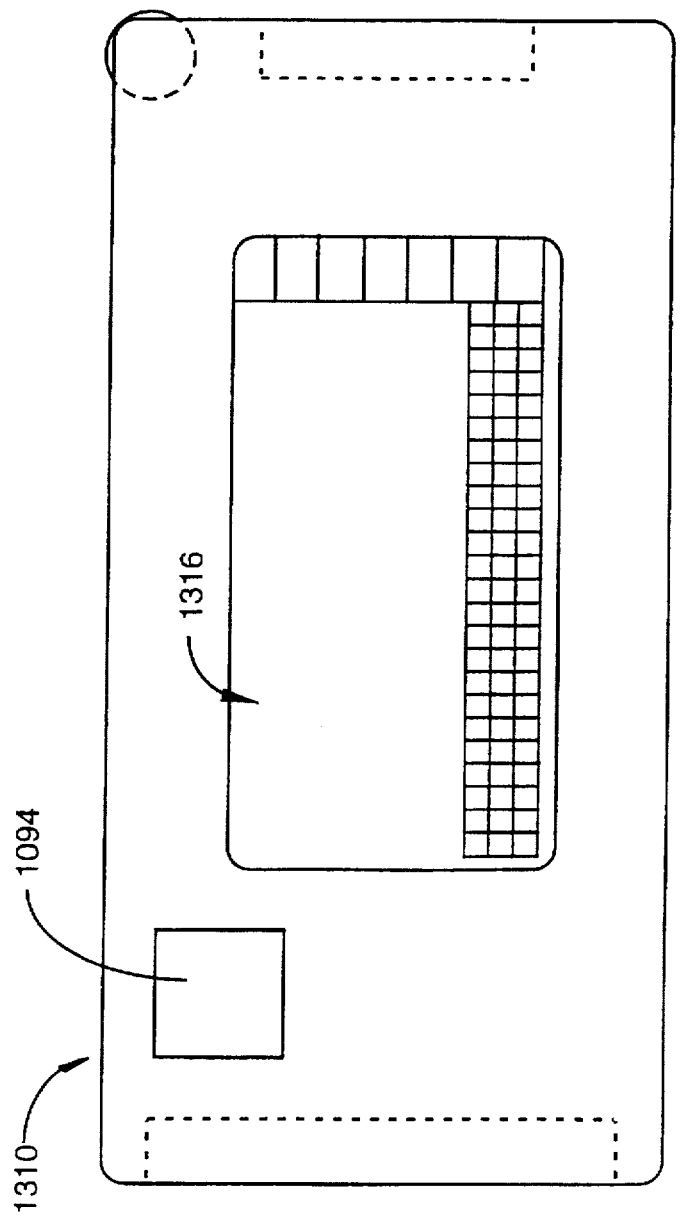
FIG. 23 is a plan view of a μPDA with an infrared communication interface according to an embodiment of the present invention.

Wireless Infrared Interface:

FIG. 23 is a plan view of a μPDA 1310 with an IR interface 1094 according to an embodiment of the present invention. In this embodiment the μPDA may communicate with an array of conventional appliances in the home or office for providing remote control. Unique signals for the appliances are programmed into the μPDA in a learning/receive mode, and filed with user password protection. Once a correct password in entered, an icon-based menu is displayed on I/O area 1316 in a user-friendly format. A master routine first queries a user for which device to access. For example, in a residential application, icons are displayed for such things as overhead garage doors, security systems, automatic gates, VCRs, television, and stereos.

In another aspect of the invention, a receiving station such as a host computer or peripheral interface has IR capabilities to communicate data directly from a nearby μPDA with an infrared interface. In a further embodiment the μPDA may interface in a cellular network and act as a wireless modem.

PERIPHERALS

A μPDA may serve as the platform for various peripheral attachments via expansion port 1020 (FIG. 11B and others). Upon attachment to a peripheral, a dedicated pin or pins within expansion port 1020 signal microcontroller 1011, and a peripheral boot-strap application is executed. Interfacing control routines, which may reside in the peripheral or in the memory of the μPDA, are then executed, and the μPDA I/O interface displays the related menu-driven options after the linking is complete.

Figure 24:
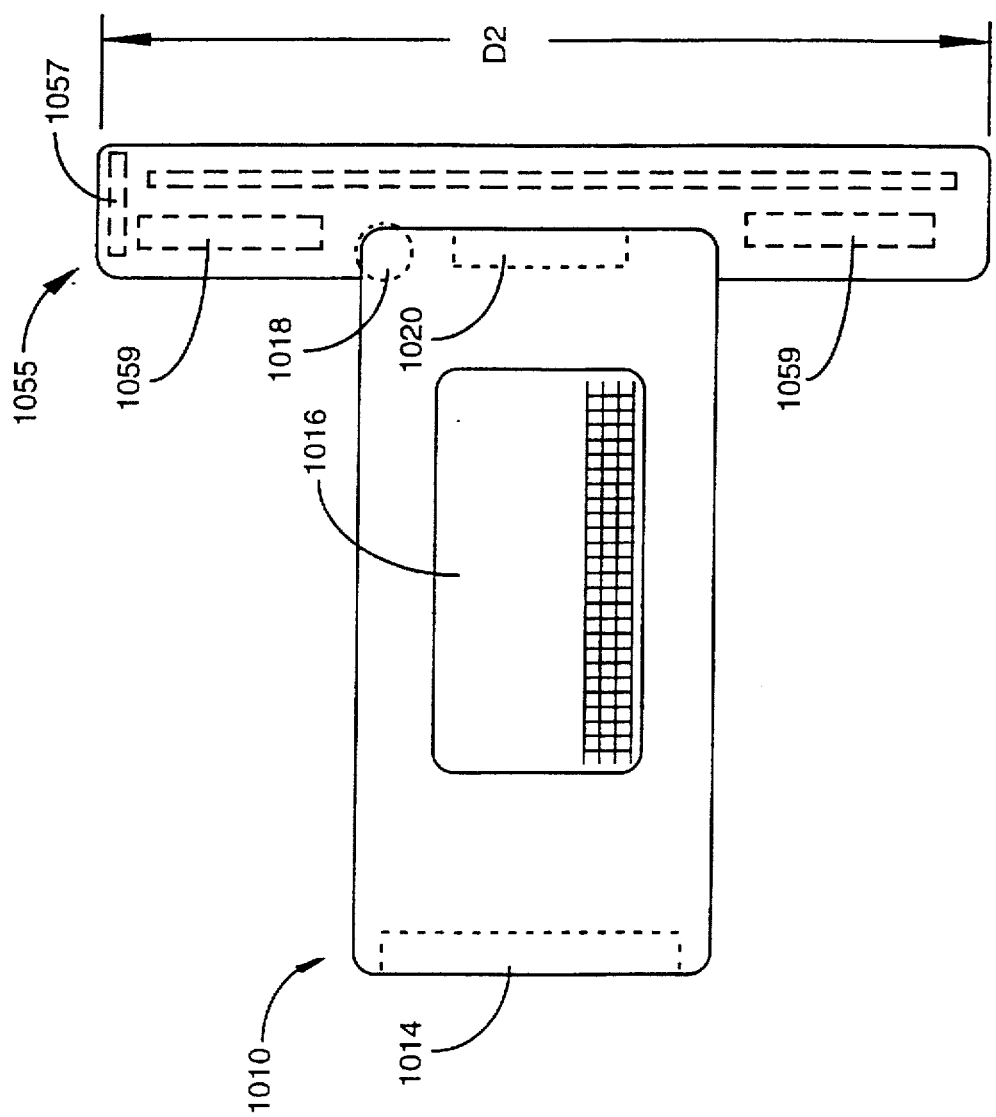
FIG. 24 is a plan view of a μPDA with a scanner attachment according to an embodiment of the present invention.

Scanner:

FIG. 24 is a plan view of a µPDA 1010 with a scanner attachment 1055 according to an embodiment of the present invention. The scanner attachment is assembled to the µPDA, making electrical connection via expansion port 1020. In this embodiment the physical interface of the scanner is shaped to securely attach to the µPDA. Scanner attachment 1055 has a roller wheel 1057 or other translation sensor, which interfaces with wheel 1018 of the µPDA, providing translation sensing in operation for the resulting hand-held scanner. In another aspect, scanner attachment 1055 has a translation device which transmits the proper signal through expansion port 1020. The scanner bar is on the underside, and one or more batteries 1059 are provided within the scanner attachment to provide the extra power needed for light generation.

In the scanner aspect of the invention, scanner attachments 1055 of different width D2 may be provided for different purposes. The bar may be no wider than the µPDA, or may be eight inches or more in width to scan the full width of U.S. letter size documents, or documents on international A4 paper. Unique control routines display operating information on the µPDA's I/O area 16 for scanning, providing a user interface for setup of various options, such as the width of the scanner bar, and providing identification for files created in the µPDA memory as a result of scan passes. Scanned data stored in the µPDA memory may be quickly transferred to the host via host interface 1014 when the µPDA is docked. Unique routines may be provided to automate the process, so the user does not have to search for files and initiate all of the transfer processes.

Figure 25:
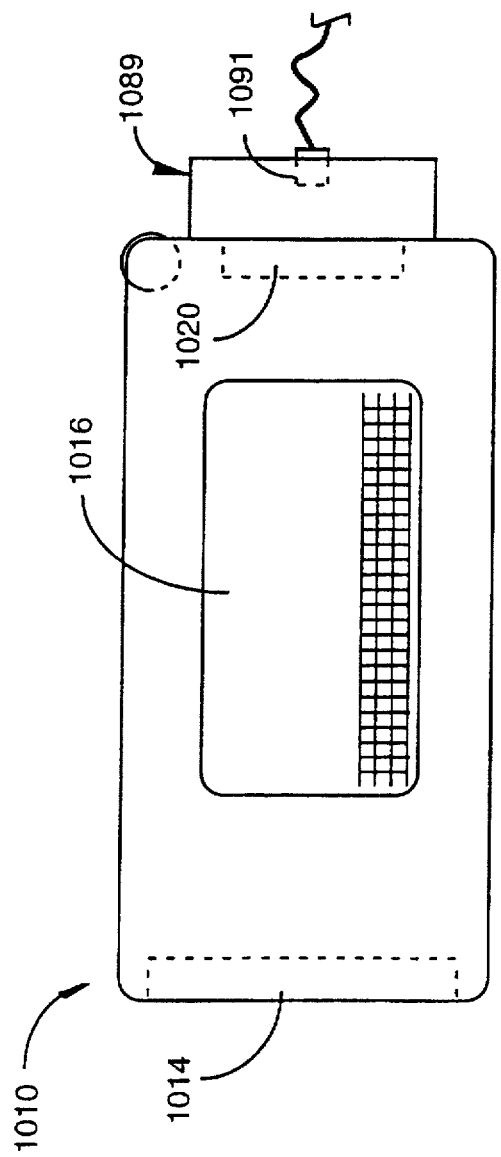
FIG. 25 is a plan view of a μPDA with a fax-modem attached according to an embodiment of the present invention.

Facsimile Option:

FIG. 25 is a plan view of a µPDA with a fax-modem module 1089 attached according to an embodiment of the present invention. A fax and telecommunication capability is provided via conventional telephone lines to the µPDA by fax-modem 1089 interfacing to expansion bus interface 1020. The fax-modem has internal circuitry for translating from the bus states of the expansion bus to the fax protocol, and a phone plug interface 1091. In another aspect, the µPDA can be docked in a host and be used in combination with fax-modem 1089 to provide faxing and file transfers of both host and µPDA data files. In this case, the fax-modem routines are displayed on the host monitor.

Figure 26:
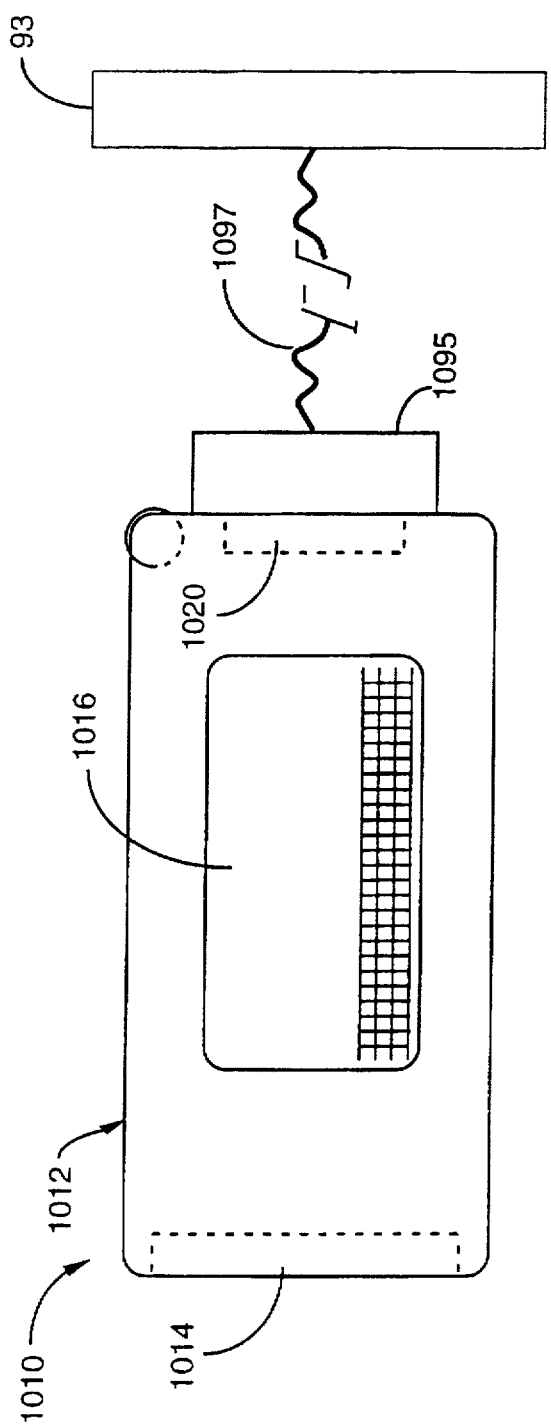
FIG. 26 is a plan view of a μPDA with a printer adapter interface according to an embodiment of the present invention.

Printer:

FIG. 26 is a plan view of a µPDA with a Centronics adapter interface according to an embodiment of the present invention. A printer connector 1093 engages expansion interface 1020 by a connector 1095 through a cable 1097. Translation capability resides in circuitry in connector 1093, which is configured physically as a Centronics connector to engage a standard port on a printer.

Figure 27:
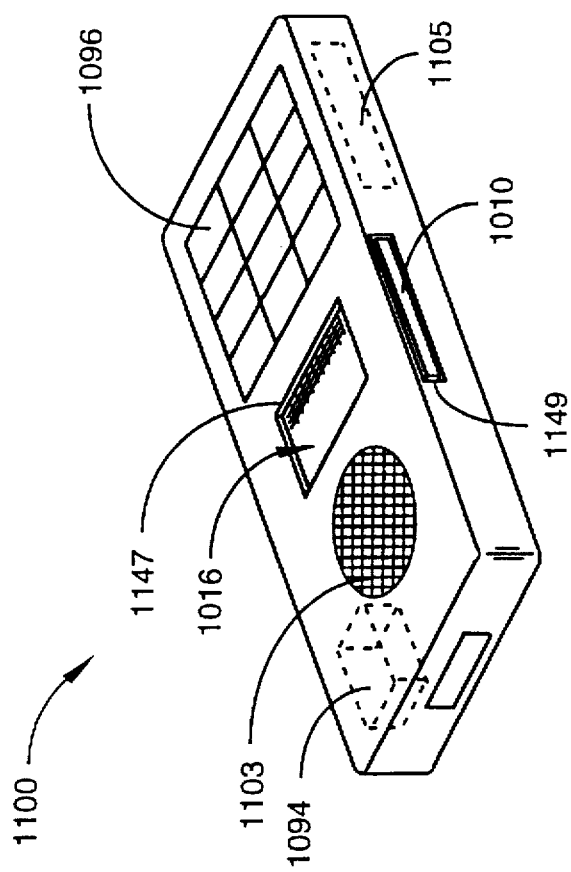
FIG. 27 is an isometric drawing of a μPDA docked in a barcode reader providing a data acquisition peripheral according to an embodiment of the present invention.

Barcode Reader and Data Acquisition Peripheral:

FIG. 27 is an isometric view of a µPDA 1010 docked in a barcode reader and acquisition peripheral 1100 according to an embodiment of the present invention. µPDA 1010 is docked in docking bay 1149. I/O interface 1016 displays information through opening 1147 according to specialized data acquisition applications. In this particular embodiment peripheral 1100 has an IR interface 1094, a microphone 1103, a scanner port 1101 (not shown), battery pack 1105, and a numeric keypad pad 1096 implemented as a touch-sensitive array.

Application routines enable the data acquisition peripheral to operate as, for example, a mobile inventory management device. The user may scan barcode labels with scanner 1101 and enter information, such as counts, on keypad 1096 or by voice input via microphone 1103. Since applications of peripheral 1100 are very specialized, only a limited voice recognition system is needed. The voice recognition system may prompt other command routines within the master applications as well.

As inventories are collected, the database may be displayed and also manipulated directly via I/O area 1016 in open bay 1147, or information may be downloaded at a prompt to a nearby host via IR interface 1094.

Alternatively to frequent data transmission, data may be stored or an auxiliary option memory location in peripheral 1100.

In another aspect, the data acquisition peripheral may be interfaced to the analog output of a monitoring device, such as a strip chart recorder, and may digitize and store the incoming analog signals.

Figure 28:
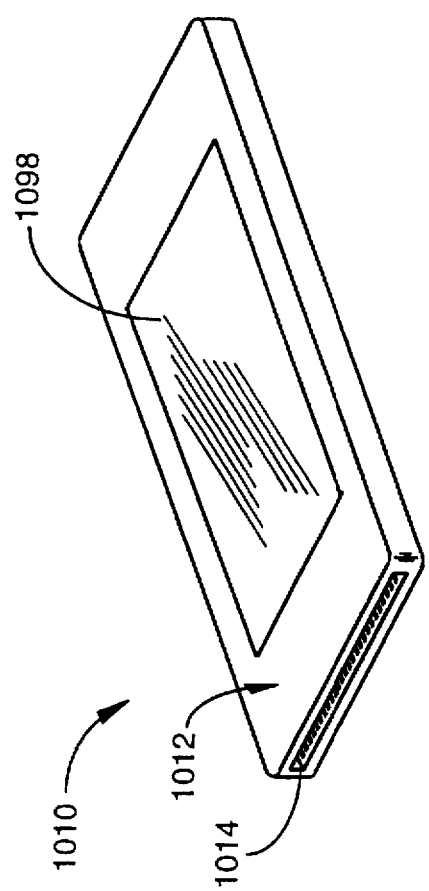
FIG. 28 is an isometric view of a μPDA with a solar charger according to an embodiment of the present invention.

Solar Charger:

FIG. 28 is an isometric view of the side of a µPDA 1010 opposite the I/O interface with a solar charger panel 1098 according to an embodiment of the present invention. Panel 1098 is positioned so that when µPDA 1010 is in strong light, such as sunlight, the solar charger absorbs the solar energy and converts it to electricity to recharger battery 1015 inside the µPDA. Solar charger 1098 may be permanently wired to the circuitry of the µPDA or attached by other means and connected to a dedicated electrical port or the expansion port. The solar charger is placed so that the µPDA can be fully docked in a docking port with the panel in place. In another aspect, a detachable solar charger may be unplugged before docking the µPDA, and the detachable charger may then be of a larger surface area.

Figure 29:
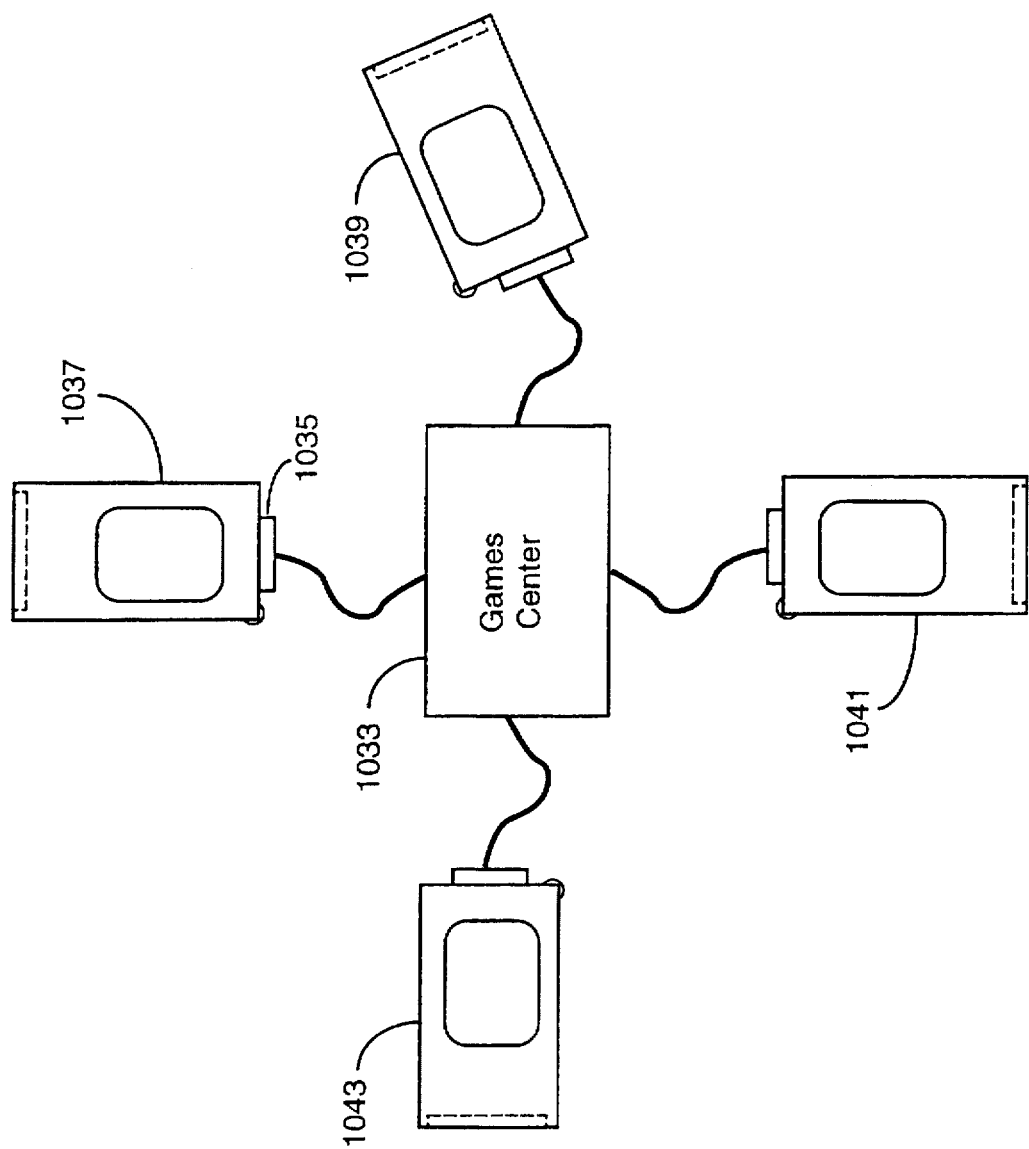
FIG. 29 is a plan view of four μPDAs interfaced to a dedicated network console providing inter-PDA communication according to an embodiment of the present invention.

Games/Conference Center:

FIG. 29 is a largely diagrammatic representation of a Games Center unit 1033 according to an aspect of the invention for connecting several µPDA units (1037, 1039, 1041, and 1043) together to allow competitive and interactive games by more than one µPDA user. Games Center unit 1033 is controlled by an 80486 CPU in this particular embodiment. µPDAs may be connected to the central unit by cable connection via the expansion bus or the host interface of each µPDA, through a connector such as connector 1035. The drawing shows four connectors, but there could be as few as two, and any convenient number greater than two.

As a further aspect of the present invention, the gaming center may serve as a conference center where a number of µPDAs may exchange information. In this way, for example through custom routines stored and executable in central unit 1033, a manager may update a number of salespeoples' µPDAs, including but not limited to merchandise databases, spreadsheets, price sheets, work assignments, customer profiles, address books, telephone books, travel itineraries, and other related business information while in conference.

Figure 30:
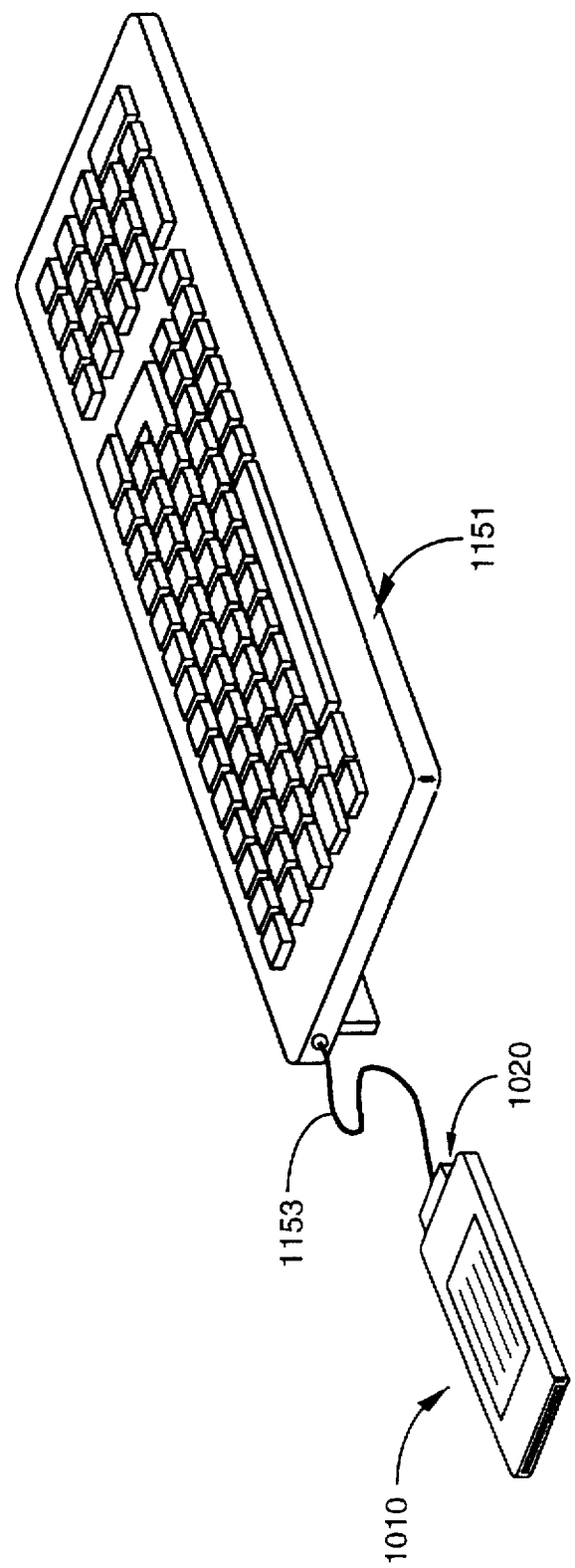
FIG. 30 is an isometric view of a μPDA according to the invention connected by the expansion port to a standard-sized keyboard.

Standard Keyboard:

FIG. 30 is an isometric view of a keyboard 1151 connected by a cord and connector 1153 to a µPDA 1010 via the expansion port 1020. In this example, the keyboard is a mechanical keyboard having a full-size standard key array and an on-board controller and interface for communicating with the µPDA. In other embodiments the keyboard may take many other forms, including a two-layer, flexible, roll-up keyboard as taught in U.S. Pat. No. 5,220,521.

In addition to keyboards, other input devices, such as writing tablets and the like may also be interfaced to a µPDA via expansion port 1020.

There are numerous additional ways to combine different embodiments of the µPDA for useful functions. For example, an IR-equipped μPDA attached to scanner 1055 may transfer large graphic files in near real time to a host computer. If the files were of text, the host may further process the files automatically through an optical character recognition (OCR) application and send the greatly reduced ASCI files back to the μPDA. As discussed above, the μPDA family of devices establishes a protocol of software security and distribution as well as having the ability to be bus mastered by a host computer system for numerous applications.

Modular Computer Aspects:

Computers with docking bays can take a number of alternative forms in the scope of the present invention. For example, the computer portion of a smart telephone system according to the invention may take the external form of a desktop unit to which a smart phone may be attached (FIGS. 4, 5, and 7). The computer portion may also take the form of a portable computer, such as a laptop, notebook, or palmtop computer having one or more docking bays. In this case, the smart phone circuitry (FIGS. 4 and 7) may be integrated into the case of the computer, and DSP modules and intelligent μPDA modules may be docked in the one or more docking bays. In another alternative the smart phone elements may be a part of a μPDA functional module dockable in the computer.

Following disclosure teaches various portable computer concepts having docking bays for receiving functional modules.

Figure 31A:
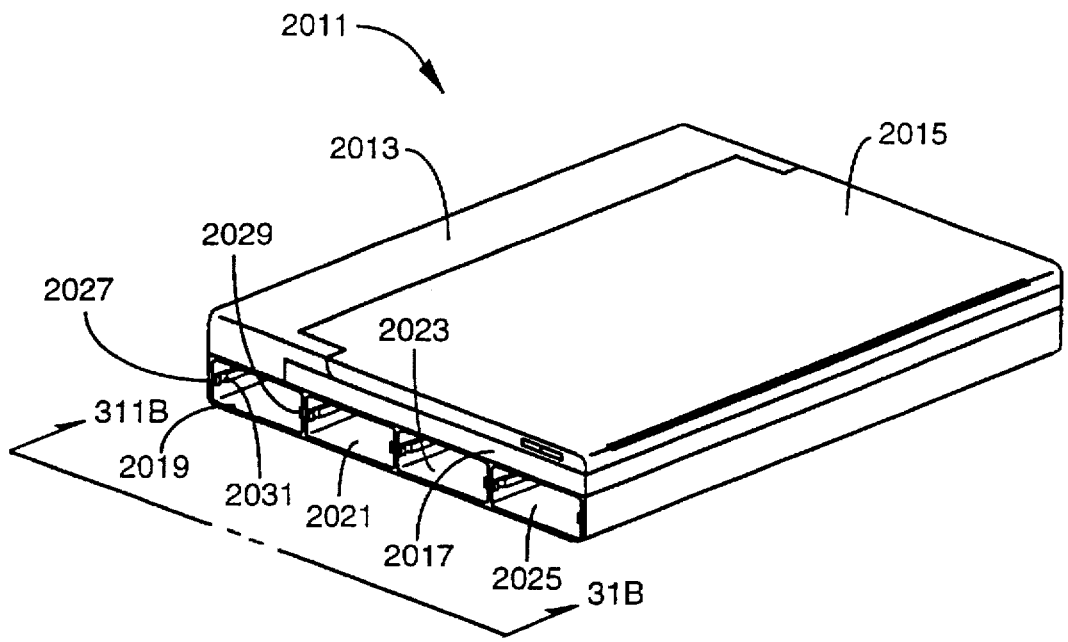
FIG. 31A is an isometric view of a modular notebook computer framework according to an embodiment of the present invention.

General Description of Computer Architecture:

FIG. 31A is an isometric drawing of a notebook computer framework 2011 according to the invention. Framework 2011 comprises a back housing 2013, a tilt-up flat panel display 2015, shown closed, a keyboard 2017, and a plurality of module bays for plugging in function modules. Back housing 2013 includes a power unit for converting electrical input on a wide variety of standards to the form required by the computer. For example, there is a port (not shown) for connecting to a standard household outlet, rated at 120 V., 60 Hz, alternating current. The power unit will convert the input to outputs as needed by the computer bus and functional modules. There are also input ports for 6 V. DC, 12 V. DC, 9 V. DC, and others, and the power unit in one embodiment of the present invention is capable of recognizing the input characteristics by sampling, and switching to proper on-board circuitry to utilize the input.

In the embodiment shown by FIG. 31A four module bays 2019, 2021, 2023, and 2025 are shown along one side of the framework. There are four more module bays along the other side of the framework opposite the module bays shown. There could be more or fewer module bays, but eight is convenient and a good balance between the need to stay small and simple, and to also have adequate versatility.

Figure 31B:
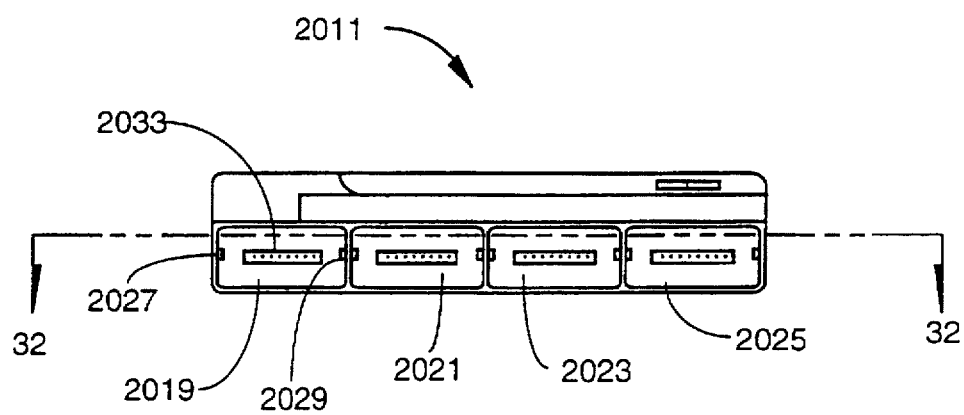
FIG. 31B is a view of the computer framework of FIG. 31A from one side from the vantage of line 31B—31B on FIG. 31A.

FIG. 31B is an end view of the notebook computer framework of FIG. 31 in the direction of arrows 31B—31B of FIG. 31A. Each of the module bays has a set of guide and positioning rails such as rails 2027 and 2029 in bay 19. The rails are to position and guide a function module inserted into the module bay. Each rail in a set has a detent such as detent 2031 for latching a module when the module is fully inserted in the bay. Each bay also has a connector such as connector 2033 in bay 2019. The connectors are for coupling to a mating connector on a function module inserted in a bay. It will be apparent to a person with skill in the art that there are a number of equivalent ways guide rails, detents, and coupling may be accomplished.

Figure 32:
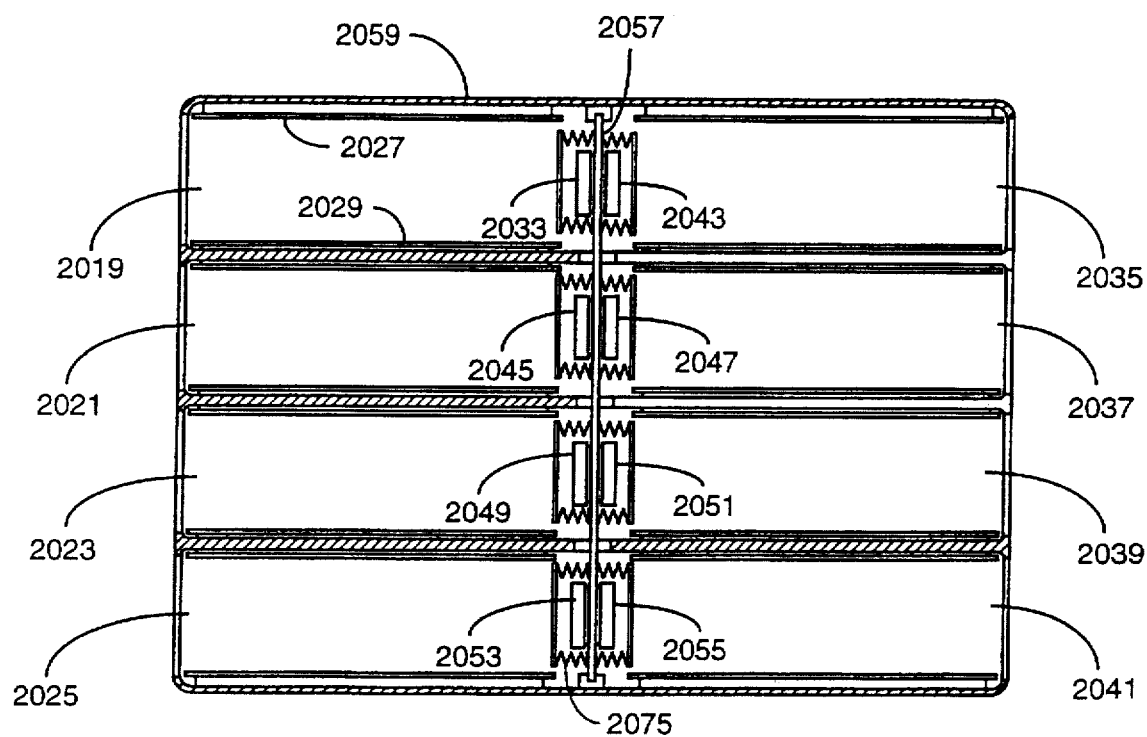
FIG. 32 is a sectioned plan view of the computer framework of FIG. 31A taken according to section line 32—32 of FIG. 31B.

FIG. 32 is a plan section view just above the module bays taken along section line 32—32 of FIG. 31B. Bays 2019, 2021, 2023, and 2025 are shown on one side of the section view, and bays 2035, 2037, 2039, and 2041 along the opposite side. A printed circuit board structure 2057 is fastened in a substantially vertical position down the center of frame 2059, and connectors 2033, 2043, 2045, 2047, 2049, 2051, 2053, and 2055 are connected to the printed circuit board structure and present their pin structure outward toward the respective bay areas. In the presently described embodiment the internal connectors are male connectors, but this is not a requirement of the invention.

As also shown in FIG. 31A, each module bay has a pair of opposed rails located vertically at about the midpoint of the height of the module bay. Rails 2027 and 2029 serve module bay 2019, and similar rails are located in each of the other module bays.

Figure 33:
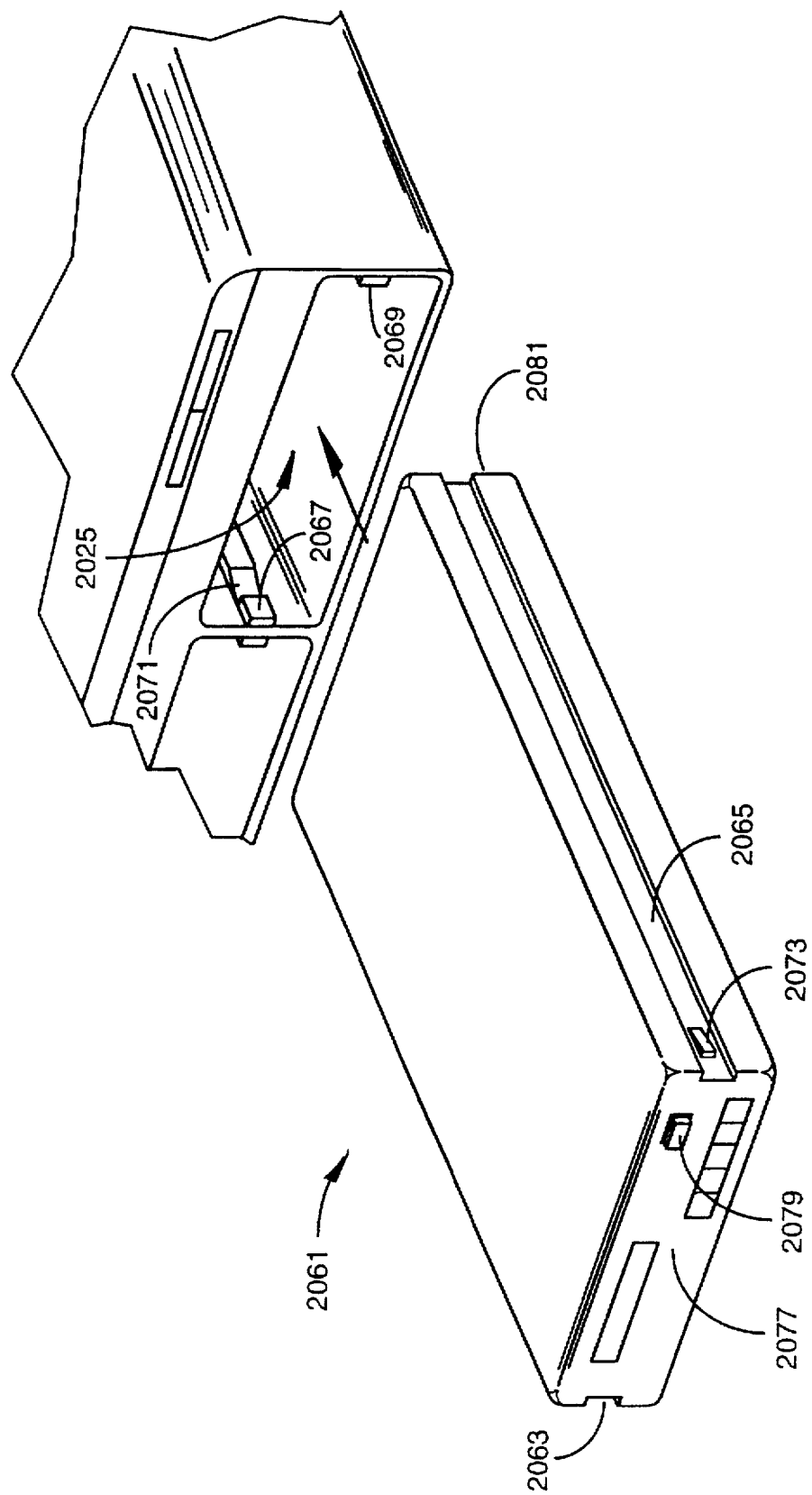
FIG. 33 is an isometric illustration showing a function module according to the present invention associated with a docking bay of the framework of FIG. 31A.

FIG. 33 is an isometric view of a function module 2061 according to the invention aligned with module bay 2025 of framework 2011. Module 2061 includes guides 2063 and 2065 on opposite sides for engaging rails 2067 and 2069 when module 2061 is inserted into bay 2025. The module has two spring-loaded detent levers (lever 2073 is shown) for engaging detents in guide rails 2067 and 2069 when the module is fully inserted. Detent 2071 is shown in rail 2067 in FIG. 33.

Each module bay has a compression spring mechanism engaged by a function module as the module nears full insertion, so there is an outward force on the module when the detent levers engage the detents. Mechanism 2075 (FIG. 32) is exemplary. To insert a module one aligns the guides in the module with the guide rails and pushes the module into the module bay until the detents engage. Button 2079 on front face 2077 of the module is for retracting the detent levers of the module, in which case the spring mechanism ejects the module, much as is the case with some floppy disk drives.

Figure 34:
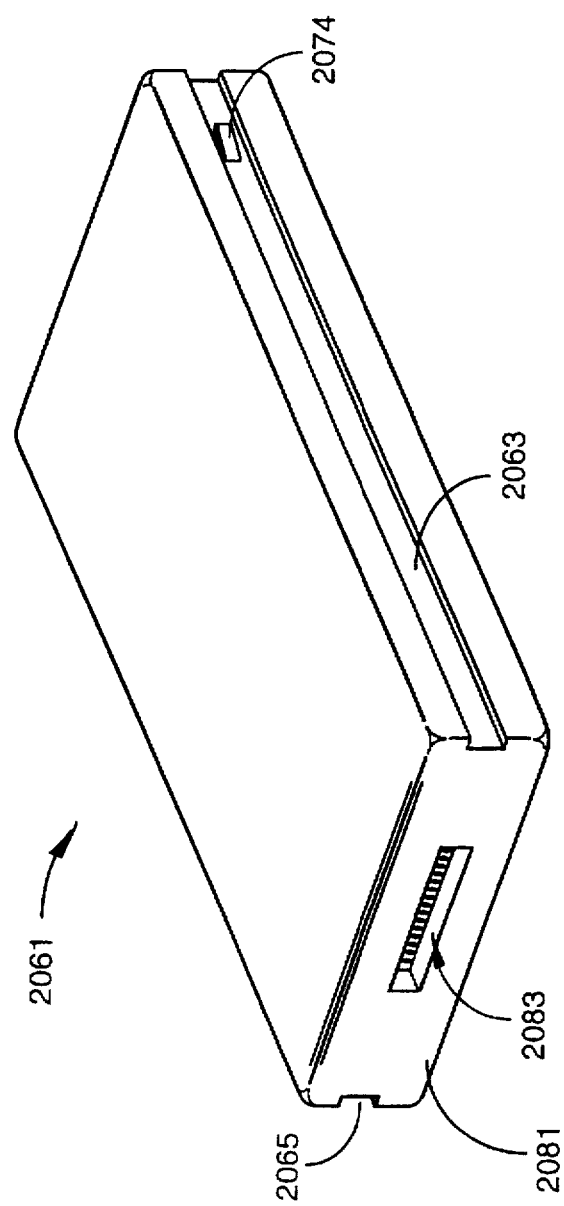
FIG. 34 is another view of a function module according to the present invention.

FIG. 34 is an isometric view of function module 2061, showing back face 2081 opposite front face 2077. The back face includes a recessed female connector receptacle 2083 in the preferred embodiment, for mating with male connectors positioned in each pod bay, such as connector 2033 in FIG. 31B and FIG. 32. A second detent lever 2074 is opposite lever 2073 of FIG. 33.

In the embodiment described above, and in many other embodiments, the notebook computer framework of the present invention comprises a frame with module bays and connectors as described above for "plugging in" function modules, power supply units, and other peripheral devices. The framework also comprises display 2015, keyboard 2017, and an internal bus structure hereinafter termed the Notebus, which is described in additional detail below, in the section titled "Notebus Bus Structure".

The function modules, as represented by module 2061 in FIG. 33 and FIG. 34, are provided in a wide variety of different models capable of a wide variety of different functions. For example, framework 2011 has no "on-board" CPU, battery power, or system memory. These functions and all other functions are provided by different models of function modules which may be inserted in any one or a combination of the available module bays. Other kinds of function modules that may be inserted include floppy-disk drives, hard-disk drives, "flashcard" memory modules, LAN and modem adapters, Fax modules, specialty modules such as data acquisition modules adapted to specific equipment, and more. The function modules are also described in more detail in the section below titled "Function Modules".

Electronic Architecture

Figure 35:
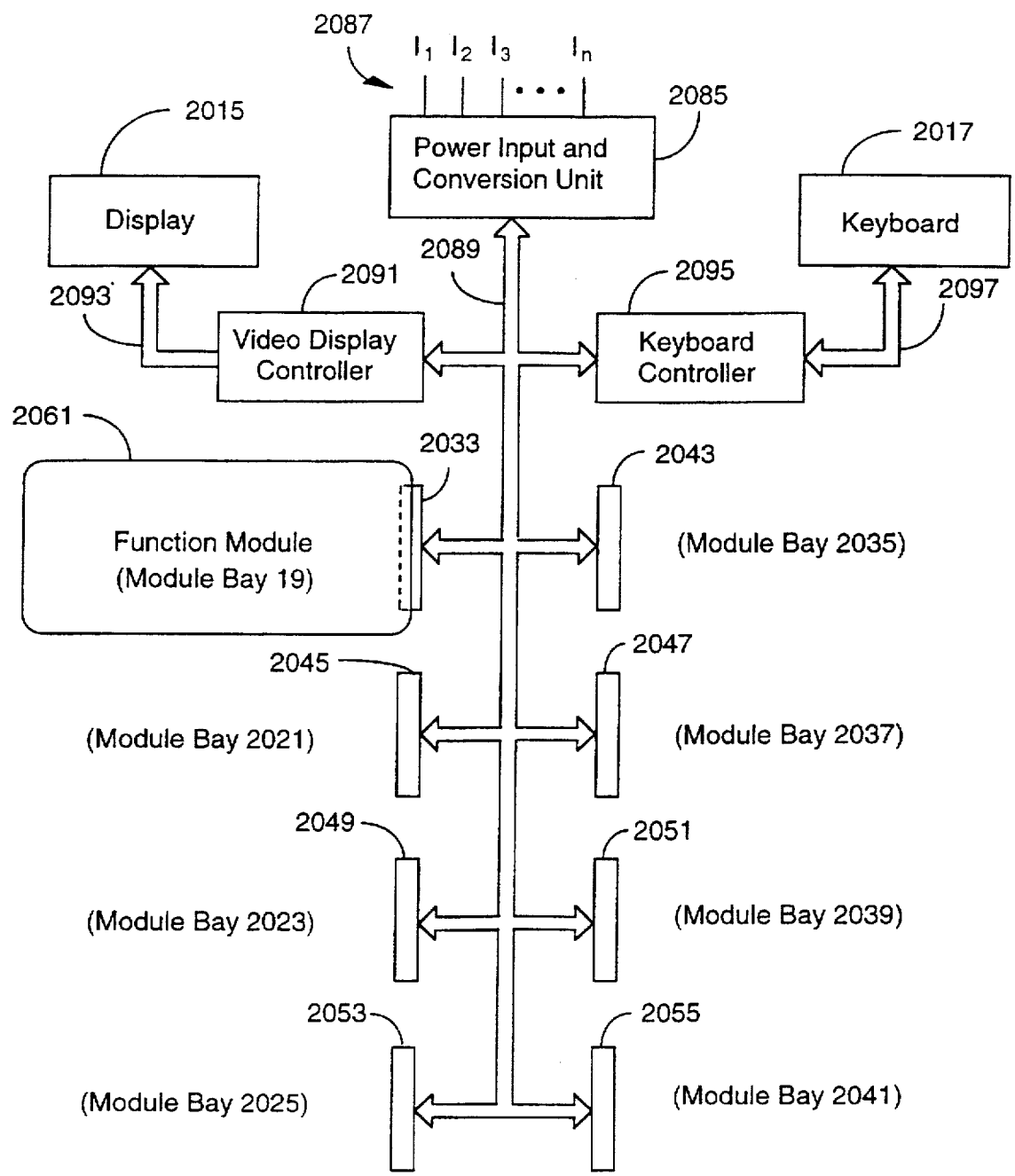
FIG. 35 is a block diagram of a compressed bus and connection to docking bays in a computer framework according to an embodiment of the present invention.

FIG. 35 is a block diagram showing internal elements of Notebook computer framework 2011, connected to show the electronic architecture of the notebook computer according to the invention. Power input and conversion unit 2085 is housed in back housing 2013 (FIG. 31A) and has ports 2087 for power inputs. Unit 2085 senses the input conditions and selects appropriate circuitry to convert the input to the voltages needed to power the other elements of the system. Output from the conversion unit is to Notebus 89, which comprises paths for power as well as for digital information such as data and addresses.

Because there are a wide variety of function modules, as indicated above and described in more detail below, there needs typically to be more than one power line in the Notebus. For example, the notebook computer of the invention comprises hard disk drive modules, and these modules are preferably provided without their own "on board" power source. The motor drive for the hard disk requires a different power (voltage and current) than does a CPU, for example, so there are parallel power lines of differing size and voltage level in the notebus. A typical Notebus will have, for example, a line for 24V DC, another for 12V DC, and yet another for 5V DC, as well as multiple ground lines.

Notebus 2089 connects to a video display controller 2091 including Video Random Access Memory (VRAM) which both powers and controls display 2015, which in the preferred embodiment is a flat panel display driven by analog driver lines on analog bus 2093. Notebus 2089 also connects to a keyboard controller 2095 which powers and controls keyboard 2017 over link 2097, accepting keystroke input and converting the input to digital data for transmission on Notebus 2089. The keyboard controller may be physically mounted in the keyboard or in framework 2011.

Notebus 2089 also connects as illustrated in FIG. 35 to each of the module bays, such as bay 2019, through connectors, such as connector 2033. When a function module, such as module 2061, is inserted into a module bay, the mating connector in the back of the function module mates with the connector from the Notebus, and circuitry inside the function module is then connected to the Notebus.

Notebus Bus Structure

The Notebus comprises, as stated above, both power and data paths. The digital lines are capable of carrying 32 addresses and conveying data in 32 bit word length. To minimize pin count and routing complexity, addresses and data are multiplexed on a single set of 32 traces in the overall bus structure. One with skill in the art will recognize that this type of bus is what is known in the art as a low-pin-count or compressed bus. In this kind of bus different types of signals, such as address and data signals, share signal paths through multiplexing. For example, the same set of data lines are used to carry both 32-bit addresses and data words of 32-bit length.

In the Notebus of the present invention, some control signals, such as interrupt arbitration signals, may also share the data lines. Typical examples of buses that are exemplary as usable for the Notebus (with the exception of power supply analog lines in the Notebus) are the "S-Bus" implemented by Sun Microsystems, the "Turbochannel" Bus from Digital Equipment Corporation, and buses compatible with the IEEE-488 standard.

The Notebus is a high-speed backplane bus for interconnecting processor, memory and peripheral device modules. The Notebus also supplies standard operating and standby power supply voltages and electrical ground to all module bays.

Function Modules

FIG. 33 and FIG. 34 show, as described above, two different views of a function module according to the present invention. Also as stated above, function modules may have many different functions. There are as many different functions, in fact, as there are possibilities for discrete peripheral devices, plus power and CPU modules. An individual function module is provided for each function, and in each case the function module has a physical size and form compatible with the bays, guide rails, and connectors for "plugging in" to framework 2011.

The "face" of a function module, being the exposed face when the module is "plugged in" (see face 2077 in FIG. 33) may have elements specific to the type of module. For example, a CPU module may have no indicators or other elements on the front face, while a floppy disc module will typically have an opening for inserting a floppy disk and a "key" or button for releasing and ejecting the floppy disk.

A unique feature of the present invention is that the CPU for the notebook computer is provided as a CPU function module. This provides an ability for a user to tailor the CPU power to the other modules and application for the notebook computer, and an easy upgrade to more powerful CPUs.

Figure 36:
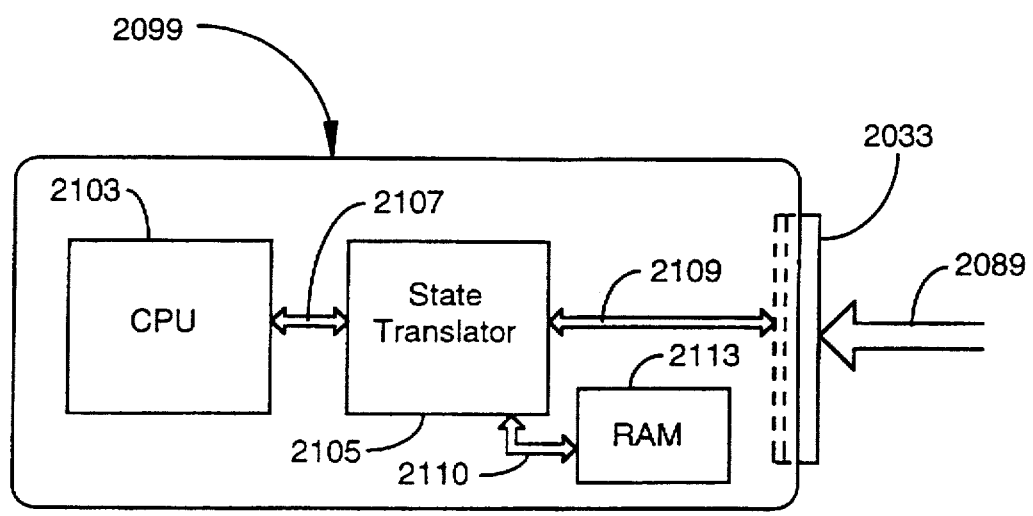
FIG. 36 is a block diagram of a CPU function module according to an embodiment of the present invention.

FIG. 36 is a diagram of a CPU module 2099 plugged into a bay in a notebook computer according to the present invention. In this case (referring to FIG. 32) the module is plugged into bay 2019 having connector 2033. This is exemplary, as the module could just as well be plugged into any open bay of framework 2011. By virtue of being plugged into connector 2033 or another module connector, internal elements of the CPU module are connected to Notebus 2089.

The internal elements for module 2099 comprise CPU 2103, a state translator 2105, and RAM memory 2113. CPU 2103 may be any of a wide variety of CPUs (also called in some cases MPUs) available in the art, for example Intel 80386 or 80486 models, MIPS, RISC implementations, and many others. CPU 2103 communicates with State Translator 2105 over paths 2107, and State Translator 2105 communicates with connector 2033, hence Notebus 2089, over bus 2109 internal to the module, which is an extension of bus 2089 when the module is plugged into bus 2089.

State translator 2105 is a chip or chip set designed to translate commands and requests of the CPU to commands and requests compatible with the Notebus. It was mentioned above that CPU 2103 may be one of a wide variety of CPUs, and that Notebus 2089 may be any one of a wide variety of compressed buses. It will be apparent to one with skill in the art that there may be an even wider variety of state translators 2105 for translating between the CPU and the Notebus. The state translator is theoretically a different device for each possible combination of CPU and Notebus.

RAM memory module 2113 comprises conventional RAM chips mounted on a PCB as is known in the art, and connectable to state translator 2105 by a plug or connector interface, such as an edge connector. The purpose of having a RAM module "on board" the CPU module is to provide for rapid memory access, which will be much slower if the RAM is made available in a separate module at one of the other module bays. Memory at another module bay is on the Notebus, and will be subject to bus contention and wait states. The plug-in nature of the RAM unit relative to the CPU module allows different amounts of memory to be provided with a CPU module in the notebook computer of the present invention.

As described above, Notebus 2089 comprises not only the shared data and address lines, but also power and ground connections for the modules plugged into the various bays. Paths 2109 and 2107 therefore comprise power and ground lines for CPU 2103 and Translator 2105.

If, for example, CPU 2103 is an INTEL 80486 microprocessor, State Translator 2105 will be a translator for accommodating the state machine of the 80486 to the state machine of the Notebus, which may be any one of the buses described above for bus 2089, or another compressed bus. There are many equivalent ways a translator may be implemented for the specific case. Given the manufacturers available design information for the CPU and the equivalent information for bus 2089, it is within the skill of workers in the art without undue experimentation to implement the translator and the required connections. This is conventional technology. The implementation of the translator on a module with a CPU to plug into a module bay in the notebook computer is unique to the present invention.

In the invention, state translators may be implemented in a single chip set or circuitry set to be capable of translating between a number of CPUs and a number of different bus possibilities. One might, for example, design and implement a translator with the necessary circuitry and intelligence to translate between three different CPUs and three different compressed buses. The state translator could be made hardware or software programmable to select one CPU and one bus from the available selections at some convenient time in the manufacturing cycle, or even at the time of selection of modules to make up a notebook computer.

As an example of a hardware programmable translator, a translator could be built to have certain traces cut as a near final step in manufacture as a way of selecting the CPU and bus pair. Translators could also be programmable by virtue of on-board EPROM or EEPROM devices. As an example of software programmability, translators could be implemented with microprocessor technology and software programmable. A CPU module could be plugged into a connector on a special programming unit, for example, before installation in a notebook computer according to the present invention, and be sent certain commands to set up on board software to translate between the desired CPU and bus. It will be apparent to one with skill in the art that there are many possible variations in the implementation of the translators.

Figure 37:
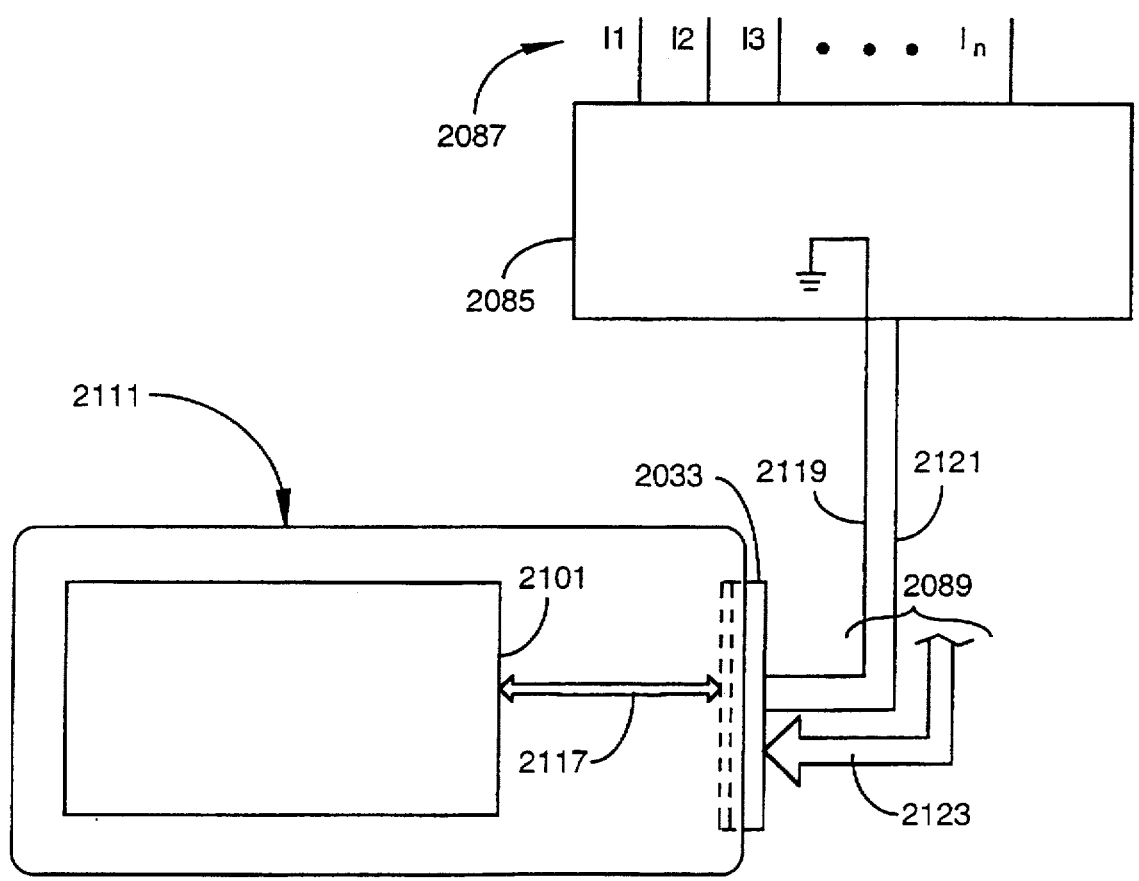
FIG. 37 is a block diagram of a power supply function module according to an embodiment of the present invention, with indication of connections to the internal bus structure and power conversion unit of the computer.

FIG. 37 shows a power module 2111 plugged into a bay in the notebook computer according to an embodiment of the present invention. The purpose of a power module is to provide a source of power for the computer, which includes any modules plugged into the module bays. As is common in notebook computers in the art, there may be a battery, typically rechargeable, in framework 2011, and the battery may also be replaceable and rechargeable through power input lines 2087. In the case of an on-board battery pack, there is the option of using all module bays for other than power packs.

Preferably framework 2011, sans function modules, has no power capability other than power plugged into one of input lines 2087, which may be converted to the power characteristics needed by the computer and distributed on the power lines of the Notebus. For portability, power is typically supplied by one (or more) power modules 2111 plugged into one or more of the module bays.

Module 2111 has a battery pack 2101 which is connected via lines 2117 to (in this case for example) connector 2033, and hence to Notebus 2089. Because there are several supply lines in the Notebus for supplying power to function modules at different voltage and with different current capability, the power lines in the Notebus for connecting a power module 2111 are not the same as the lines for supplying power to a module. There is instead a separate set of power lines to pins on the module bay connectors, such as connector 2033, which connect as input to power input and conversion unit 2085, much as do input ports 2087.

In FIG. 37, lines 2119 and 2121 connect power module 2011 to conversion unit 2085, where the power input from the power module is sensed and treated as a power source, much as is done for power input lines 2087. This power is converted to the needed voltages and current capabilities, and put back out on the power supply output lines to the module bays. In FIG. 37 line 2119 is ground, and arrow 2123 represents all of the data/address, control, and power output lines to the module bays. Lines represented by arrow 2123, plus lines 2119 and 2121 are Notebus 2089. Although not shown in FIG. 37, there are connections for line 2119 and for line 2121 to each of the module bay connectors.

Power modules such as module 2111 may be plugged into a connector on a charging module separate from the notebook computer, using the same connector used for plugging into the Notebus via a module bay of framework 2011, and recharged for later use with a modular notebook computer according to the invention. This allows a user to keep spare power modules ready for use, and to recharge modules without connecting the computer itself to a charging unit. Moreover, the provision of power modules allows a user to provide more or less portable time to the notebook computer by using one or more than one power module.

Figure 38:
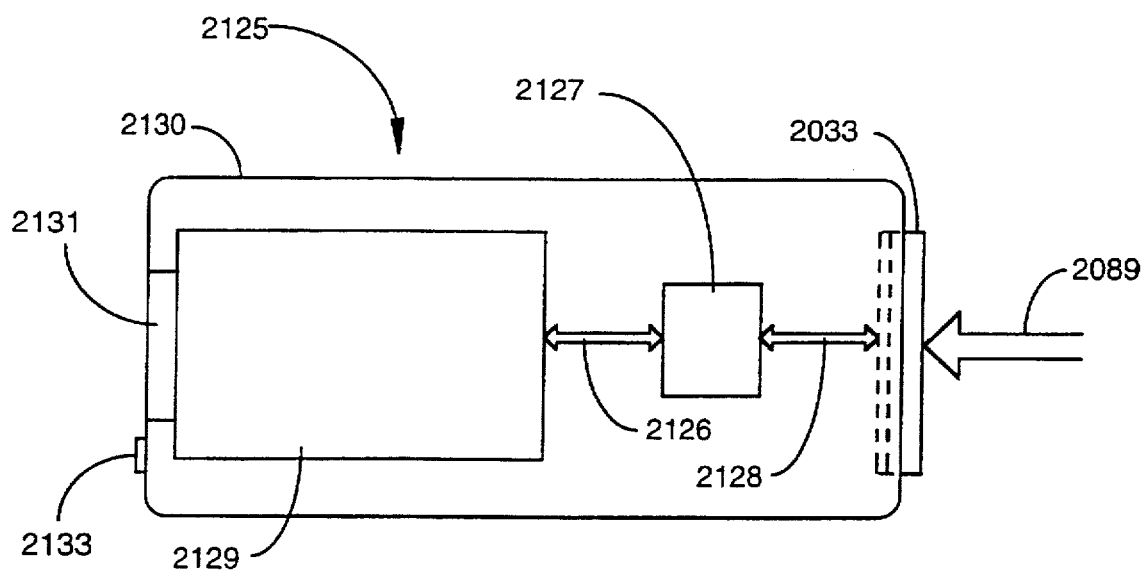
FIG. 38 is a block diagram of a floppy disk drive function module used in the invention.

FIG. 38 shows a floppy disk drive (FDD) module 2125 plugged into a module bay in a notebook computer according to an embodiment of the present invention. Module 2125 comprises a conventional FDD unit 2129 for nominal 3.5 inch disks with conventional circuitry mounted in a case 2130 to provide a module with guides, latches, and a connector matable with connector 2035 to be able to plug into a module bay in the notebook computer of the present invention. The case comprises an opening 2131 for inserting and withdrawing a floppy disk, and an eject button 2133 for ejecting a floppy disk.

A controller 2127 communicates with unit 2129 over lines 2126 and with connector 2033 (hence Notebus 2089) over lines 2128. The unit also derives power from the appropriate pins on connector 2033, but these pins and lines are not shown. Controller 2127 is an ASIC chip or chip set for translating between the notebus and the FDD unit. Given the data storage standards of the FDD unit and the characteristics of bus 2089, it is within the scope of workers with ordinary skill in the art to implement controller 2127 without undo experimentation.

Figure 39:
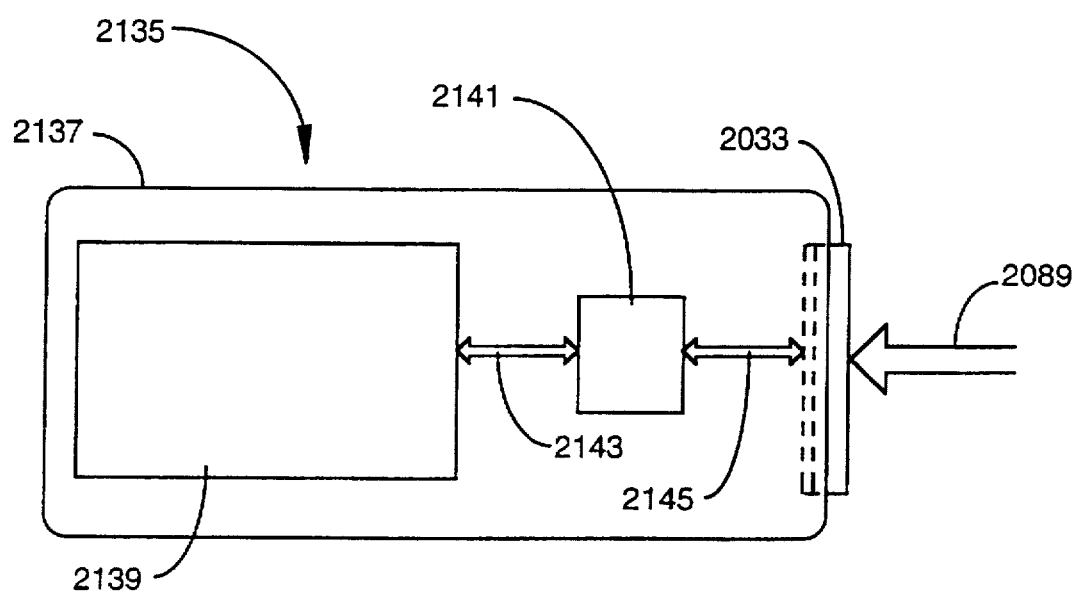
FIG. 39 is a block diagram of a hard disk drive module used in an embodiment of the invention.

FIG. 39 shows a hard disk drive (HDD) module 2135 according to an embodiment of the present invention plugged into bus 2089 in a module bay of framework 2011. HDD module 2135 comprises a conventional HDD unit 2139 mounted in a case 2137 to be compatible with plugging into a notebook computer according to the present invention. As in the case of the FDD module described above, a controller 2141 is provided to translate between Notebus 2089 and the HDD unit. Controller 2141 communicates with HDD unit 2139 over lines 2143, and with connector 2033 over lines 2145. Connector 2033 is exemplary of any one of the module connectors in the notebook computer.

Given the characteristics of HDD unit 2139 and of Notebus 2089, it is within the skill of workers in the art to implement controller 2141 without undue experimentation. Power line connections are not shown. In implementing controller 2141 there are several protocols that may be used. One is the ST506 standard known in the art. Another is the IDE standard known in the art. Yet another is an enhanced IDE, called EIDE, known to the inventors, and the subject of a separate patent application to be filed. In the EIDE protocol, there may be multiple IDE devices daisy-chained and addressed as secondary IDE devices with an additional select number.

Figure 40:
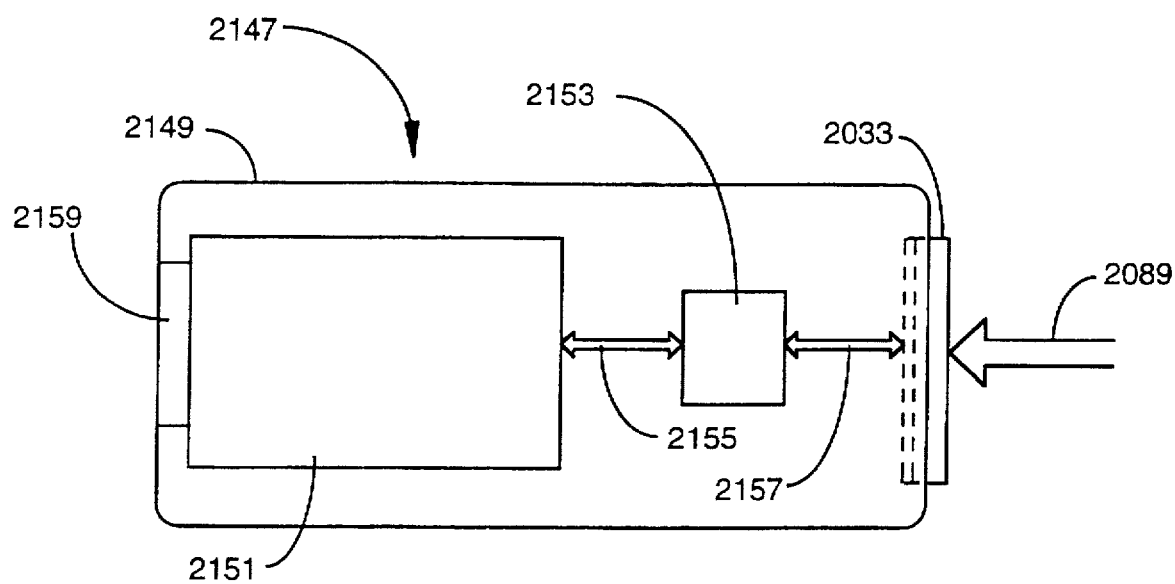
FIG. 40 is a block diagram of a "flash card" memory module according to an embodiment of the present invention.

FIG. 40 shows a "flash card" memory module 2147 plugged into connector 2033 of the notebook computer of the invention. "Flash cards" are RAM memory cards known in the art pluggable into typically parallel ports to make connection with internal bus structures of a computer. Module 2147 comprises a conventional "flash card" 2151 mounted in a case 2149 compatible with the module bay of a notebook computer according to the present invention.

As in cases described above, a controller 2153 is needed to accomplish communication between the memory structure of the "flash card" and bus 089. Controller 2153 communicates with "flash card" unit 2151 over lines 2155 and with connector 2033 over lines 2157. There may optionally be an opening 2159 in case 2149 and a connector (not shown) within unit 2151 for inserting and withdrawing flash cards, so relatively large collections of data may be plugged in as desired. Alternatively the interface may be the modular interface afforded by the plug-in module 2147. Again, given the known characteristics of the flash card and of bus 2089, implementation of the controller is a matter within the skill of workers in the art.

Figure 41:
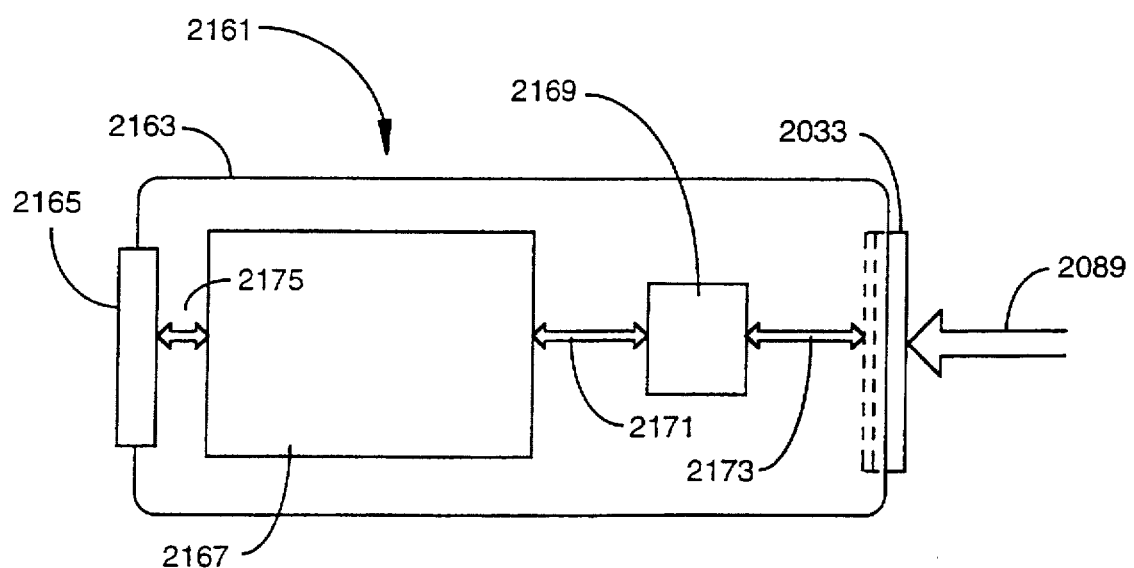
FIG. 41 is a block diagram of a LAN module according to an embodiment of the present invention.

FIG. 41 shows a LAN module 2161 plugged into connector 2033 of a notebook computer according to an embodiment of the present invention. In the embodiment shown in FIG. 41 a conventional LAN card, such as an Ethernet card, is mounted in a case 2163 to be compatible with plugging into a module bay of a notebook computer according to an embodiment of the present invention.

LAN card 2167 communicates with a conventional connector 2165 in the face of the case of module 2161 that is exposed when the module is plugged into a bay. This is a conventional connector of the sort known in the art for connecting computers on a network.

Within module 2161, in a first alternative, conventional LAN card 2167 interfaces to a controller 2169 communicating over lines 2171 and 2173, and the controller translates between bus 2089 and the conventional LAN card. In a second alternative, a LAN card is provided with the translation built in, so no separate controller is needed. The first alternative is preferable.

Figure 42:
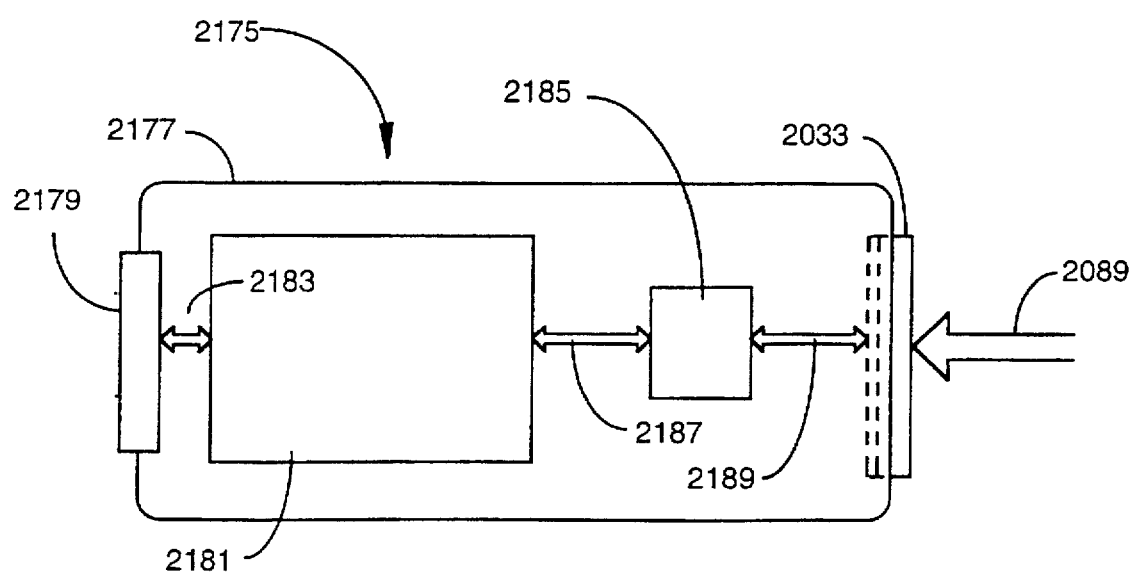
FIG. 42 is a block diagram of a modem module according to an embodiment of the present invention.

FIG. 42 shows a modem module 2175 plugged into connector 2033 in a bay of a notebook computer according to an embodiment of the present invention. Modem module 2175 comprises a conventional modem card 2181 mounted in a case 2177 to be compatible with plugging into a module bay. In this case, and other cases above, where the term "conventional" is used in conjunction with a card or unit, it is meant that the circuitry and function is conventional. The size may be adjusted to be compatible with a module case for plugging into a bay of a notebook computer according to the present invention.

Modem card 2181 connects over lines 2183 to a telephone interface 2179, which may comprise more than one "jack" so a hand set may also be connected. Card 2181 communicates to Notebus 2089 over lines 2187 and 2189 through controller 2185, which translates between the conventional card and the compressed bus. Alternatively, the translation components may he implemented on a single card along with the modem circuitry.

Figure 43:
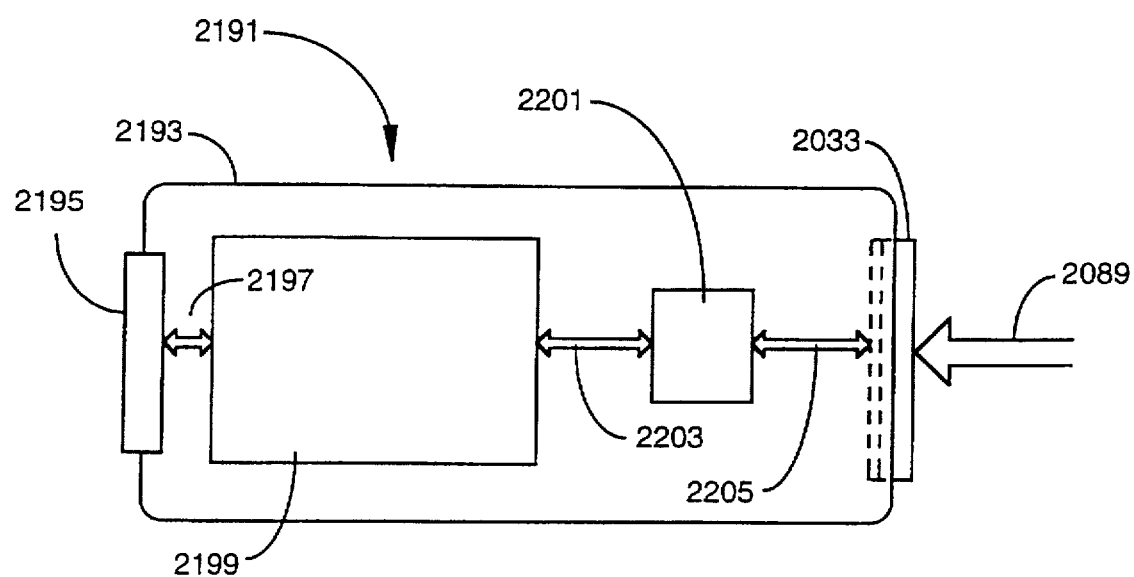
FIG. 43 is a block diagram of a FAX module according to an embodiment of the present invention.

FIG. 43 shows a FAX module 2191 plugged into connector 2033 of a module bay in an embodiment of the present invention. Module 2191 comprises a conventional FAX card 199 mounted in a case 193 to be compatible with plugging into a module bay in the present invention. Fax card 2199 communicates over lines 2197 with a telephone interface 2195, which may, as in the case of the modem module described above, have more than a single telephone "jack".

A controller 2201 provides an interface for the conventional FAX card between the card and Notebus 2089 over lines 2203 and 2205. Alternatively, the controller may be implemented on the same card as the FAX circuitry. In yet another alternative, the FAX capability and the modem capability described above may be implemented into a single module.

Figure 44:
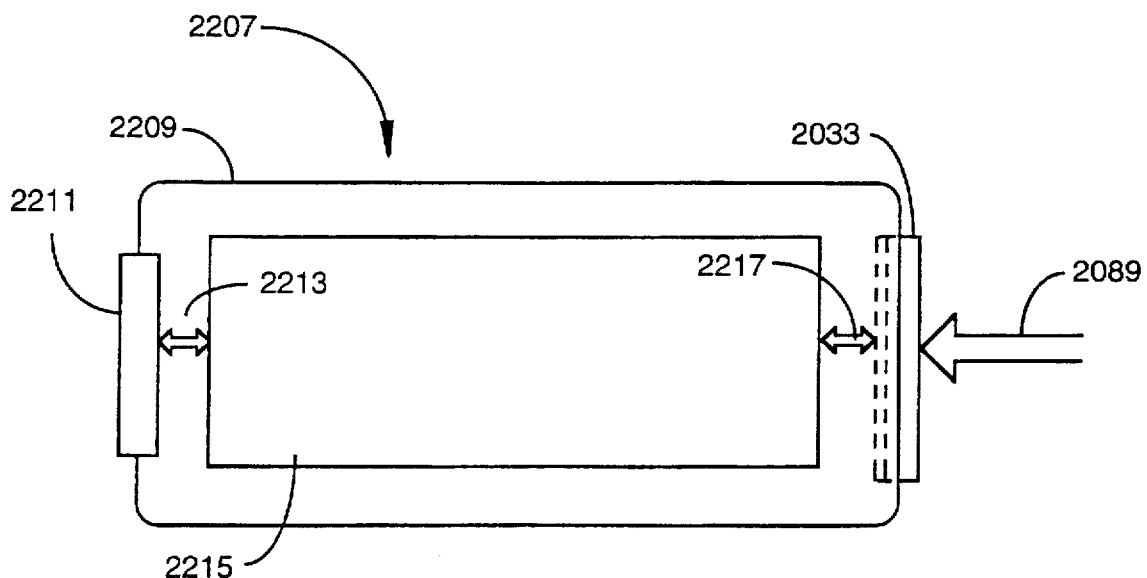
FIG. 44 is a block diagram of a data acquisition module according to an embodiment of the present invention.

FIG. 44 shows a specialty data acquisition module 2207 plugged into connector 2033 in a module bay in a notebook computer according to an embodiment of the present invention. Module 2207 comprises a circuit card 2215 mounted in a case 2209 to be compatible with plugging into a module bay. Card 2215 communicates over lines 2213 to an interface 2211 which may comprise one or several acquisition leads for connecting to outside equipment. For example, a data module may be provided for following the output of the vertical and horizontal sweep of an oscilloscope, and would have at least two input leads; one for the vertical and one for the horizontal sweep.

Card 2215 communicates over lines 2217 to connector 2033, hence Notebus 2089. The circuitry on card 2215 is designed to digitize the input if the input is analog, and to be compatible with Notebus 2089. Given the characteristics of signals to be measured and the characteristics of Notebus 2089, implementation of such a card is within the ordinary skill in the art.

The embodiments of the present invention described above relate primarily to notebook type computers. However, the invention has broader applications. The principles of the invention are also applicable to portable computers known as palmtop computers, and further embodiments are described below.

Figure 45A:
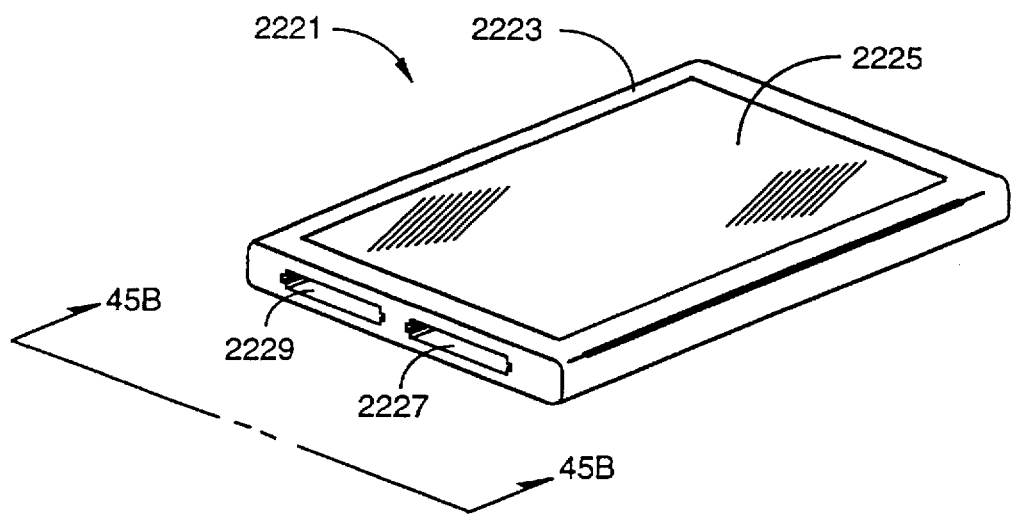
FIG. 45A is an isometric view of a modular palmtop computer framework according to an embodiment of the present invention.

FIG. 45A is an isometric view of a modular palmtop computer 2221 according to an embodiment of the invention. Computer 2221 is approximately the size of one-half a standard piece of paper (approximately 5.5 inches by 8.5 inches) and in a preferred embodiment comprises a planar array of four Personal Computer Memory Card International Association (PCMCIA) Type II module bays in a case 2223.

In this embodiment case 2223 has a combination I/O area 2225 implemented on one side of computer 2221, comprising a display overlaid with a touch sensitive planar structure. In other embodiments, the display may be a flat-panel display pivoted to the case, or a separate monitor in communication with case 2223. The touch screen provides a "softkey" operation in conjunction with interactive control logic. In a preferred embodiment of the invention, the control logic resides in static or dynamic memory within case 2223 but may also be part of an installed PCMCIA-type peripheral. A power unit (not shown) is enclosed within case 2223 for converting electrical input on a wide variety of standards to the form required by the computer. For example, there is a port (not shown) for connecting to a standard household outlet, rated at 120 V., 60 Hz, alternating current. The power unit converts the input to outputs as needed by the computer bus and function modules. There are also input ports for 6 V. DC, 12 V. DC, 9 V. DC, and others, and the power unit in one embodiment of the present invention is capable of recognizing the input characteristics by sampling, and switching to proper onboard circuitry to utilize the input.

In the embodiment of the invention shown by FIG. 45A, two module bays 2227 and 2229 are provided on one side of case 2223. There are two more module bays along the other side of the case opposite the module bays shown. In other embodiments bays may open to other edges of the case. The configuration provides a good balance between the need to stay small and simple, and to also have adequate versatility. In alternative embodiments other module configurations may be used, such as PCMCIA Type III, and others. In the alternative configurations the arrangement of the planar array of modules may vary as well.

Figure 45B:
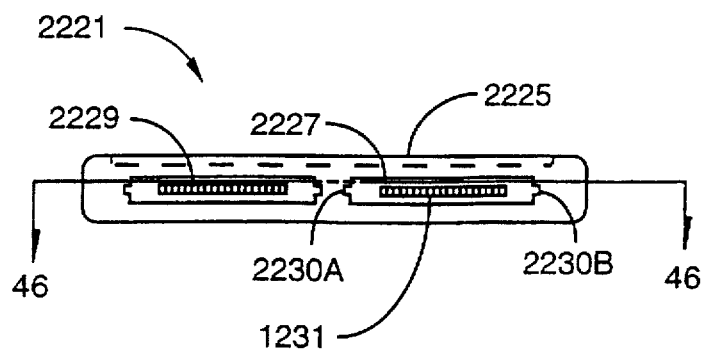
FIG. 45B is a view of the computer framework of FIG. 45A from one side from the vantage of line 45B—45B on FIG. 45A.

FIG. 45B is a view of computer 2221 in the direction of arrows 45B—45B of FIG. 45A. I/O area 2225 is located on top of case 2223. Module bay 2227 has a set of guide slots 2230A and 2230B. The guide slots are to position and guide a PCMCIA module card inserted into the module bay. Each module bay in this embodiment is configured to PCMCIA dimensional and connective standards and secures the fitted PCMCIA cards according to those standards. In this embodiment of the present invention, case 2223 has bays configured to PCMCIA type 2, revision B standard. In another embodiment of the invention, the case may have other types of PCMCIA module bays, or bays configured to one or another proprietary standard.

Each module bay has a bus connector, such as connector 2231. In this embodiment, connector 2231 is a standard PCMCIA connector that accepts PCMCIA cards and is electrically connected to the palmtop's internal bus. It will be apparent to those with skill in the art that there are a number of equivalent ways to connect a function module.

Figure 46:
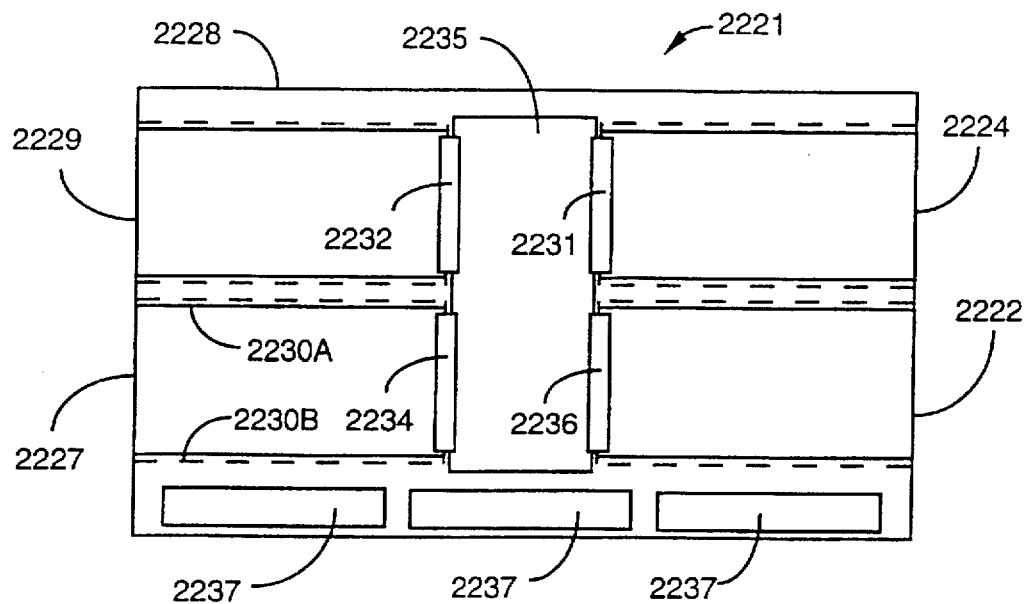
FIG. 46 is a sectioned plan view of the computer framework of FIG. 45A taken along section line 46—46 of FIG. 45B.

FIG. 46 is a simplified plan sectional view of computer 2221 taken according to section line 46—46 of FIG. 45B. Frame 2228 frames four PCMCIA module bays 2222, 2224, 2227 and 2229 arranged in a planar array. A printed circuit board structure 2235 is fastened and positioned down the center of frame 2228, and connectors 2231, 2232, 2234 and 2236 are connected to the printed circuit board structure and present their pin structure outward toward the respective bay areas. In the presently described embodiment, the internal connectors are male connectors, but this is not a requirement of the invention.

Slots 2230A and 2230B serve to guide a PCMCIA-type card into module bay 2227, and similar slots are located in each of the other module bays shown as dotted lines in the sectional view. A set of three AA batteries 2237 are located generally in the plane of the module bays and provide a portable power means in one embodiment. In another embodiment, outside power sources may power computer 2221 as described above.

Figure 47:
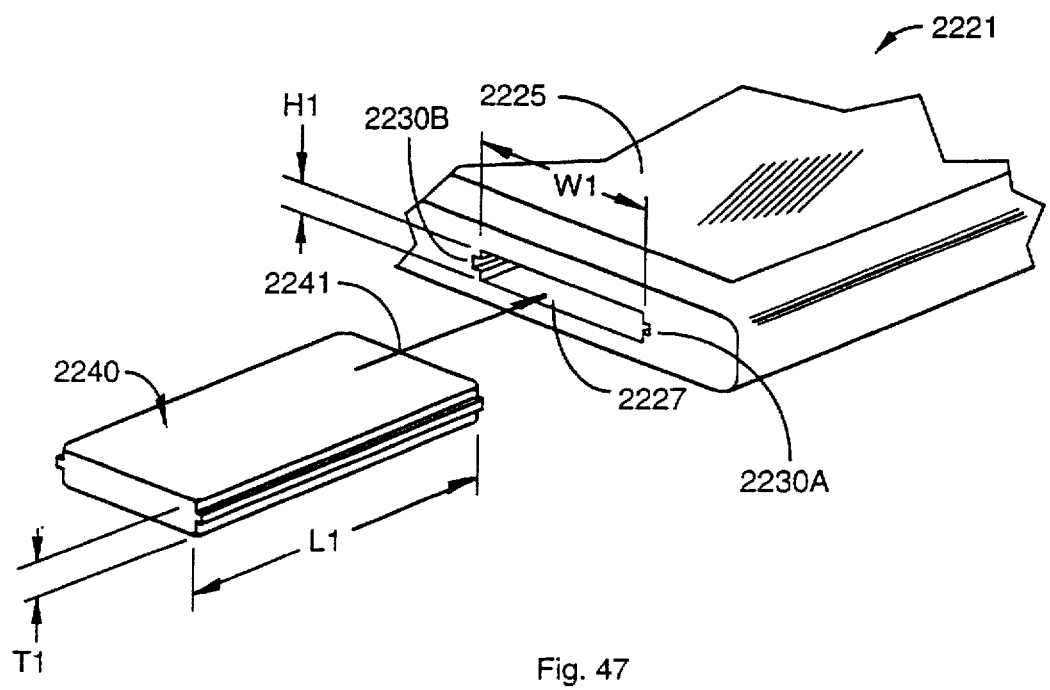
FIG. 47 is an isometric illustration showing a function module and a dedicated docking bay in an embodiment of the present invention.

FIG. 47 is a partial isometric view of a function module 2240 according to an embodiment the invention, aligned with module bay 2227 of computer 2221. Arrow 2241 shows the direction of insertion of the function module. I/O area 2225 is implemented on top of case 2223 in a plane parallel with the plane of the module bays. Module 2240 is a Type 2 PCMCIA card and has a thickness T1. The opening of module bay 2227 has width W1 and height H1. The length of function module 2240 is L1. In this embodiment of the present invention, these dimensions conform to PCMCIA industry standards. In an alternative embodiment of the present invention, module bay 2227 may change in dimension to accommodate other standard or proprietary modules.

Module bay 2227 engages function module 2240 in the full inserted position according to PCMCIA standards. In another embodiment of the invention, detents may be provided similar to those in FIG. 33 for the larger notebook computer embodiment. There are a number of ways known in the art to position and secure a small module. Securing a module may also be accomplished by other means, such as clamping or wedging and/or closing retaining mechanisms.

Figure 48:
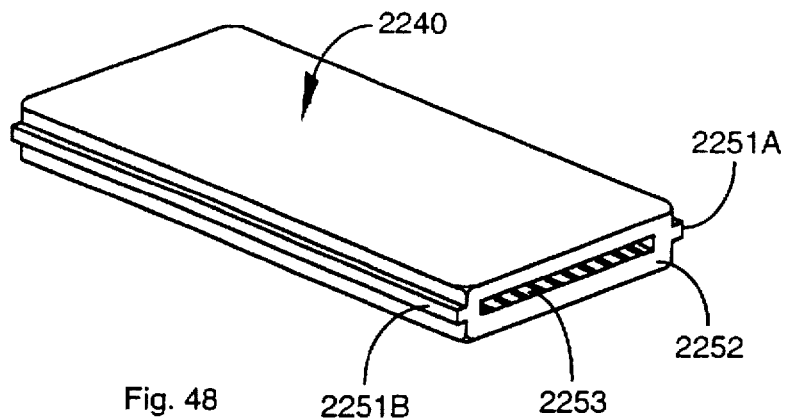
FIG. 48 is another view of a function module according to an embodiment of the present invention.

FIG. 48 is an enlarged isometric view of function module 2240 according to Type 2 PCMCIA standards. Back face 2252 includes a female connector 2253 for mating with a male connector positioned in each module bay, such as connector 2231 in FIG. 45B and FIG. 46. Connectors 2231 and 2253 are PCMCIA connectors and interface according to that industrial standard. Guide 2251A and 2251B are sized according to the PCMCIA standards.

Function modules are provided in many models capable of a wide range of functions. For example, computer 2221 in one embodiment has no onboard CPU or system memory. These functions are provided by function modules that may be inserted in any one of the available module bays. Other kinds of function modules that may be inserted include I/O system modules that provide speech-based, pen-based or keyboard based input. There are also floppy-disk drives, hard-disk drives, flashcard memory modules, LAN and modem adapters, Fax modules, specialty modules such as data acquisition modules adapted to specific equipment, specialty video modules, modules to adapt scanner peripherals to the computer, telephone adapters, and more.

In the case of I/O modules, necessary software, and in some cases firmware and hardware, may be connected to the internal bus structure by the insertion of a module. For example, a module is provided in one embodiment comprising an induction coil and a controller for decoding signals received via a varying magnetic field and providing code to the computer's internal bus. The varying magnetic field is produced by a stand-alone keyboard wherein the keystrokes are coded and transmitted as signals on the field.

In another embodiment, a similar module provides for communication from an auxiliary pen-based input pad. In yet another embodiment, a plug-in module provides a microphone, DSP circuitry, and necessary software to accept input from a user by voice, and to convert the voice input to machine-readable code. Provision of the necessary software and circuitry in these instances in module form provides for maximum flexibility an upgradability for modular systems according to the invention.

Electronic Architecture

Figure 49:
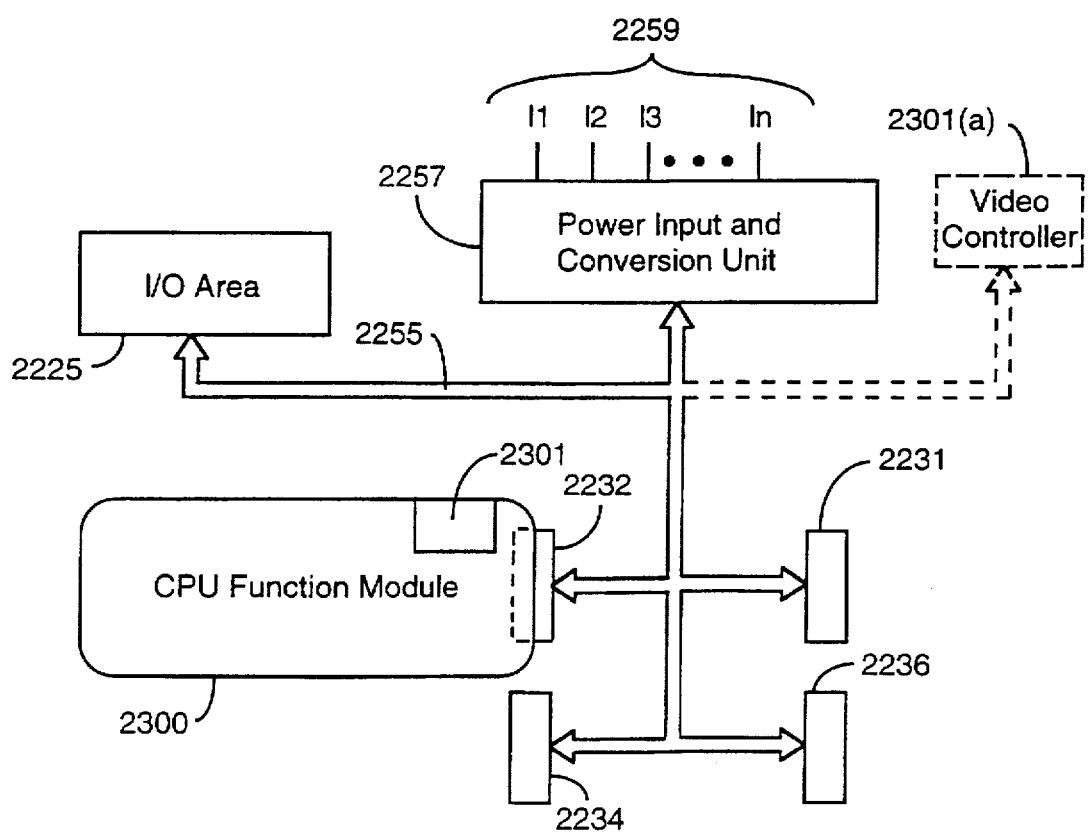
FIG. 49 is a block diagram of a compressed bus and connection to docking bays in a computer framework according to an embodiment of the present invention.

FIG. 49 is a block diagram showing internal elements of palmtop computer 2221, connected to show the electronic architecture of the modular computer according to an embodiment of the invention. A power input and/or conversion unit 2257 is housed in case 2223 (FIG. 45A) and has ports 2259 for power inputs. Power input may be from AA batteries 2237 (FIG. 46) or from an optional conversion unit via outside electrical sources. Conversion unit 2257 senses the input conditions and selects appropriate circuitry to convert the input to the voltages needed to power the elements of the system. Output from the conversion unit is to bus 2255, which comprises paths for power as well as for digital information such as data and addresses.

Because there are a wide variety of function modules, as indicated above and described in more detail below, there needs typically to be more than one power line in bus 2255. For example, computer 2221 may utilize hard disk drive modules, and these modules are preferably provided without onboard power sources. The motor drive for a hard disk requires a different power configuration (voltage and current) than does a CPU, for example, so there may be parallel power lines of differing size and voltage level in bus 2255. Bus 2255 may have a line for 24V DC, another for 12V DC, and yet another for 5V DC, as well as perhaps multiple ground lines.

Bus 2255 connects I/O area 2225 and transmits video signals from a video controller. The video controller may be integral to a function module, which is shown as video controller 2301 in a CPU function module 2300, or implemented in the case, shown as optional video controller 2301(a). As described above in a preferred embodiment of the present invention, I/O area 2225 is a combination display with an overlaid touch-sensitive screen. In another aspect, the I/O area may comprise an active-matrix display, in which case, dedicated analog driver lines from video controller 2301 connect to the display. I/O area 2225 may also comprise a conventional LCD display wherein I/O control logic is a function of an installed and dedicated I/O peripheral modules. In an alternative embodiment, video controller 2301 is built into case 2223 (FIG. 45A), and connected directly to bus 2255, similar to the modular notebook computer described above.

Bus 2255 connects to each of module bays 2222, 2224, 2226 and 2227 (FIG. 46) through connectors 2232, 2234, 2236 and 2231. When a function module, such as CPU module 2300, is inserted into a module bay, female connector 2253 (FIG. 18) mates with the respective male connector 2232 located in that module bay, and circuitry inside the CPU module is then connected to bus 2255.

Palmtop Function CPU Module

The onboard video controller 2301 built into CPU function module 2300 is a unique feature in one aspect of the present invention. A user is provided an ability to tailor the CPU power and type of video controller to the other modules and applications for palmtop computer 2221. This provides a simple means for upgrading by switching CPU function modules. Video signals are local to the CPU, which increases system performance.

Figure 50:
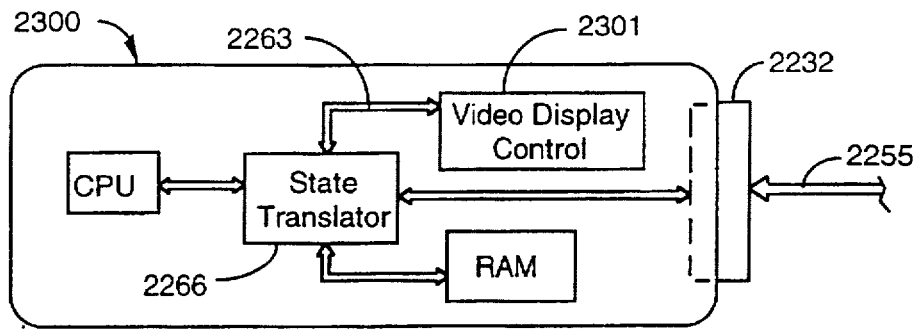
FIG. 50 is a block diagram of a CPU function module according to an embodiment of the present invention.

FIG. 50 is a more detailed diagram of CPU module 2300 for computer 2221. CPU module 2300 is similar in function to CPU module 2099 (FIG. 36), except for the addition of video controller 2301. Onboard video controller 2301 is bus connected by line 2263 to a state translator 2266. In this embodiment of the invention, the state translator is configured to transmit and receive video signals and commands over bus 2255 via connector 2231 as well as other functions as described above.

Other Aspects and Features

The embodiments of the present invention described above specifically address notebook-type and palmtop-type computers. The embodiment described below addresses yet another aspect of the palmtop type computers.

Figure 51:
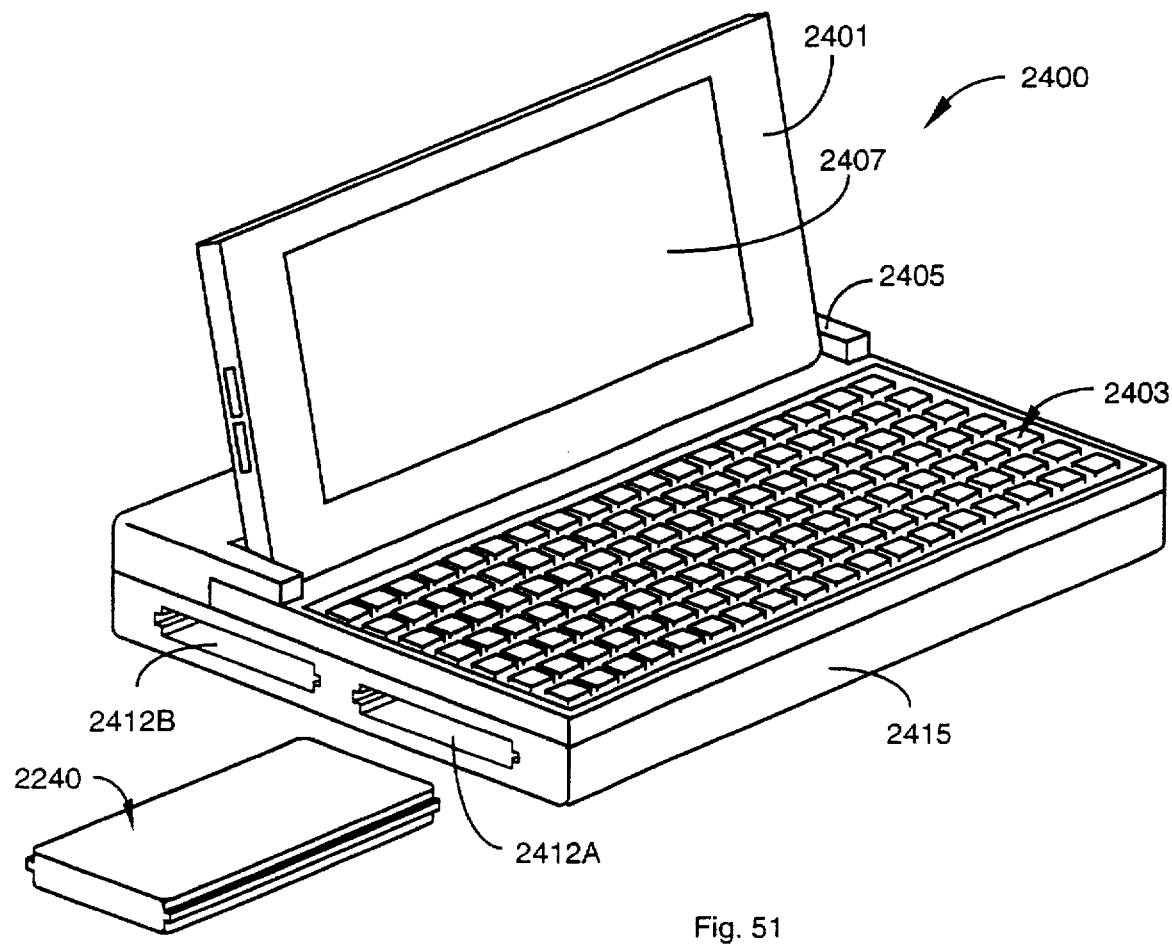
FIG. 51 is an isometric drawing of modular palmtop computer according to another embodiment of the present invention.

FIG. 51 is an isometric drawing of another embodiment of the present invention. Computer 2400 comprises an attached pivotable display case 2401 and a fixed keyboard 2403. The display case rotates about a hinge 2405 and closes in a fixed detented position above the keyboard. Display case 2401 comprises a flat-panel display 2407. There are two PCMCIA-type module bays 2412A and 2412B on one side of the case, and two more (not shown) on the side opposite. The four PCMCIA module bays are arranged in a planar array as described above. A frame 2415 contains a bus structure (not shown) that interconnects all aspects of the PCMCIA type module bays to computer 2400 as described above. In this embodiment of the present invention, a standard keyboard controller (not shown) enclosed in frame 2415 connects keyboard 2403 to the internal bus structure.

As previously described, there are a number of architectures that may be implemented as a result of combination of teachings in the present disclosure. For example, a Smart Phone may be provided in the familiar telephone form generally or substantially as shown in FIG. 6, having modular bays as indicated for receiving DSP modules and other functional modules. The Smart Phone may be connected to PBX and computer equipment as shown in FIGS. 4, 5, and 7, by ISDN and serial connections.

Optionally to the conventional telephone form, the Smart Phone elements as shown in FIG. 7 (or equivalent) may be implemented in a μPDA module and docked in a docking bay of a modular desktop or portable computer as disclosed herein. In this combination some of the elements of a computer, such as a speaker, a microphone, and to some extent microprocessor and memory elements, may be shared. The computer keyboard may be used for dialing and managing calls and data transmissions, and a graphic interface may be provided on the computer display for input and feedback relative to call and data transfer management.

In another option, Smart Phone circuitry as disclosed herein may be integrated directly with a computer, either a desktop or a portable unit like a notebook computer, and the computer thus inherits the functionality of the Smart Phone. In this embodiment the disclosed PC interface may be used, or connections may be made directly, as will be apparent to those with skill in the art. Docking bays may still be used for adding levels of DSP capability in this option. In this option the computer has a speaker (most do) and a microphone acting as the phone's handset, the keyboard is the input device for such as dialing, and a graphic interface may be provided for data and control management.

It will be apparent to one skilled in the art that there are a relatively large number of changes that may be made in the embodiments described without departing from the spirit and scope of the present invention. Some additions and alternatives have been mentioned above.

There are a number of equivalent ways the several features might be implemented without departing from the spirit and scope of the invention as well. There are, for example, numerous alternate configurations that would work with a Smart Phone. For example, the PBX might transmit digital and analog data. In particular, an analog line from the PBX might support older fax machines and other analog communication equipment that might be part of a user's system. Likewise, the PC might also have an analog interface so, for instance, a document scanner can read data into the PC and the data can be transmitted to the Smart Phone. In another configuration, a PBX is not even needed. Smart Phone input could instead be through standard public telephone lines, for example, ISDN lines. There are many sorts of cases and applications that might be used. Different embodiments can be rendered with different specifications. For instance, although it was originally conceived for a Smart Phone system embodiment, the specialized, plug-in RS-485 interface in FIG. 5 could become a hardware standard for PCs. There are many deviations that all fall within the spirit and scope of the invention.

In addition to the above, there are many ways to implement the support structure of a μPDA, and to interconnect the active components. One way has been illustrated by FIG. 12 and described in accompanying text. There are many alternatives to this preferred structure. There is also a broad range of sizes and form factors that might be assumed by devices according to the present invention. The use of well-known PCMCIA form factors has been disclosed, but other sizes and forms might also be provided in alternative embodiments. In larger embodiments, on-board peripherals may be implemented.

In addition to these alternatives, there are various ways the connectivity of a μPDA bus might be provided. The well-known PCMCIA standard has been disclosed as a preference, but other connectivity may also be used in alternative embodiments. Memory types and sizes may vary.

Means of providing a security code may vary. The nature of the internal bus may vary. There are indeed many variations that do not depart from the spirit and scope of the invention.

There are additionally many variations that might be made in the disclosed embodiments relative to modular computer architecture without departing from the spirit or scope of the invention. For example, there may be more than the four module bays described, or fewer. There may also be more than one planar array of module bays. To provide more docking bays in a compact arrangement, one might provide two or more planar levels, with multiple docking bays in each plane. Similarly, there are many ways modules may be built to be docked in a framework such as computer 2011, 2221 and 2400 to form a planar array. There are similarly many different kinds of connectors that might be utilized as well as many kinds of compressed buses that can be used. There are many kinds of modules that may be provided, and many other changes that might be made within the spirit and scope of the invention.

What is claimed is:

1. A portable digital telephone system comprising:

a general-purpose portable computer having a keyboard input, a speaker, and a PC Card slot with a standard PC Card interface, the computer adapted to function with a PC Card;

a telephone functional module adapted as a PC Card wherein the PC card has a microphone and DSP providing digitized audio data to the computer via the standard PC Card interface, the telephone functional module adapted as a PC card also comprising telephone circuitry adapted for providing functions for placing a telephone call and providing a user interface for voice communication; and control code executable by the computer and adapted for implementing a menu-driven display having an entry field for telephone numbers and a mechanism for initiating a telephone call;

wherein the computer with the telephone PC Card functions as a speaker phone, allowing a user to enter a telephone number and initiate a call at the keyboard.

2. The portable digital telephone system of claim 1 wherein the telephone PC Card provides a microphone for voice input.

3. A portable digital telephone system as in claim 1 wherein the menu-driven display comprises fields for retrieving from memory pre-stored telephone numbers, credit card numbers, and area codes, and wherein the computer by executing the control code combines retrieved numbers to place a long-distance credit card call.

4. A portable digital telephone system as in claim 1 wherein the telephone functional module includes an interface to an Integrated Services Digital Network (ISDN) telephone line, and the control code provides necessary software functions for operation with an ISDN line.

5. A portable digital telephone system as in claim 1 wherein the general-purpose portable computer is selected from the types of portable computers known as laptop computers, notebook computers, hand-held computers, and personal digital assistants.

6. In a general-purpose portable computer having a keyboard input, a speaker, and a PC Card slot with a standard PC Card interface, the computer adapted to function with a PC Card; a method for adapting the general purpose computer to operate as a speakerphone, comprising steps of:

providing a PC Card compatible with the PC Card slot, wherein the PC Card comprises telephone circuitry including a DSP chip and a microphone, with the PC card providing digital audio data to the computer via the standard PC Card interface;

loading to the computer control code adapted for operating the computer as a speakerphone in conjunction with the PC Card; and docking the PC Card in the PC Card slot, providing thereby a capability for the computer to operate as a speaker phone.

7. The method of claim 6 wherein the PC Card includes an interface to an Integrated Services Digital Network (ISDN) telephone line, and the control code provides necessary software functions for operation with an ISDN line.

* * * * *